(12) United States Patent
Abramson et al.

(10) Patent No.: US 10,028,113 B2
(45) Date of Patent: Jul. 17, 2018

(54) DEVICE CONTROL BASED ON NUMBER OF VEHICLE OCCUPANTS

(71) Applicant: Cellepathy Inc., Sammamish, WA (US)

(72) Inventors: Dan Abramson, New York, NY (US);
Itzhak Pomerantz, Kfar Saba (IL);
Yuval Kashtan, Mishmeret (IL);
Andrei Kolin, Herzliya (IL); Guy Soffer, Karkur (IL)

(73) Assignee: Cellepathy Inc., Sammamish, WA (US)

( * ) Notice: Subject to any disclaimer, the term of this patent is extended or adjusted under 35 U.S.C. 154(b) by 0 days.

(21) Appl. No.: 14/792,546

(22) Filed: Jul. 6, 2015

(65) Prior Publication Data

US 2015/0327034 A1    Nov. 12, 2015

Related U.S. Application Data

(63) Continuation of application No. 14/298,953, filed on Jun. 8, 2014, now Pat. No. 9,078,116, which is a
(Continued)

(51) Int. Cl.
*H04M 3/00* (2006.01)
*H04W 4/14* (2009.01)
(Continued)

(52) U.S. Cl.
CPC ............. *H04W 4/14* (2013.01); *H04L 67/12* (2013.01); *H04M 1/72577* (2013.01);
(Continued)

(58) Field of Classification Search
CPC ...... H04W 60/04; H04W 12/06; H04W 24/04
See application file for complete search history.

(56) References Cited

U.S. PATENT DOCUMENTS

| 6,262,657 B1 | 7/2001 | Okuda et al. |
| 6,353,778 B1 | 3/2002 | Brown |
| (Continued) | | |

FOREIGN PATENT DOCUMENTS

| EP | 2136536 A1 | 12/2009 |
| EP | 2288125 A1 | 2/2011 |
| (Continued) | | |

OTHER PUBLICATIONS

"A Method for Limiting the Use of a Mobile Communications Device", ip.com, (Jul. 14, 2011), 16 pgs.
(Continued)

*Primary Examiner* — Khalid Shaheed
(74) *Attorney, Agent, or Firm* — FisherBroyles, LLP; Ariel Reinitz

(57) ABSTRACT

Systems and methods are disclosed for computing various determinations at one or more mobile devices and/or central machines. In part, such determinations are computed based on analysis of one or more inputs originating at one or more sensors of one or more devices. The referenced methods can include operations such as: receiving one or more inputs, processing the one or more inputs to determine a quantity of occupants within a vehicle, and transforming a first operation state of a device present within the vehicle based on a determination that the quantity of occupants within the vehicle is not greater than one.

17 Claims, 15 Drawing Sheets

Related U.S. Application Data continuation of application No. 13/825,527, filed as application No. PCT/US2011/052655 on Sep. 21, 2011, now Pat. No. 8,750,853.

(60) Provisional application No. 61/427,228, filed on Dec. 27, 2010, provisional application No. 61/384,726, filed on Sep. 21, 2010.

(51) Int. Cl.

| | | |
|---|---|---|
| *H04W 64/00* | (2009.01) | |
| *H04L 29/08* | (2006.01) | |
| *H04W 4/04* | (2009.01) | |
| *H04W 8/18* | (2009.01) | |
| *H04M 1/725* | (2006.01) | |
| *H04W 4/80* | (2018.01) | |
| *H04W 12/08* | (2009.01) | |
| *H04M 1/60* | (2006.01) | |

(52) U.S. Cl.
CPC .......... *H04W 4/046* (2013.01); *H04W 4/80* (2018.02); *H04W 8/18* (2013.01); *H04W 64/006* (2013.01); *H04M 1/6091* (2013.01); *H04M 2250/10* (2013.01); *H04M 2250/12* (2013.01); *H04W 12/08* (2013.01); *H04W 64/003* (2013.01)

(56) References Cited

U.S. PATENT DOCUMENTS

| | | | |
|---|---|---|---|
| 6,853,894 B1 | 2/2005 | Kolls | |
| 7,187,952 B2 | 3/2007 | Lin | |
| 7,206,567 B2 | 4/2007 | Jin et al. | |
| 7,689,256 B2 | 3/2010 | Jin et al. | |
| 7,738,857 B2 | 6/2010 | Engstrom et al. | |
| 8,000,689 B2 | 8/2011 | Featherstone et al. | |
| 8,045,976 B2 | 10/2011 | Kiddie et al. | |
| 8,217,800 B2 | 7/2012 | Vander Veen et al. | |
| 8,290,480 B2 | 10/2012 | Abramson et al. | |
| 8,706,143 B1 | 4/2014 | Elias | |
| 8,750,853 B2 | 6/2014 | Abramson et al. | |
| 9,078,116 B2 | 7/2015 | Abramson et al. | |
| 9,078,123 B1* | 7/2015 | Benco ................... H04W 24/04 | |
| 2002/0164962 A1 | 11/2002 | Mankins et al. | |
| 2005/0035955 A1 | 2/2005 | Carter et al. | |
| 2005/0176420 A1 | 8/2005 | Graves et al. | |
| 2005/0192038 A1 | 9/2005 | Jeong | |
| 2006/0198513 A1 | 9/2006 | Eldon | |
| 2006/0206709 A1 | 9/2006 | Labrou | |
| 2007/0072553 A1 | 3/2007 | Barbera | |
| 2007/0120948 A1 | 5/2007 | Fujioka et al. | |
| 2007/0159354 A1 | 7/2007 | Rosenberg | |
| 2008/0299954 A1 | 12/2008 | Wright et al. | |
| 2008/0299959 A1 | 12/2008 | Geyer et al. | |
| 2008/0305779 A1 | 12/2008 | Wright et al. | |
| 2008/0305780 A1 | 12/2008 | Williams et al. | |
| 2008/0305808 A1 | 12/2008 | Chan et al. | |
| 2008/0318562 A1 | 12/2008 | Featherstone et al. | |
| 2009/0002147 A1 | 1/2009 | Bloebaum et al. | |
| 2009/0004968 A1 | 1/2009 | Miyake | |
| 2009/0055178 A1 | 2/2009 | Coon | |
| 2009/0082951 A1 | 3/2009 | Graessley | |
| 2009/0209293 A1 | 8/2009 | Louch | |
| 2009/0239553 A1 | 9/2009 | Wright et al. | |
| 2009/0300525 A1 | 12/2009 | Jolliff et al. | |
| 2010/0002072 A1 | 1/2010 | Nagai | |
| 2010/0035632 A1* | 2/2010 | Catten ................... H04W 24/08 455/456.1 |
| 2010/0052947 A1 | 3/2010 | Lin et al. | |
| 2010/0069115 A1 | 3/2010 | Lin | |
| 2010/0113073 A1 | 5/2010 | Schlesener et al. | |
| 2010/0130182 A1* | 5/2010 | Rosen ................... G06K 9/00785 455/414.1 |
| 2010/0148920 A1* | 6/2010 | Philmon ................... H04M 1/67 340/5.2 |
| 2010/0159908 A1 | 6/2010 | Chang et al. | |
| 2010/0160004 A1 | 6/2010 | Alameh et al. | |
| 2010/0169007 A1* | 7/2010 | Kaushik ................... G08G 1/0962 701/532 |
| 2010/0201478 A1 | 8/2010 | Veen et al. | |
| 2010/0214398 A1 | 8/2010 | Goulart et al. | |
| 2010/0234047 A1 | 9/2010 | Lipovski | |
| 2010/0309895 A1 | 12/2010 | Hunn et al. | |
| 2010/0312547 A1 | 12/2010 | Van Os et al. | |
| 2011/0021234 A1 | 1/2011 | Tibbitts et al. | |
| 2011/0065456 A1 | 3/2011 | Brennan et al. | |
| 2011/0068923 A1 | 3/2011 | Burket et al. | |
| 2011/0117903 A1* | 5/2011 | Bradley ................... H04M 1/6075 455/418 |
| 2011/0137520 A1* | 6/2011 | Rector ................... H04M 1/72577 701/36 |
| 2011/0159842 A1* | 6/2011 | Vander Veen ................... G01S 19/14 455/410 |
| 2011/0171943 A1 | 7/2011 | Raviv | |
| 2011/0263240 A1 | 10/2011 | Featherstone et al. | |
| 2011/0284304 A1 | 11/2011 | Van Schoiack | |
| 2011/0301839 A1 | 12/2011 | Pudar et al. | |
| 2011/0307188 A1 | 12/2011 | Peng et al. | |
| 2012/0009930 A1* | 1/2012 | Brisebois ................... H04W 52/0264 455/450 |
| 2012/0040665 A1 | 2/2012 | Liu et al. | |
| 2012/0071151 A1 | 3/2012 | Abramson et al. | |
| 2012/0087303 A1 | 4/2012 | Kwon et al. | |
| 2013/0028245 A1 | 1/2013 | Oerton et al. | |
| 2013/0122898 A1 | 5/2013 | Tsurutome et al. | |
| 2013/0150004 A1 | 6/2013 | Rosen | |
| 2016/0021238 A1 | 1/2016 | Abramson et al. | |

FOREIGN PATENT DOCUMENTS

| | | |
|---|---|---|
| WO | WO-2008109477 A1 | 9/2008 |
| WO | WO-2010025562 A1 | 3/2010 |
| WO | WO-2010115289 A1 | 10/2010 |
| WO | WO-2011019900 A2 | 2/2011 |
| WO | WO-2011019900 A3 | 2/2011 |
| WO | WO-2011058224 A1 | 5/2011 |
| WO | WO-2013043228 A1 | 3/2013 |

OTHER PUBLICATIONS

"U.S. Appl. No. 13/244,978, Final Office Action dated Jun. 28, 2012-12", 5 pgs.

"U.S. Appl. No. 13/244,978, Non Final Office Action dated Feb. 13, 2012", 7 pgs.

"U.S. Appl. No. 13/244,978, Notice of Allowance dated Aug. 24, 2012", 7 pgs.

"U.S. Appl. No. 13/244,978, Response filed May 14, 2012 to Non Final Office Action dated Feb. 13, 2012", 13 pgs.

"U.S. Appl. No. 13/244,978, Response filed Aug. 15, 2012 to Final Office Action dated Jun. 28, 2012", 10 pgs.

"U.S. Appl. No. 13/825,527, Non Final Office Action dated Oct. 7, 2013", 10 pgs.

"U.S. Appl. No. 13/825,527, Notice of Allowance dated Jan. 31, 2014", 15 pgs.

"U.S. Appl. No. 13/825,527, Preliminary Amendment filed Mar. 21, 2013", 9 pgs.

"U.S. Appl. No. 13/825,527, Response filed Oct. 30, 2013 to Non Final Office Action dated Oct. 7, 2013", 12 pgs.

"U.S. Appl. No. 13/924,274, Non Final Office Action dated Dec. 8, 2014", 13 pgs.

"U.S. Appl. No. 14/298,953, Non Final Office Action dated Aug. 14, 2014", 12 pgs.

"U.S. Appl. No. 14/298,953, Notice of Allowance dated Mar. 4, 2015", 15 pgs.

"U.S. Appl. No. 14/298,953, Preliminary Amendment filed Jun. 8, 2014", 7 pgs.

"U.S. Appl. No. 14/298,953, Response filed Nov. 19, 2014 to Non Final Office Action dated Aug. 14, 2014", 12 pgs.

(56) References Cited

OTHER PUBLICATIONS

"U.S. Appl. No. 14/346,308, Advisory Action dated Feb. 23, 2017", 3 pgs.
"U.S. Appl. No. 14/346,308, Final Office Action dated Nov. 29, 2016", 21 pgs.
"U.S. Appl. No. 14/346,308, Non Final Office Action dated Apr. 29, 2016", 17 pgs.
"U.S. Appl. No. 14/346,308, Preliminary Amendment filed Jan. 29, 2015", 9 pgs.
"U.S. Appl. No. 14/346,308, Preliminary Amendment filed Mar. 20, 2014", 8 pgs.
"U.S. Appl. No. 14/346,308, Response filed Jan. 30, 2017 to Final Office Action dated Nov. 29, 2016", 12 pgs.
"U.S. Appl. No. 14/346,308, Response filed Apr. 4, 2016 to Restriction Requirement dated Nov. 4, 2015", 12 pgs.
"U.S. Appl. No. 14/346,308, Response filed Oct. 31, 2016 to Non Final Office Action dated Apr. 29, 2016", 13 pgs.
"U.S. Appl. No. 14/346,308, Restriction Requirement dated Nov. 4, 2015", 7 pgs.
"Australian Application Serial No. 2012313395, First Examiners Report dated Jun. 8, 2016", 5 pgs.
"Canadian Application Serial No. 2,849,718, Office Action dated Jun. 9, 2015", 4 pgs.
"Canadian Application Serial No. 2,849,718, Office Action dated Jul. 5, 2016", 3 pgs.
"Canadian Application Serial No. 2,849,718, Response filed Jan. 5, 2016 to Office Action dated Jul. 7, 2015", 32 pgs.
"Canadian Application Serial No. 2,849,718, Response filed Jan. 5, 2017 to Office Action dated Jul. 5, 2016", 18 pgs.
"Canadian Application Serial No. 2,849,718, Response filed Dec. 9, 2015 to Office Action dated Jun. 9, 2015", 14 pgs.
"Canadian Application Serial No. 2,849,725, Office Action dated Oct. 27, 2016", 3 pgs.
"European Application Serial No. 11827489.3, Extended European Search Report dated Apr. 2, 2015", 6 pgs.
"European Application Serial No. 11827489.3, Response filed Oct. 30, 2015 to Extended Search Report dated Apr. 2, 2015", 9 pgs.
"European Application Serial No. 11827489.3, Response filed Nov. 13, 2013 to Communication pursuant to Rules 161(1) and 162 EPC dated May 6, 2016", 42 pgs.
"European Application Serial No. 12834487.6, Extended European Search Report dated Mar. 6, 2015", 6 pgs.
"European Application Serial No. 12834487.6, Extended European Search Report dated Aug. 25, 2015", 10 pgs.
"European Application Serial No. 12834487.6, Response filed Mar. 21, 2016 to Extended European Search Report dated Aug. 25, 2015", 13 pgs.
"index of Papers", driver-detect.pdf, (Aug. 27, 2011), 2 pgs.
"International Application Serial No. PCT/IB2013/001582, International Search Report dated Mar. 21, 2014", 4 pgs.
"International Application Serial No. PCT/IB2013/001582, Written Opinion dated Mar. 21, 2014", 8 pgs.
"International Application Serial No. PCT/US2011/052655, International Prelimiary Report on Patentability dated Sep. 24, 2012", 68 pgs.
"International Application Serial No. PCT/US2011/052655, International Search Report dated Mar. 20, 2012", 4 pgs.
"International Application Serial No. PCT/US2011/052655, Invitation to Pay Additional Fees dated Jan. 4, 2012", 2 pgs.
"International Application Serial No. PCT/US2011/052655, Written Opinion dated Mar. 20, 2012", 22 pgs.
"International Application Serial No. PCT/US2012/030017, International Preliminary Report on Patentability dated Jul. 10, 2014", 5 pgs.
"International Application Serial No. PCT/US2012/030017, International Search Report dated Jul. 6, 2012", 3 pgs.
"International Application Serial No. PCT/US2012/030017, International Search Report dated Nov. 1, 2013", 3 pgs.
"International Application Serial No. PCT/US2012/030017, Written Opinion dated Jul. 6, 2012", 14 pgs.
"International Application Serial No. PCT/US2012/030017, Written Opinion dated Nov. 1, 2013", 13 pgs.
Chu, Hon Lung, "In-Vehicle Driver Detection Using Mobile Phone Sensors", (Apr. 20, 2011), 21 pgs.
Chu, Hon Lung, et al., "In-Vehicle Driver Detection Using Mobile Phone Sensors", Duke University, Microsoft Research, 14 pgs.
Chu, Hon Lung, et al., "Poster: You Drivin? Talk to you Later", MobSys'11, (2011), 1 pg.
Chu, Hon Lung, et al., "You Drivin? Talk to you later", Poster, 1 pg.
Dai, Jangpeng, et al., "Mobile Phone based drunk driving detection", 8 pgs.

\* cited by examiner

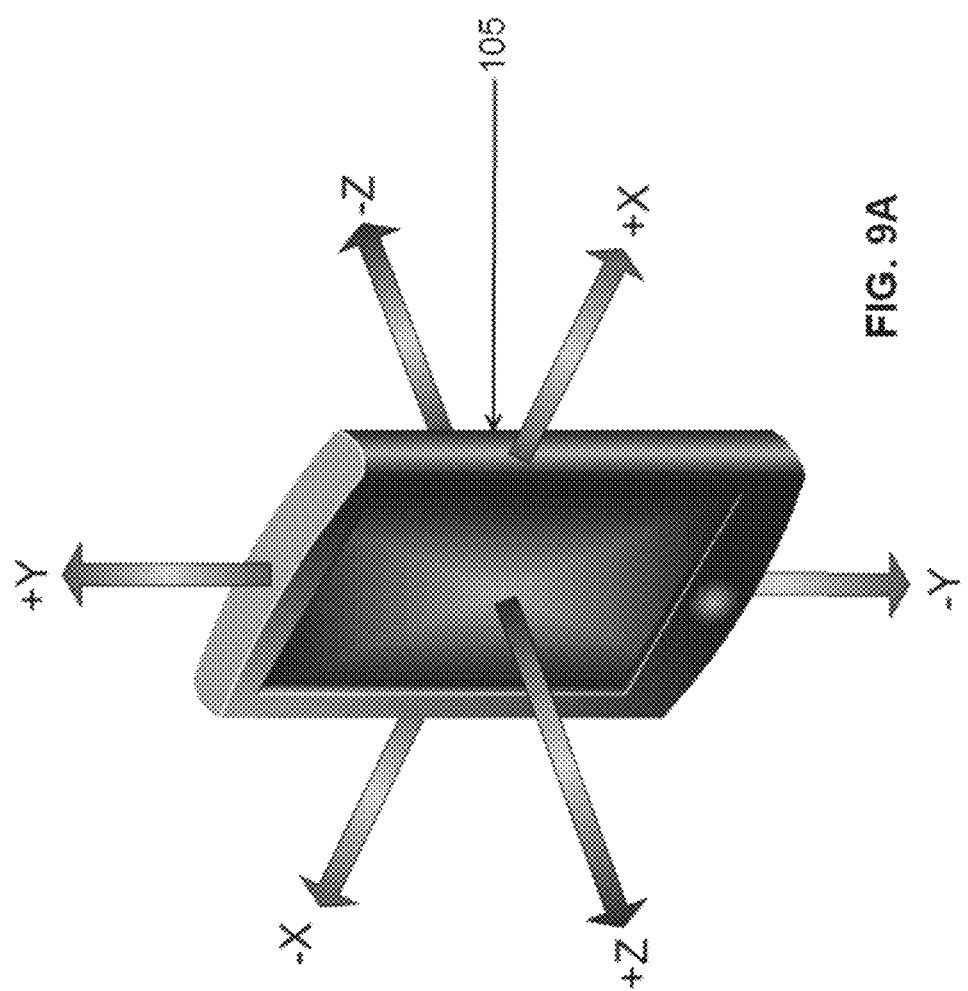

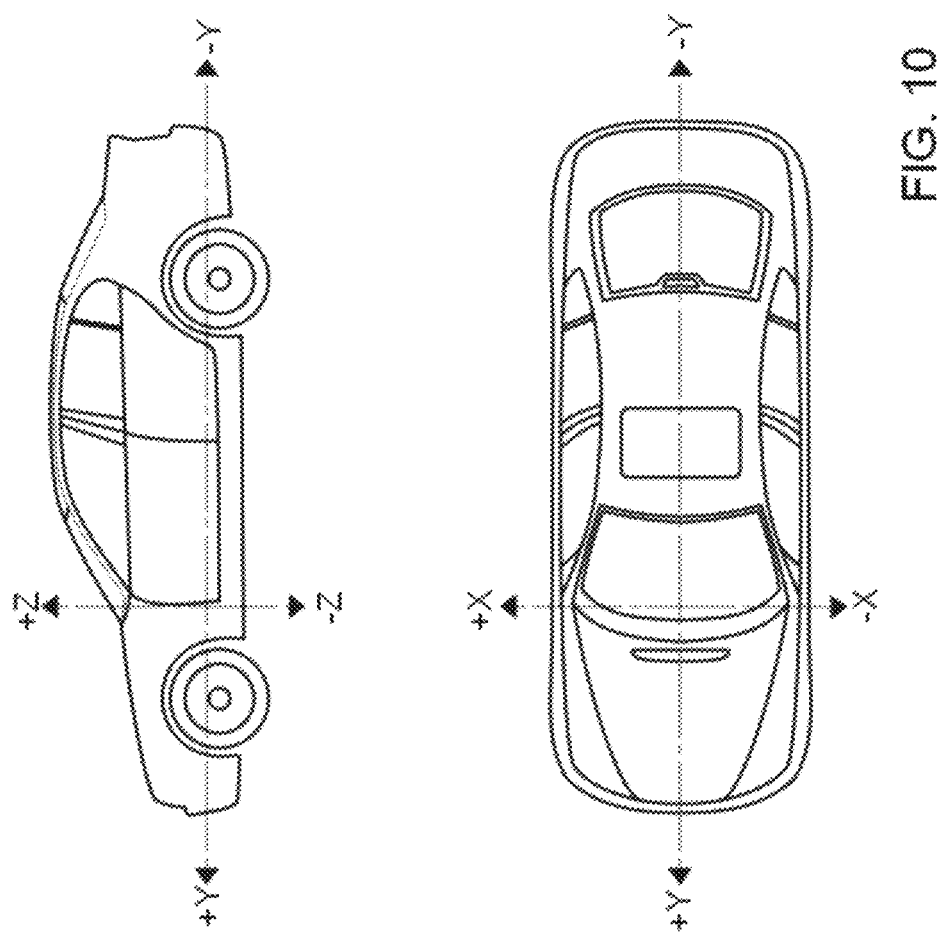

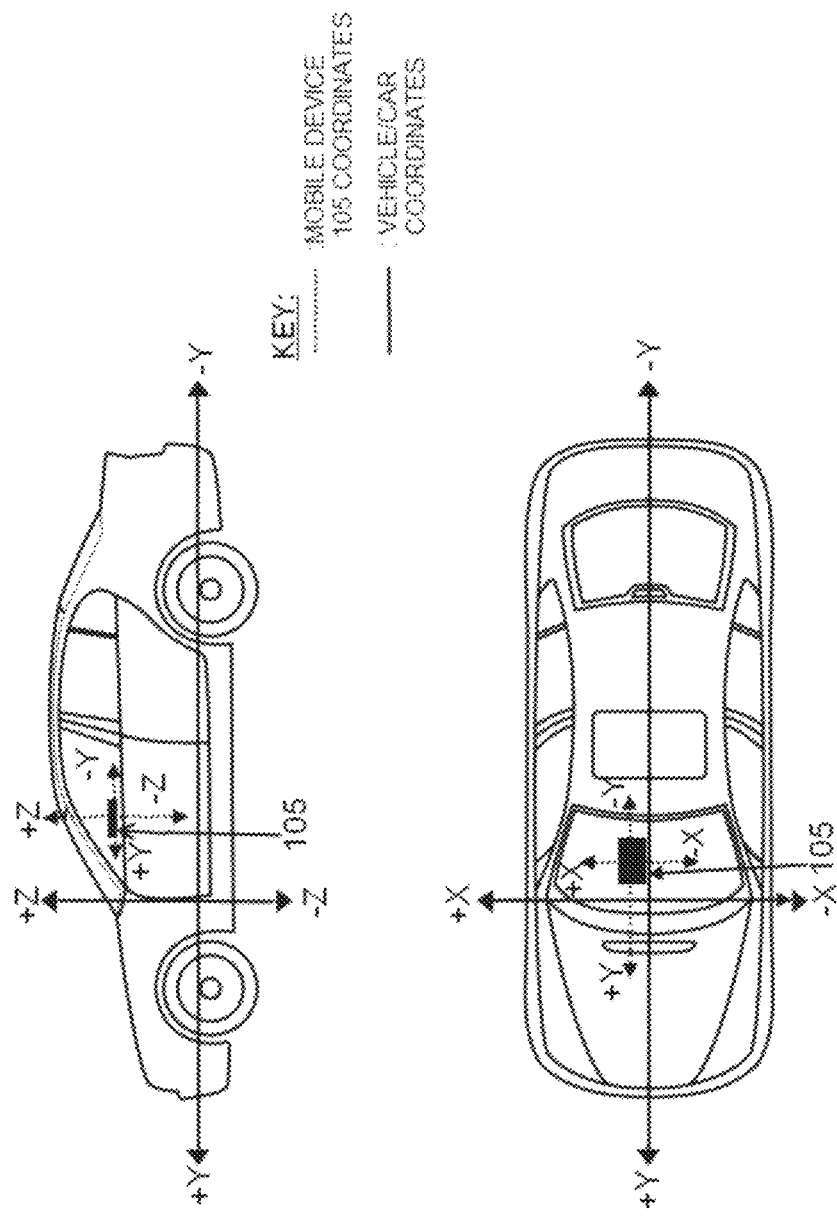

DEVICE CONTROL BASED ON NUMBER OF VEHICLE OCCUPANTS

CROSS-REFERENCE TO RELATED APPLICATIONS

The present application is a continuation of U.S. patent application Ser. No. 14/298,953, filed Jun. 8, 2015, now U.S. Pat. No. 9,078,116, which is a continuation of U.S. patent application Ser. No. 13/825,527, filed Mar. 21, 2013, now U.S. Pat. No. 8,750,853, which is a US National Stage application of International Application No. PCT/US2011/052655, filed Sep. 21, 2011, which claims the benefit of U.S. patent application Ser. No. 61/384,726, filed Sep. 21, 2010 and U.S. patent application Ser. No. 61/427,228, filed Dec. 27, 2010, each of which is hereby incorporated by reference in its respective entirety.

TECHNICAL FIELD OF THE INVENTION

This disclosure relates generally to the field of mobile device identification, and, in particular, to computer-implemented systems and methods for determining roles and usages of a mobile device within a vehicle.

BACKGROUND OF THE INVENTION

There are approximately 4.6 billion cellular phone subscriptions in the world over which it is estimated that more than 2 trillion text (SMS) messages are sent annually. There are also over 800 million transportation vehicles in the world. The magnitude of these statistics indicates that cellular phone use in vehicles is inevitable and is likely to remain quite common, unless preventative measures are taken.

Drivers using a hand-held cellular phone or smartphone for talking, text messaging, and/or for executing other applications or 'apps' while driving has become a problem of near-epidemic proportions. Studies on distracted driving have shown that by talking on a cell phone, a driver increases his/her risk of an accident by a factor of four. Even worse, sending text messages increases a driver's accident risk 23-fold. Additionally, studies have shown that the temptation to use a cellular phone for texting, talking, and other activities while operating a vehicle is not limited to younger drivers—adult drivers have been shown to text more often than younger ones.

In response to this growing concern and danger, numerous regulatory actions have been put in place to attempt to mitigate such phone-based distractions to drivers. For example, in the United States, thirty states have banned drivers of vehicles from texting, and many have subsequently increased the penalties for such violations. Driving-while-texting has also been banned throughout Europe and many other countries around the world. Additionally, talking on a hand-held cellular phone while driving a vehicle has been banned in eight US states, and such cell phone use has been banned in all of Europe and in many other countries.

The effectiveness of these laws alone, without an effective means of enforcement, is questionable. Being that cellular phones are generally small and discreet and drivers are frequently in motion, it is often difficult for law enforcement personnel to effectively police for such violations. Indeed, statistics show that accidents arising from cellular phone-based distractions are increasing as the popularity of such devices increases.

Given the easy accessibility of cell phones to drivers, many drivers' apparent desire to operate their cellular phones while driving, and the difficulties attendant with enforcing laws prohibiting cellular phone use, it is likely that drivers will continue to use cellular phones for texting, talking, and/or other activities (e.g., playing games or running applications), for the foreseeable future.

Several solutions have been proposed to address illegal/unsafe cell phone usage by drivers of vehicles. Certain of these approaches seek to utilize a phone's on-board GPS and/or accelerometers to establish the likelihood that the phone is being used within a moving vehicle. If the data extracted from the GPS and/or the accelerometers indicates that the vehicle is moving, then the software in the cell phone deactivates "risky" cell phone functions or otherwise thwarts cell phone-based distractions (such solutions are commonly known as "blocking" solutions).

However, such solutions are incapable of distinguishing between the driver of a vehicle and a passenger in the same vehicle who should retain the right to use his/her cellular phone. There are various common driving scenarios where it would be advantageous for a passenger to use his/her cellular phone (such as to obtain driving directions). As such, the proposed "blocking" solutions entail substantial and critical shortcomings, as they often unnecessarily block a passenger's ability to use their cellular phone within a moving vehicle. This challenge of distinguishing between a passenger and a driver in a moving vehicle is commonly referred to as the "Passenger Problem".

Other solutions addressing this problem of cellular phone use while driving require the pre-installation of a hardware device in the vehicle. Such devices are typically installed next to the driver and are used to transmit a short distance blocking signal, effectively creating a no-use zone around the driver's location within the car. Such devices prevent the driver (or anyone located within the no-use zone) from using a cellular phone by effectively deactivating the phone. However, such approaches are onerous in that they require that car-owners purchase and install the requisite additional hardware, creating significant impediments for widespread adoption. In addition, the costs of manufacturing and installing such hardware are rather high—approximately $100-$200 per cellular phone.

Yet other proposed solutions attempt to address the problem of cellular phone use while driving by utilizing text-to-voice technology, whereby email and text messages are spoken for the user (presumably the driver) while in a moving vehicle. However, such solutions also suffer from the Passenger Problem, i.e., the text-to-voice application does not know how to distinguish drivers (for whom the messages should be spoken) from passengers (for whom they should not be spoken). As such, substantial confusion can arise in a moving car with several passengers carrying cellular phones. In such a scenario, each of the cellular phones of the various passengers will recite the messages received by the respective phone, since such solutions also cannot distinguish between the cellular phone of the driver and the phones of the passengers.

In addition, other proposed solutions seek to block all texting and/or other applications by administering a small test or puzzle to the user. The time that it takes the user to solve to the test/puzzle can dictate whether the user is a driver or a passenger. However, it can be readily appreciated that such an approach, paradoxically, further distracts a driver who attempts to use his/her cellular phone while driving, rather than actually increasing the driver's safety.

It is with respect to these and other considerations that the disclosure made herein is presented.

SUMMARY OF THE INVENTION

Technologies are presented herein in support of a system and method for determining an in-vehicle role of a user of a mobile device. According to one aspect, an in-vehicle determination system for adjusting an operation of a first mobile device is provided. The system includes a processor, a control circuit operatively connected to the processor, a memory operatively connected to the control circuit and accessible by the processor, and a determination module stored in the memory and executable in the processor, and at least one of: a user interface stored in the memory and executing in the processor, an operating system stored in the memory and executing in the processor, an accelerometer operatively connected to the control circuit, a gyroscope operatively connected to the control circuit, a GPS receiver operatively connected to the control circuit, a microphone operatively connected to the control circuit, a magnetometer operatively connected to the control circuit, a camera operatively connected to the control circuit, a light sensor operatively connected to the control circuit, a temperature sensor operatively connected to the control circuit, an altitude sensor operatively connected to the control circuit, a pressure sensor operatively connected to the control circuit, a proximity sensor operatively connected to the control circuit, a near-field communication (NFC) device operatively connected to the control circuit, a compass operatively connected to the control circuit, and a communications interface operatively connected to the control circuit. The determination module, when executed by the processor, configures the control circuit to receive a first input from at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the first input originating from an identifying event perceptible to at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, analyze the first input with the determination module to identify one or more determination characteristics within the first input, and compute at least one determination factor based on the one or more determination characteristics, the at least one determination factor pertaining to at least one of (a) at least one aspect of the in-vehicle role of the user; and (b) at least one aspect of an in-vehicle location of the mobile device. The determination module further configures the control circuit to at least one of (a) transform at least one operation state of the first mobile device based on the at least one determination factor, (b) output at least one operation state based on the at least one determination factor, (c) output at least one in-vehicle role of the user based on at least one determination factor, (d) output at least one in-vehicle location of the mobile device based on at least one determination factor, and (e) output at least one result based on the at least one determination factor.

According to another aspect, a computer-implemented method for determining at least one of (a) an in-vehicle role of a user; and (b) an in-vehicle location of a first mobile device is provided, the first mobile device having a processor, a memory, a determination module stored in the memory and executable by the processor, and at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes receiving a first input from at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the first input originating from one or more identifying events perceptible to at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, analyzing the first input with the determination module executing at the processor to identify one or more determination characteristics within the first input, and computing at least one determination factor based on the one or more determination characteristics, the at least one determination factor pertaining to at least one of (a) at least one aspect of the in-vehicle role of the user; and (b) at least one aspect of an in-vehicle location of the mobile device. The method further includes at least one of (a) transforming at least one operation state of the first mobile device based on the at least one determination factor, (b) outputting at least one operation state based on the at least one determination factor, (c) outputting at least one in-vehicle role of the user based on at least one determination factor; (d) outputting at least one in-vehicle location of the mobile device based on at least one determination factor and (e) outputting at least one result based on the at least one determination factor.

According to another aspect, a computer-implemented method for determining at least one of (a) an in-vehicle role of a user of a first mobile device (b) an in-vehicle location of a first mobile device, (c) a handheld state of the first mobile device, and (d) one or more characteristics of the first mobile device is provided, the first mobile device having a processor, a memory, and a determination module stored in the memory and executable by the processor, and at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes receiving at least a first input from at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the first input originating from an identifying event perceptible to at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, analyzing at least the first input with the determination module executing at the processor to identify at least one of one or more determination characteristics and one or more handheld state characteristics within the first input, and computing at least one determination factor based on at least one of the at least one of one or more determination characteristics and one or more handheld state characteristics, the at least one determination factor pertaining to at least one of (a) at least one aspect of the in-vehicle role of the user, (b) at least one aspect of an in-vehicle location of the mobile device, and (c) at least one aspect of the handheld state of the mobile device. The method further includes at least one of (a) modifying at least one operation state, (b) outputting at least one operation state, (c) outputting at least one in-vehicle role of the user, (d) outputting at least one in-vehicle location, (e) outputting one or more results, and (f) outputting the handheld state, of the first mobile device based on the at least one determination factor.

According to another aspect, a computer-implemented method for determining a vehicle class of a vehicle using a first mobile device is provided, the first mobile device having a processor, a memory, a determination module stored in the memory and executable by the processor, and at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes receiving a first input from at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the first input originating from one or more identifying events perceptible to at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, analyzing the first input with the determination module executing at the processor to identify one or more vehicle determination characteristics within the first input, and computing at least one determination factor based on the one or more vehicle determination characteristics. The method further includes outputting the vehicle class based on the at least one determination factor.

According to another aspect, a computer-implemented method for determining a handheld state of a first mobile device is provided, the first mobile device having a processor, a memory, a determination module stored in the memory and executable by the processor, and at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes receiving a first input from at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the first input originating from one or more identifying events perceptible to at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, analyzing the first input with the determination module executing at the processor to identify one or more handheld state characteristics within the first input, and computing at least one determination factor based on the one or more handheld state characteristics. The method further includes outputting the handheld state based on the at least one determination factor.

According to another aspect, a computer-implemented method for determining at least one of an in-vehicle role of a user of a first mobile device, an in-vehicle location or the first mobile device, a handheld state of the first mobile device, and a vehicle class of a vehicle containing the first mobile device, using a central machine is provided, the central machine having a processor, a memory, and a determination module stored in the memory and executable by the processor, the central machine further being communicatively coordinated with the first mobile device, and the first mobile device having at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes receiving at least a first notification from the first mobile device of a first input from at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the first input originating from an identifying event perceptible to at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, analyzing at least the first notification with the determination module executing at the processor to identify at least one of one or more determination characteristics, one or more handheld state characteristics and one or more vehicle determination characteristics within the first notification, and computing at least one determination factor based on the at least one of the one or more determination characteristics, the one or more handheld state characteristics and the one or more vehicle determination characteristics, the at least one determination factor pertaining to at least one of (a) the in-vehicle role of the user (b) the in-vehicle location, (c) the handheld state of the first mobile device, and (d) a vehicle class. The method further includes at least one of (a) outputting one or more results, (b) outputting at least one operation state of the first mobile device, and (c) adjusting at least one operation state of the first mobile device at at least one of the central machine and the mobile device, based on the at least one determination factor.

According to another aspect, a computer-implemented method for modifying at least a feature of a first mobile device is provided, the first mobile device having a processor, a memory, a determination module stored in the memory and executable by the processor, and at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes monitoring at least a first input provided by at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, defining an operation signature based on at least the first input provided by at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the operation signature reflecting a normal operation state of the first mobile device, further monitoring at least a second input provided by at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, and processing at least the second input against the operation signature to identify a degree of deviation of the second input from the operation signature or a degree of correlation of the second input with the operation signature. The method further includes adjusting at least one operation state of the mobile device based on the degree of deviation or the degree of correlation.

According to another aspect, a computer-implemented method for restricting operation of a mobile device is provided, the mobile device having a processor, a memory, a restriction module stored in the memory and executable by the processor, and at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes at least one of (i) employing one or more restrictions at the mobile device, and (ii) employing one or more restrictions in relation to the mobile device; at least one of the restrictions dictating at least one operation state of the mobile device, receiving at least a first input and a second input, each of the first input and the second input originating at at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the mobile device, and analyzing the first input and the second input to determine a presence of at least one of (a) two or more users and (b) two or more mobile devices. The method further modifying an employment of the at least one restriction includes based on a determination of the presence of at least one of (a) two or more users; (b) two or more mobile devices.

According to another aspect, a computer-implemented method for restricting operation of a mobile device is provided, the mobile device having a processor, a memory, a restriction module stored in the memory and executable by the processor. The method includes at least one of: (i) employing one or more restrictions at the mobile device, and (ii) employing one or more restrictions in relation to the mobile device; at least one of the restrictions dictating at least one operation state of the mobile device, wherein at least one restriction is configured to at least one of: (i) impede operation of the mobile device by a user that is a driver moreso than the at least one restriction impedes operation of the mobile device by a user that is a passenger, and (ii) at least one of (a) impede operation of the mobile device, and (b) be more likely to be applied to a mobile device used by a driver than to a mobile device used by a passenger.

According to another aspect, a computer implemented method for restricting operation of a first mobile device is provided. The method includes the steps of: (I) At least one of: (a) determining that the first mobile device is present within a vehicle and (b) receiving one or more first inputs from at least one of a vehicle data system and at least one of a second mobile device, the one or more first inputs pertaining to a presence of the first mobile device within a vehicle. The method further includes (II) at least one of: at least one of: (i) prompting at least one user to provide one or more stimuli and (ii) receiving one or more second inputs in response to the prompting; (b) receiving one or more third inputs from the vehicle data system; and (c) receiving one or more fourth inputs from at least one of the second mobile device. The method further includes (III) analyzing at least one of the first inputs, the second inputs, the third inputs, and the fourth inputs to determine a presence of at least one of: (a) more than one user, (b) more than one mobile device, and (c) one or more users not in the set of users known to be users of the first mobile device. The method further includes employing one or more restrictions at the first mobile device (IV) based on a determination of the presence of at least one of (a) fewer than two users, (b) fewer than two mobile devices, and (c) fewer than one user not in the set of users known to be users of the first mobile device.

According to another aspect, a computer implemented method for restricting operation of a first mobile device is provided. The method includes employing at least one restriction at the first mobile device, receiving one or more inputs from at least one of (a) the first mobile device; (b) a vehicle data system; and (c) at least a second mobile device; and analyzing the one or more inputs to determine a presence of one or more users that are not known users of the first mobile device. The method further includes modifying an employment of the at least one restriction based on a determination of the presence of one or more users that are not known users of the first mobile device.

According to another aspect, a computer-implemented method for restricting operation of a mobile device using a central machine is provided, the central machine, having a processor, a memory, and a restriction module stored in the memory and executable by the processor, the central machine further being communicatively coordinated with the mobile device, the mobile device having at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes at least one of: (i) employing one or more restrictions at the mobile device using the central machine, and (ii) employing one or more restrictions in relation to the mobile device using the central machine; at least one of the restrictions dictating at least one operation state of the mobile device, receiving at least a first input and a second input from the mobile device, each of the first input and the second input originating at at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the mobile device, and analyzing the first input and the second input to determine a presence of at least one of (a) two or more users and (b) two or more mobile devices. The method further includes based modifying an employment of the at least one restriction on a determination of the presence of at least one of (a) two or more users; (b) two or more mobile devices.

According to another aspect, a computer-implemented method for restricting operation of a mobile device using a central machine is provided, the central machine having a processor, a memory, a restriction module stored in the memory and executable by the processor, and the central machine further being communicatively coordinated with the mobile device. The method includes at least one of: (i) employing one or more restrictions at the mobile device using the central machine; and (ii) employing one or more restrictions in relation to the mobile device using the central machine, at least one of the restrictions dictating at least one operation state of the mobile device, wherein at least one restriction is configured to at least one of: (i) impede operation of the mobile device by a user that is a driver moreso than the at least one restriction impedes operation of the mobile device by a user that is a passenger, and (ii) at least one of (a) impede operation of the mobile device, and (b) be more likely to be applied to a mobile device used by a driver than to a mobile device used by a passenger.

According to another aspect, a computer-implemented method for determining an in-vehicle role of a user of a first mobile device is provided, the first mobile device having a processor, a memory, a determination module stored in the memory and executable by the processor, and at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes receiving a first input from at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, the first input originating from one or more identifying events perceptible to at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the first mobile device, analyzing the first input with the determination module executing at the processor to identify one or more determination characteristics within the first input, and computing at least one of a probability that the in-vehicle role of at least the user of the first mobile device is a driver and a probability that the in-vehicle role of at least the user of the first mobile device is a passenger based on the one or more determination characteristics. The method further includes transforming at least one operation state of the first mobile device based on the probability.

According to another aspect, a computer implemented method for orienting a coordinate system of a mobile device is provided, the mobile device having at least one of a user interface, an operating system, an accelerometer, a gyroscope, a GPS receiver, a microphone, a magnetometer, a camera, a light sensor, a temperature sensor, an altitude sensor, a pressure sensor, a proximity sensor, a near-field communication (NFC) device, a compass, and a communications interface. The method includes receiving at least one input from (i) at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the mobile device; and (ii) a vehicle data system, computing, based on the one or more inputs, an orientation of the mobile device relative to a coordinate system of a vehicle, and based on the orientation, at least one of: (i) interpreting one or more subsequent inputs of the mobile device in relation to the coordinate system of the vehicle; and (ii) transforming the one or more subsequent inputs originating at the first device into values that are comparable with the coordinate system of the vehicle.

These and other aspects, features, and advantages can be appreciated from the accompanying description of certain embodiments of the invention and the accompanying drawing figures.

BRIEF DESCRIPTION OF THE DRAWINGS

FIG. 9A is a diagram depicting an exemplary relative coordinate system of a mobile device;

FIG. 10 is a diagram depicting an exemplary coordinate system used in relation to a vehicle;

FIGS. 11A-B are diagrams depicting a mobile device and its respective exemplary coordinate system in various orientations in relation to a car and its exemplary respective coordinate system;

DETAILED DESCRIPTION OF CERTAIN EMBODIMENTS OF THE INVENTION

Figure 1:
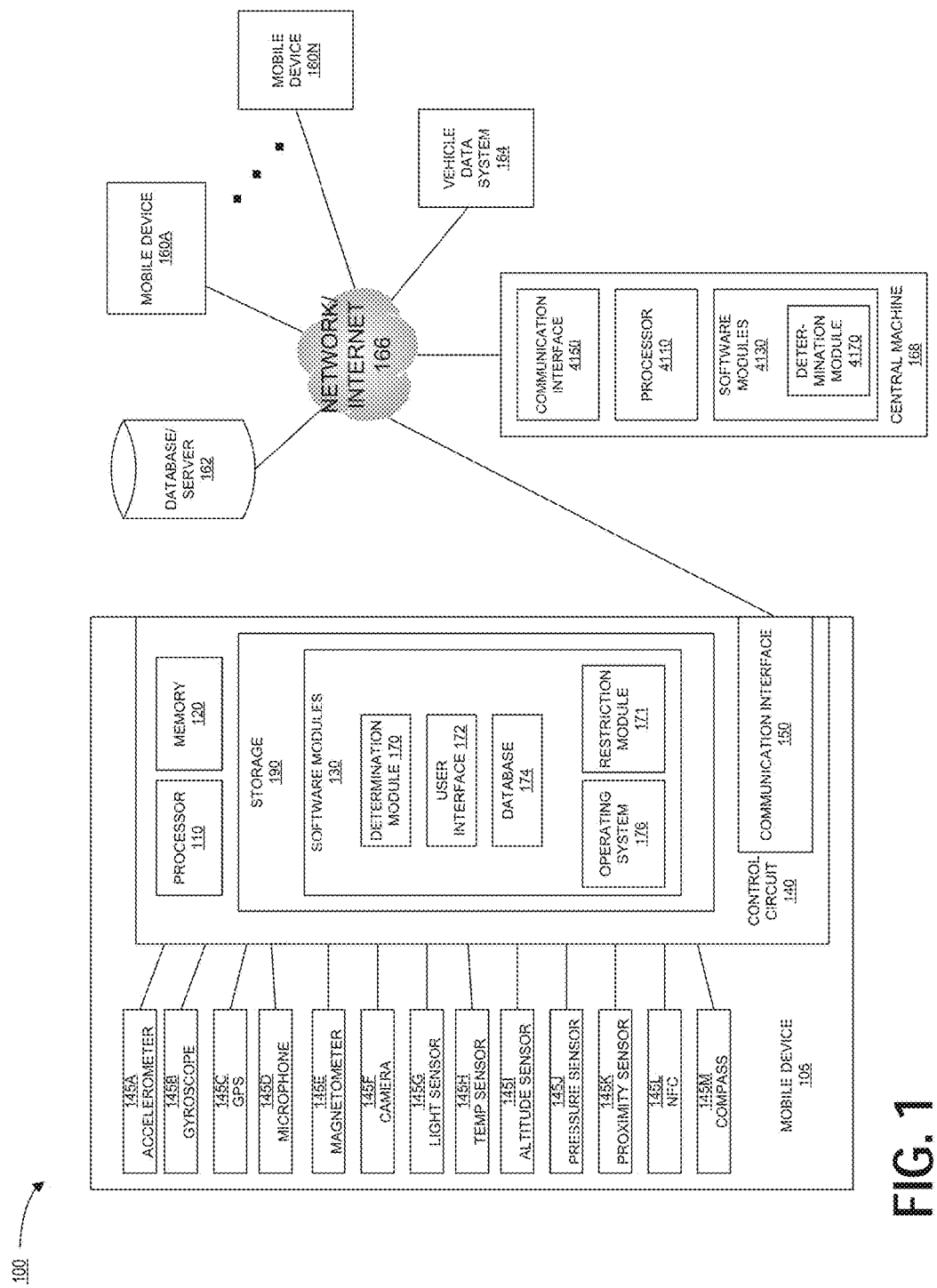
FIG. 1 is a high-level diagram illustrating an exemplary configuration of an in-vehicle determination system.

By way of overview and introduction, the present disclosure details systems and methods for determining various user roles and actions as they relate to the operation of a mobile device within a vehicle such as a car. Being that the usage of mobile devices while driving has been identified as a significant cause of car accidents, in addition to laws that have been enacted preventing certain use of mobile phones while driving, various systems and methods are provided herein which serve to identify the user of a particular mobile device (for instance, with respect to their role as a driver or passenger in the car), to identify various aspects of the usage of the device itself (for instance that the device is executing a text messaging application), and to identify instances when a mobile device deviates from its expected or regular operation.

As will be described in detail herein, many of these identifications and/or determinations are made possible through various sensors, components, and elements that are integrated within and/or accessible to a mobile device. As is well known to those of ordinary skill in the art, contemporary smartphones incorporate a plethora of sensors, including accelerometers, GPS receivers, and gyroscopes. Various inputs and/or notifications can be received from these sensors, components, and elements, and can further be processed in a number of ways in order to arrive at various conclusions regarding, among others, the user of the mobile device (such as whether the user is a driver or passenger in a car) and/or the status of the mobile device itself, and various probabilities can be ascribed to the conclusions. The operation of the mobile device can further be adjusted based on such conclusions, for example, disabling or limiting the operation of a mobile device upon reaching a likely conclusion that the device is being operated by a user who is driving a car.

It will also be appreciated that the systems and methods disclosed herein can be arranged and/or deployed across a number of scenarios. In one scenario, the systems and methods can be principally employed at a mobile device itself, such as in the form of a mobile application or 'app' executing on the mobile device. In other scenarios, a central machine such as a server in communication with a mobile device can employ the present systems and methods. Such a centralized architecture can enable efficient processing and use of a larger database of user determination characteristics, eliminates power constraints and enables third parties, such as law-enforcement agencies and/or insurance companies, to easily monitor and/or adjust the operation of various mobile devices.

The following detailed description is directed to systems and methods for determining an in-vehicle role of a user of a mobile device. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.) or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

The terms "determining," "determine," and "determination" as used herein are intended to encompass the determination, identification, and/or selection, with any degree of certainty or precision, and/or any other such operation, function, or action as it relates to the determination, identification, and/or selection of a user of a device such as a mobile device, an in-vehicle role of a user of a device such as a mobile device, a vehicle or vehicle model/type/class, a device or device model/type/class (e.g., handheld or wired), or any other such similar or related operation, function, or action.

The terms "identifying event" and "identifying events" as used herein are intended to encompass one or more occurrences or instances of events, stimuli, or phenomena, including explicitly the perceived coordinated or correlated occurrence or instance of two or more such events, stimuli, and/or phenomena, such as those originating at one or more devices. It should be understood that the referenced occurrences or instances of events, stimuli, or phenomena include single/singular events, stimuli, or phenomena as well as a set or series of multiple events, stimuli, or phenomena over a period of time. In addition, the referenced occurrences or instances of events, stimuli, or phenomena should also be understood to include one or more coordinations or correlations of the occurrence or instance of any number of such events, stimuli, and/or phenomena over any period of time.

The terms "user interface" and "user interfaces" as used herein are intended to encompass one or more input devices, software modules executing in conjunction with one or more operating systems and/or input devices, or any other such similar or related device, accessory, apparatus, and/or software application or module that enable or facilitate input and/or interaction with a computing device.

The terms "detect," "detected," "detects," "detecting," "detection," and "detections" as used herein are intended to encompass the detection, measurement, and/or receipt, with any degree of certainty or precision, one or more occurrences or instances of events, stimuli, phenomena, or any other such similar or related inputs that are detectable through one or more devices, implements or apparatuses.

The term "processing" as used herein is intended to encompass comparing, analyzing, weighing, correlating and/or computing one or more data items, elements, or structures, individually or in conjunction with one another, using a digital processor in conjunction with one or more software modules and/or applications.

The term "communicatively coordinated" as used herein is intended to encompass direct or indirect communication between two or more devices, accessories, and/or apparatuses, expressly including communications between a first device and a central machine, wherein the central machine is in turn in communication at some interval with a second device. In such a scenario, though the first device and the second device are not, necessarily, in direct or indirect communication with one another, it can be said that they are communicatively coordinated with one another by virtue of their mutual connection to the referenced central machine.

The terms "feature" and "features" as used herein are intended to encompass operations, functions, activities, or any other such similar or related actions, whether automated/automatic or user-initiated, that occur at or in conjunction with one or more devices, machines, applications, and/or apparatuses.

The terms "notification" and "notifications" as used herein are intended to encompass one or more messages, transmissions, and/or data packets, such as electronic messages, which contain one or more data elements (such as inputs) related or relevant to one or more of the steps, operations, and/or processes disclosed herein. An illustration of one such notification can be one or more electronic messages which contain information or data reflecting a first input from an accelerometer, a gyroscope, and/or a GPS receiver at a mobile device. Such inputs can be grouped together into one or more notifications, and these notifications can in turn be transmitted to and/or received by other devices (such as a central machine) where they can be further processed.

The terms "vehicle class" and "vehicle classes" as used herein are intended to encompass one or more types, categories, and/or models of vehicle. By way of example, airplanes, trains, automobiles, motorcycles, and boats can all be said to be different vehicle classes. By way of further example, sub-categories within a given vehicle class can also be understood to be different vehicle classes. Thus, the automobile vehicle class can be further sub-divided into further vehicle classes such as sedans, vans, sport utility vehicles (SUVs), and convertibles. These sub-categories can also be said to be vehicle classes within the meaning of the term as used herein.

The terms "operation state" and "operation states" as used herein are intended to encompass the states of a device, including any and all operations, functions, capacities, and/or capabilities, including, explicitly, a set and/or series of any number of operations, functions, capacities, and/or capabilities, that can be achieved by and/or in conjunction with a device, such as a mobile device. Examples of an operation state include, but are not limited to: an execution of an application (such as an internet browser application) at a mobile device, a transmission of a notification (such as sending a text message or email message), a capacity to receive text messages, and a capability to type text using a keyboard. Accordingly, the various transformations, adjustments, and/or modifications disclosed herein that relate to an operation state and/or operation states should be understood to refer to such transformations, adjustments, and/or modifications that pertain to practically any and all operations, functions, capacities, and/or capabilities that can be achieved by and/or in conjunction with a device, such as a mobile device.

The terms "handheld state" and "handheld states" as used herein are intended to encompass one or more states of a mobile device with respect to whether or not a user is in direct or indirect physical contact with the device. For example, the handheld state of a device in instances where a user holds the device in his/her hand, carries the device in his/her pocket, and/or balances the device on his/her knee can all be said to be "handheld." By way of further example, the handheld state of a device in instances where the device is positioned in a dock or cradle, and/or is otherwise not in direct or indirect contact with a user can be said to be "non-handheld."

The terms "operational capacity" and "operational capacities" as used herein are intended to encompass one or more operation states of a mobile device, particularly with respect to a central machine such as a server. By way of example, an operational capacity of a mobile device can be a voice or data connection that is provided to a mobile device through a central machine, such as that of a voice/data service provider. Accordingly, it can be appreciated that a transformation, modification, and/or adjustment of such an operational capacity preferably entails such a transformation, modification, and/or adjustment that is initiated and/or effected by a central machine, preferably in relation to a mobile device. For example, a central machine can transmit an instruction and/or notification to a mobile device, such instruction/notification directing the transformation, modification, and/or adjustment be implemented at the mobile device. By way of further example, a central machine can implement a transformation, modification, and/or adjustment at the central machine itself, wherein such a transformation, modification, and/or adjustment—such as the stopping of voice and/or data connections to a mobile device—ultimately effect the functionality of the device itself. In both such cases it can be said that the central machine has transformed, modified, and/or adjusted the operational capacity of the mobile device.

The terms "user" and "users" as used herein are intended to encompass one or more individuals, persons, and/or entities whose presence a device or machine can preferably be directly or indirectly aware. It should be understood that while in certain scenarios a user can interact with a device, in other scenarios a particular individual, person, and/or entity can be said to be a "user" within the context of the present disclosure, despite not interacting with a particular device.

It should be further understood that while the various computing devices and machines referenced herein, including but not limited to the first mobile device, the second mobile device, the central machine, or any other such similar or related devices or machines are referred to herein in a as individual/single devices and/or machines, in certain arrangements the referenced devices and machines, and their associated and/or accompanying operations, features, and/or functionalities can be arranged or otherwise employed across any number of devices and/or machines, such as over a network connection, as is known to those of skill in the art.

In addition, it should be understood that while the term "input" is used herein in the singular form, this is merely for the sake of clarity and convention. However, the referenced terms should be understood to encompass both singular inputs as well as a plurality (two or more) inputs, such as a set of inputs.

It should be understood that the terms "lateral acceleration," "x-acceleration," and "x-axis acceleration" as used herein are used interchangeably, and should thus be understood to possess the same meaning and connotation. Additionally, the terms "forward acceleration," "y-acceleration," and "y-axis acceleration" as used herein are used interchangeably and should thus be understood to possess the same meaning and connotation. In addition, the terms "upward acceleration," "z-axis acceleration," "z-acceleration" as used herein are used interchangeably and should thus be understood to possess the same meaning and connotation.

It should also be understood that the terms "yaw," "gyroscopic yaw," "angular velocity around the z-axis," and "rotation around the z-axis" as used herein are used interchangeably, and should thus be understood to possess the same meaning and connotation. In addition, the terms "roll," "gyroscopic roll," "angular velocity around the y-axis," and "rotation around the y-axis," as used herein are used interchangeably, and should thus be understood to possess the same meaning and connotation. Additionally, the terms "pitch," "gyroscopic pitch," "angular velocity around the x-axis," and "rotation around the x-axis" as used herein are used interchangeably, and should thus be understood to possess the same meaning and connotation.

An exemplary computer system is shown as a block diagram in FIG. 1 which is a high-level diagram illustrating an exemplary configuration of an in-vehicle user-role determination system 100. In one arrangement, mobile device 105 can be a portable computing device such as a mobile phone, smartphone, or PDA. In other arrangements, mobile device 105 can be a tablet computer, a laptop computer, a personal computer, or an in-vehicle computer (e.g., ECU/OBD) though it should be understood that mobile device 105 of in-vehicle user-role determination system 100 can be practically any computing device capable of embodying the systems and/or methods described herein.

Mobile device 105 of in-vehicle user-role determination system 100 includes a control circuit 140 which is operatively connected to various hardware and software components that serve to enable operation of the in-vehicle user-role determination system 100. The control circuit 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices. For example, storage 190 can be a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++ or the like and conventional procedural programming languages, such as the "C" programming language or similar programming languages. The program code can execute entirely on the mobile device 105, partly on mobile device 105, as a stand-alone software package, partly on mobile device 105 and partly on a remote computer/device or entirely on the remote computer/device or server. In the latter scenario, the remote computer can be connected to mobile device 105 through any type of network, including a local area network (LAN) or a wide area network (WAN), or the connection can be made to an external computer (for example, through the Internet using an Internet Service Provider).

Software modules 130, including program code/instructions, are located in a functional form on one or more computer readable storage devices (such as memory 120 and/or storage 190) that can be selectively removable. The software modules 130 can be loaded onto or transferred to mobile 105 for execution by processor 110. It can also be said that the program code of software modules 130 and one or more computer readable storage devices (such as memory 120 and/or storage 190) form a computer program product.

It should be understood that in some illustrative embodiments, one or more of software modules 130 can be downloaded over a network to storage 190 from another device or system via communication interface 150 for use within in-vehicle user-role determination system 100. For instance, program code stored in a computer readable storage device in a server can be downloaded over a network from the server to in-vehicle user-role determination system 100.

Preferably, included among the software modules 130 is a determination module 170 that is executed by processor 110. During execution of the software modules 130, and specifically the determination module 170, the processor 110 configures the control circuit 140 to determine an in-vehicle role of a user of the mobile device 105, as will be described in greater detail below. It should be understood that while software modules 130 and/or determination module 170 can be embodied in any number of computer executable formats, preferably software modules 130 and/or determination module 170 comprise one or more applications or 'apps' that are configured to be executed at mobile device 105 and/or in relation to mobile device 105. In other arrangements, software modules 130 and/or determination module 170 are incorporated and/or integrated within operating system 176. Furthermore, in certain arrangements, software modules 130 and/or determination module 170 can be configured to execute at the request or selection of a user of mobile device 105 (or any other such user having the ability to execute a program in relation to mobile device 105, such as a network administrator), while in other arrangements mobile device 105 can be configured to automatically execute software modules 130 and/or determination module 170, without requiring an affirmative request to execute. The advantages of such an automatic arrangement can be appreciated in context of a regulatory scheme that mandates or recommends that software modules 130 and/or determination module 170 be executed by a mobile device 105 some or all of the time, in furtherance of a campaign to improve driver safety. It should also be noted that while FIG. 1 depicts memory 120 oriented on control circuit 140, in an alternate arrangement, memory 120 can be operatively connected to the control circuit 140. In addition, it should be noted that other software modules (such as user interface 172 and operating system 176) and other information and/or data relevant to the operation of the present systems and methods (such as database 174) can also be stored on storage 190, as will be discussed in greater detail below.

A communication interface 150 is also operatively connected to control circuit 140. Communication interface 150 can be any interface that enables communication between the mobile device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, or any other such interfaces for connecting mobile device 105 to other computing devices and/or communication networks such as the Internet. Such connections can include a wired connection or a wireless connection (e.g. 802.11) though it should be understood that communication interface 150 can be practically any interface that enables communication to/from the control circuit 140.

At various points during the operation of in-vehicle user-role determination system 100, mobile device 105 can communicate with one or more mobile devices 160A-N (collectively mobile devices 160). The mobile devices 160 transmit and/or receive data to/from the mobile device 105, thereby preferably enhancing the operation of the in-vehicle user-role determination system 100, as will be described in greater detail below. It should be understood that mobile devices 160 can be in direct communication with mobile device 105, indirect communication with mobile device 105, and/or can be communicatively coordinated with mobile device 105, as will be described in greater detail below. While mobile device 160 can be practically any device capable of communication with mobile machine 105, in the preferred embodiment mobile device 160 is a handheld/portable computer, smartphone, personal digital assistant (PDA), tablet computer, and/or any portable device that is capable of transmitting and receiving data to/from mobile device 105. It should also be appreciated that in many arrangements, mobile device 160 will be substantially identical, from a structural and functional perspective, to mobile device 105.

It should be noted that while the FIG. 1 depicts the in-vehicle user-role determination system 100 with respect to mobile device 160A and mobile device 160N, it should be understood that any number of mobile devices 160 can interact with in-vehicle user-role determination system 100 in the manner described herein.

Also preferably connected to and/or in communication with control circuit 140 are one or more sensors 145A-145M (generically sensors 145). Generally, sensors 145 are various components, devices, and/or receivers that are preferably incorporated within and/or in communication with mobile device 105. Sensors 145 preferably detect one or more stimuli, phenomena, or any other such inputs, as will be described in greater detail below. Examples of such sensors 145 include, but are not limited to, an accelerometer 145A, a gyroscope 145B, a GPS receiver 145C, a microphone 145D, a magnetometer 145E, a camera 145F, a light sensor 145G, a temperature sensor 145H, an altitude sensor 145I, a pressure sensor 145J, a proximity sensor 145K, a near-field communication (NFC) device 145L, and a compass 145M. As will be described in greater detail below, mobile device 105 can preferably receive one or more inputs from one or more sensors 145 in order to determine an in-vehicle role of a user of mobile device 105.

In certain arrangements, one or more external databases and/or servers 162 are also in communication with mobile device 105. As will be described in greater detail below, database/server 162 is preferably a computing and/or storage device, and/or a plurality of computing and/or storage devices, that contain(s) information, such as determination characteristics, that can be relevant to the determination of an in-vehicle role of a user of mobile device 105.

Additionally, in certain arrangements a vehicle data system 164, such as an on board diagnostic (OBD) computer or computing device (e.g., OBD-I, OBD-II), an engine control unit (ECU), a roll system, an airbag system, a seat-weight sensor system, a seat-belt sensor system, and/or an anti-lock braking system (ABS) can also be in communication with mobile device 105. Vehicle data system 164 preferably provides data and/or information from the vehicle itself that can also be relevant to various determinations disclosed herein, such as the determination of an in-vehicle role of a user of mobile device 105, as will be described in greater detail below.

At this juncture it should be noted that in certain arrangements, such as the one depicted in FIG. 1, mobile devices 160, database/server 162, and/or vehicle data system 164 can be in periodic or ongoing communication with mobile device 105 thorough a computer network such as the Internet 166. Although not depicted in FIG. 1, it should be understood that in certain other arrangements, mobile devices 160, database/server 162, and/or vehicle data system 164 can be in periodic or ongoing direct communication with mobile device 105, such as through communications interface 150, thus not requiring the presence of a network (such as the Internet 166) in order to initiate and maintain communications.

In the description that follows, certain embodiments and/or arrangements are described with reference to acts and symbolic representations of operations that are performed by one or more devices, such as the in-vehicle user-role determination system 100 of FIG. 1. As such, it will be understood that such acts and operations, which are at times referred to as being computer-executed, include the manipulation by the processor of the computer of electrical signals representing data in a structured form. This manipulation transforms the data and/or maintains them at locations in the memory system of the computer, which reconfigures and/or otherwise alters the operation of the computer in a manner understood by those skilled in the art. The data structures in which data is maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the in-vehicle user-role determination system 100. Other components shown in FIG. 1 can be varied from the illustrative examples shown. The different embodiments can be implemented using any hardware device or system capable of running program code. In another illustrative example, in-vehicle user-role determination system 100 can take the form of a hardware unit that has circuits that are manufactured or configured for a particular use. This type of hardware can perform operations without needing program code to be loaded into a memory from a computer readable storage device to be configured to perform the operations.

For example, mobile device 105 can take the form of a circuit system, an application specific integrated circuit (ASIC), a programmable logic device, or some other suitable type of hardware configured to perform a number of operations. With a programmable logic device, the device is configured to perform any number of operations. The device can be reconfigured at a later time or can be permanently configured to perform any number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, in-vehicle user-role determination system 100 and/or mobile device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system may be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

The operation of the in-vehicle user-role determination system 100 and the various elements and components described above will be further appreciated with reference to the method for determining an in-vehicle role of a user of a mobile device as described below, in conjunction with FIGS. 2A-2C.

Figure 2A:
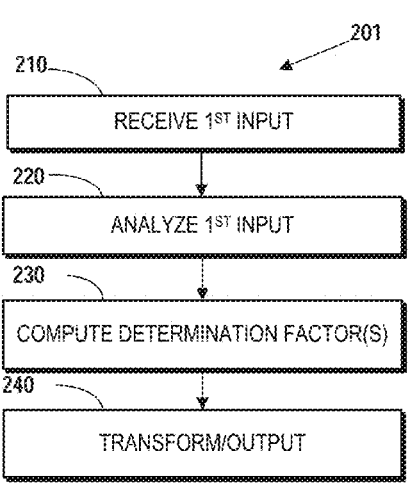
FIGS. 2A-2C are flow diagrams showing routines that illustrate broad aspects of methods for determining an in-vehicle role of a user and/or an in-vehicle location of a mobile device in accordance with various exemplary embodiments disclosed herein.

Turning now to FIG. 2A, a flow diagram is described showing a routine 201 that illustrates a broad aspect of a method for determining an in-vehicle role of a user of a mobile device 105 in accordance with at least one embodiment disclosed herein. It should be appreciated that several of the logical operations described herein are implemented (1) as a sequence of computer implemented acts or program modules running on in-vehicle user-role determination system 100 and/or (2) as interconnected machine logic circuits or circuit modules within the in-vehicle user-role determination system 100. The implementation is a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process begins at step 210 where processor 110 executing one or more of software modules 130, including, preferably, determination module 170, receives a first input, such as from one or more of sensors 145, software modules 130, user interface 172, operating system 176, and/or communication interface 150. Preferably, the first input originates from one or more identifying events that are perceptible to at least one of sensors 145, user interface 172, operating system 176, and/or communication interface 150. Examples of such an input include, but are not limited to, an acceleration input that originates from an acceleration event (e.g., the speeding up or slowing down of a car) that is perceived by accelerometer 145A, a change in geographic location input that originates from a location changing event (e.g., the movement from one place to another) that is perceived by GPS receiver 145C, and/or one or more instances or user interaction (e.g., typing) that are detected by user interface 172.

Then, at step 220, processor 110 executing one or more of software modules 130, including, preferably, determination module 170, analyzes at least the first input, such as to identify one or more determination characteristics within the first input, including but not limited to user determination characteristics. As will be described in greater detail below, user determination characteristics are one or more aspects originating at and/or derived from an input that provide insight regarding the in-vehicle role and/or identity of the user that is exerting control over and/or otherwise associated with a mobile device, such as mobile device 105. For example, where the first input (received at step 210) is the typing of one or more letters into user interface 172 (such as to compose a SMS message), determination module 170 can analyze the typing to identify one or more user determination characteristics (that is, characteristics that contribute to a determination of the identity of the particular user that is associated with mobile device 105, as will be described below). In this case, determination module 170 can analyze the typing patterns within the first input (such as the time interval in between the typing of individual letters in the SMS message, the average time interval in between the typing of individual letters in the SMS message, and/or the variability among one or more time intervals between the typing of individual letters in the SMS message). If there are substantial time intervals in between the typing of various letters, and/or if the time intervals in between typed letters vary widely, these factors can indicate that the user of mobile device 105 is likely distracted and thus unable to type consistently. Additional examples of analyzing an input to identify one or more determination characteristics are provided below in EXAMPLE 1.

Upon identifying one or more determination characteristics, such as user determination characteristics, based on the analysis of an input, at step 230 the processor 110 executing one or more of software modules 130, including, preferably, determination module 170, computes one or more determination factors (that is, factors that reflect and/or suggest one or more determinations that can be arrived at with respect to one or more of the mobile device, its location, the user, and/or the vehicle). By way of example, a probability can be computed, based on the user determination characteristics, that the in-vehicle role of the user of mobile device 105 is a driver and/or that the in-vehicle role of the user of the mobile device 105 is a passenger. That is, in certain arrangements the user determination characteristics identified at step 220 can provide varying degrees of certitude as to the identity or role of a user. So, continuing the example provided with regard to step 220, while, on the one hand, significant time intervals between typed letters can indicate that the in-vehicle role of the user is a driver, on the other hand if the time intervals in between the various letters are, on average, consistent and/or substantially similar this can indicate that the user is not necessarily distracted (due to being a driver), but rather is a passenger and is simply not adept at typing. Accordingly, in such a case, in one arrangement the computed probability for such user determination characteristic(s) is preferably a lesser degree of certainty that the user is a driver (and/or a passenger), accounting for the potentially conflicting indications from the various user determination characteristics. By way of further example, when the user determination characteristics indicate that a lesser degree of typing inconsistency and/or shorter intra-character time intervals exists, processor 110 executing software modules 130 preferably computes a probability that the in-vehicle role of the user of mobile device 105 is a passenger. Similarly, when a greater degree of typing inconsistency and/or longer intra-character time intervals exists, processor 110 executing software modules 130 preferably computes a probability that the in-vehicle role of the user of mobile device 105 is a driver (being that the user determination characteristics appear consistent with the activity of a driver within a vehicle). It should be appreciated that because ranges exist for a particular user determination characteristic (such as typing consistency), a probability of an in-vehicle role is preferably computed, reflecting a degree of certainty that the user of mobile device is a driver and/or that the user of mobile device is a passenger.

Then, at step 240, the processor 110 executing one or more of software modules 130, including, preferably, determination module 170, transforms an operation state of the mobile device 105 based on the determination factors (such as the probability computed at step 230), and/or outputs at least one operation state based on the at least one determination factor, and/or outputs at least one in-vehicle role of the user based on at least one determination factor, and/or outputs at least one in-vehicle location of the mobile device 105 based on at least one determination factor, and/or outputs at least one result based on the at least one determination factor. Various of these operations will be described in greater detail herein. For example, if the computed probability indicates that the in-vehicle role of a user of mobile device 105 is likely to be a driver, processor 110 can coordinate the disabling of one or more features of the mobile device 105, such as the disabling of any and/or all features that enable the entry of text into mobile device 105. In doing so, existing safety risks can be reduced by preventing a user who has been determined to be likely to be a driver of a vehicle from using various regular functions of mobile device 105 that are likely to distract the user and increase safety risks while driving and/or are restricted and/or prohibited based on the vehicle's current (or most recently known) location, as preferably determined in conjunction with GPS 145C. In other arrangements, one or more other transformations to the operation state of mobile device can be similarly applied based on the computed probability. For example, notifications (such as warning notifications) can be provided at the mobile device 105, notifications can be transmitted to third parties (notifying a third party, such as a law enforcement agency, of the in-vehicle role of the user of mobile device 105 and/or of the particular operation of the mobile device 105, such as that typing is being performed upon mobile device 105), instructions can be provided to third parties (such as a cellular service provider) to change an operation state of mobile device 105 (such as temporarily disabling the communication ability of mobile device 105), and/or one or more applications executing or executable on mobile device 105 can be disabled (such as a text messaging application).

At this juncture, it can be appreciated that the operations corresponding to transforming step 240 can be customized and/or configured in relation to various probabilities computed at step 230. That is, certain transformations of the operation state of mobile device 105 (for example, notifying law enforcement authorities) may only be appropriate when there is a high probability (such as greater than 90%) that the in-vehicle role of a user of mobile device 105 is a driver (and further that the driver is interacting with mobile device 105 in an illegal manner while driving), while other transformations may be appropriate even for lower degrees of probability (for example, it may be appropriate to provide a warning notification at mobile device 105 even for a 60% probability that the user is a driver). Yet other transformations can be employed preemptively, wherein the transformation is applied even before a prohibited interaction (e.g., typing into an SMS program) occurs, thereby avoiding restricted or prohibited interaction with mobile device 105, even at the first instance. Furthermore, as referenced above, in certain arrangements the user can configure how (that is, the type of transformation) and when (that is, the probability threshold that must be met in order to trigger the transformation) the operation of mobile device 105 is to be transformed. In other arrangements, a third party can establish such configurations. For example, a regulatory agency can dictate that one or more transformations be employed on some or all mobile devices when a particular probability threshold that a user of the device is a driver is met. By way of further example, a car insurance provider can provide incentives to its customers who utilize one or more transformations and/or probability thresholds suggested and/or dictated by the insurance company.

Figure 2C:
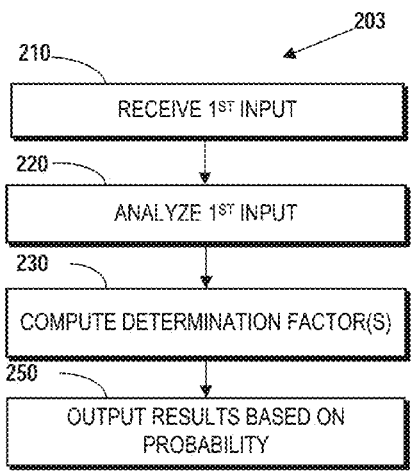
Figure 2B:
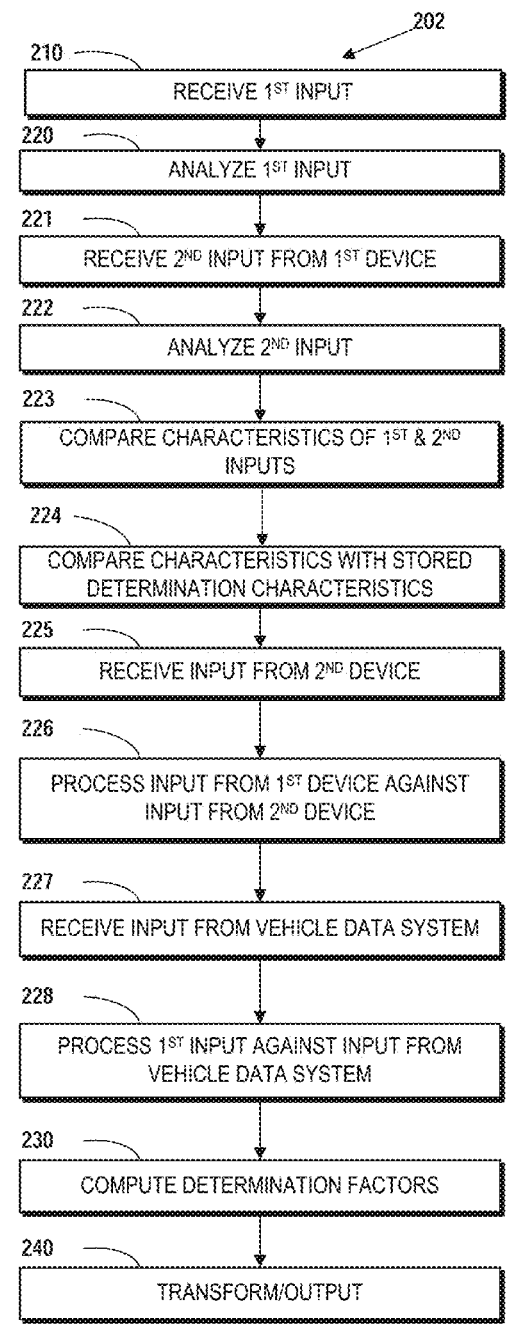

Turning now to FIG. 2B, a flow diagram is described showing a routine 202 that illustrates a further aspect of a method for determining an in-vehicle role of a user of a mobile device 105 in accordance with at least one embodiment disclosed herein. Though already noted above, it should be particularly appreciated with reference to FIG. 2B that more or fewer operations can be performed than shown in the figures and described herein, and that these operations can be performed in a different order than those described herein. Thus, in certain arrangements certain of the operations of FIG. 2B can be performed while others are not, and further that in certain arrangements can be performed in a sequence other than that depicted in FIG. 2B.

The process begins at step 210 where a first input of a first device 105 is received, and proceeds to step 220 where the first input is analyzed. Steps 210 and 220 have already been described above with reference to FIG. 2A and thus will not be further elaborated upon here as their operation is substantially identical to steps 210 and 220 described above.

Then, at step 221, processor 110 executing one or more of software modules 130, including, preferably, determination module 170, receives a second input from one or more of sensors 145, software modules 130, user interface 172, operating system 176, and/or communication interface 150. As described above with reference to step 210, examples of such an input include, but are not limited to, an input corresponding to an acceleration perceived by accelerometer 145A, and/or an input corresponding to a change in geographic location as perceived by GPS receiver 145C.

At step 222, the second input is analyzed by processor 110 executing determination module 170, in a manner substantially similar to that described above with reference to step 220, in order to identify one or more determination characteristics such as user determination characteristics within the second input. For example, where the second input (received at step 221) comprises one or more accelerations detected by accelerometer 145A, determination module 170 can analyze the accelerations to identify one or more user determination characteristics within the second input. Here, determination module 170 can analyze various patterns within the second input (such as the time and duration of acceleration and deceleration). Certain patterns, such as frequent periods of sustained forward acceleration interspersed with periodic intervals of rapid and/or brief forward deceleration can indicate that the user of mobile device 105 is likely traveling in, if not operating, a car which often follows such an acceleration/deceleration pattern. As described in detail herein, by identifying one or more user determination characteristics (such as identifying that the user of mobile device 105 is likely traveling in a car, as described above), the context and significance of one or more other user determination characteristics can be better evaluated and/or quantified. For example, the typing patterns of a user determined to be traveling in a moving car are, on average, of greater significance in determining whether the user of the device is a driver/passenger. On the other hand, the typing patterns of a user of a mobile device 105 that has been determined not to be traveling in a moving car can be understood to be, on average, of lesser significance in determining whether the user of the device is a driver/passenger.

Then, at step 223, the processor 110 executing one or more of software modules 130, including, preferably, determination module 170, can compare the determination characteristics such as user determination characteristics identified within the first input (such as those identified at step 220) with the determination characteristics such as user determination characteristics identified within the second input (such as those identified at step 222). In doing so, one or more patterns, correlations and/or relationships can be identified between the user determinations characteristics of the first input and the user determination characteristics of the second input. By way of illustration, referring to the examples discussed above, the typing patterns identified at step 220 can be compared with the acceleration/deceleration patterns identified at step 222. In doing so, patterns, correlations, and/or relationships between the typing patterns and acceleration/deceleration patterns can be identified. For example, if time intervals between typed characters and/or typing inconsistencies increase at the same time as substantial and/or sudden forward and/or lateral acceleration and/or deceleration, this can further indicate that the user of a mobile device 105 is a driver. Being that for a driver to engage in a maneuver with sudden acceleration and/or deceleration the driver is expected to have temporarily stopped typing due to the increased attention a driver must pay to his driving activities, if such accelerations correlate closely with inconsistent typing speeds and/or slower typing speed and/or such accelerations are just prior to typing delays, this can be a strong indication that the user of mobile device 105 is a driver.

Additional illustrations of scenarios and/or arrangements wherein multiple inputs are analyzed, compared, correlated, and/or processed in order to determine various aspects of the roles of one or more users of a mobile device 105, are provided throughout the present disclosure.

At step 224, the processor 110 executing one or more of software modules 130, including, preferably, determination module 170, compares determination characteristics such as user determination characteristics (including, but not limited to, the user determination characteristics from the first input, as identified at step 220, and/or the user determination characteristics from the second input, as identified at step 222) with stored determination characteristics such as user determination characteristics, such as those stored at one or more databases, such as database 174 (that is local to mobile device 105) and/or database/server 162 (that is external to mobile device 105). Stored user determination characteristics can be archived user determination characteristics that have been retained from previous user determinations that have been performed, can be generated based on statistical analyses of previous user determinations, and/or can be defined or established independent of any particular previous user determination. In comparing user determination characteristics (such as those identified at step 220 and/or step 222) with stored user determination characteristics (such as stored user determination characteristics that have historically demonstrated a high degree of prediction accuracy in determining an in-vehicle role of a user), the processor 110 can more accurately compute the probability that the in-vehicle role of the user of mobile device 105 is a driver or that the in-vehicle role of the user of mobile device 105 is a passenger. For instance, following the example referenced above with regard to typing inconsistencies, if certain typing patterns have historically been demonstrated as very reliable in determining the in-vehicle role, of the user, various identified user determination characteristics (such as those identified at step 220 and/or step 222) can be compared to such stored determination characteristics (e.g., highly predictive typing patterns). If the identified determination characteristics closely correlate to highly reliable/predictive stored determination characteristics, the identified determination characteristics can be similarly considered highly reliable and this correlation can further enhance the reliability of the computation of a probability regarding the in-vehicle role of a particular user. Additional examples and illustrations of such comparisons are provided below at EXAMPLE 1.

At step 225, processor 110 executing one or more of software modules 130, including, preferably, determination module 170, receives an input from another device, such as one of mobile devices 160. It should be understood that the input received from mobile device 160 is preferably from among the various types of inputs referenced above at steps 210 and 221 (for example, an acceleration input that originates from an acceleration event that is perceived by accelerometer 145A, and/or a change in geographic location input that originates from a location changing event that is perceived by GPS receiver 145C), and thus will not be described at length here. However, it should be appreciated that this input originates at mobile device 160 (that is, a device external to mobile device 105), and thus the input from mobile device 160 is preferably received by mobile device 105 through communication interface 150.

Then, at step 226, processor 110 executing one or more of software modules 130, including, preferably, determination module 170, processes an input of mobile device 105 against an input of one or more mobile devices 160. In doing so, one or more determination characteristics such as user determination characteristics can be identified within the input of the first mobile device 105. By way of example, various typing patterns and/or tendencies (referenced above) of mobile device 160 can be processed against similar typing patterns/tendencies of mobile device 105 (or, alternatively, various typing patterns and/or tendencies of mobile device 105 can be processed against similar typing patterns/tendencies of mobile device 160). In doing so, processor 110 can analyze and/or identify the degree to which the input from mobile device 105 deviates from the input received from mobile device(s) 160, in a manner similar to the comparison discussed above at step 224 (except that here the input of mobile device 105 is being processed against an input received from another mobile device 160, as opposed to comparing one user determination characteristic with stored characteristics). Thus, continuing with the provided example, in a case where the typing tendencies of mobile device 105 are relatively inconsistent, if, when processing the typing tendencies received from mobile device(s) 160 against those of mobile device 105 it is revealed that the typing across many or all of the devices 105 and 160 is similarly inconsistent, this can indicate that it there is not necessarily a high probability that the user of mobile device 105 is a driver, despite the inconsistent typing inputs received at the device 105 (rather, such inconsistent typing may be the result of the various devices 105 and 160 traveling along an off-road or bumpy road, which would make consistent typing difficult, even for passengers in a vehicle). Additionally, if the typing tendencies of mobile device 105 are relatively consistent, however when processing such input(s) against inputs from mobile device(s) 160 it is revealed that the typing tendencies of the user of mobile device 105 are actually relatively inconsistent, this can indicate a higher probability that the user of mobile device 105 is a driver of a vehicle (even though the input from mobile device 105, in-and-of-itself, may not have generated the same conclusion).

It should be noted that various limitations and/or filters can be imposed upon the receiving at step 225 and/or the processing at step 226, to ensure the most accurate results possible. That is, while in certain arrangements it can be beneficial to receive inputs from practically any mobile device 160 that is capable of communication with mobile device 105, in other arrangements it can be preferably to limit the number of devices and/or inputs that are received by mobile device 105 on the basis of one or more factors to ensure that the inputs being received by mobile device 105 from such external devices 160 are those that can be expected to be of greatest relevance. Examples of factors that can be considered in imposing such limitations and/or filters include proximity to mobile device 105 and/or similarity/compatibility with mobile device 105. To illustrate, in processing the typing tendencies of device 105 against those of another device 160, it can be preferable to ensure that device 160 is in close proximity to mobile device 105 (such as through a comparison of the location coordinates obtained from their respective GPS receivers or by causing one or more of the mobile devices to emit one or more tones and/or signals (e.g., an audio tone) that can then be received on other mobile devices that are in close proximity, as described in detail in EXAMPLE 2), thereby establishing a high likelihood that mobile device 105 and mobile device 160 are operating within the same vehicle (and are thus subjected to substantially identical conditions). To further illustrate, being that various mobile devices such as smartphones utilize different user interfaces and button configurations, it can be advantageous in certain arrangements to compare inputs from one mobile device 105 with those of another mobile device 160 that is either identical to or at least highly compatible with mobile device 105 (such as a device using the same operating system). Due to differences across various mobile devices and operating systems, ensuring that mobile device 105 and mobile device(s) 160 are similar (if not identical) ensures that the inputs received from each can be assumed to be highly comparable.

Additional examples of processing inputs from one device 105, 160 against those of one or more other devices to identify one or more determination characteristics are provided below in EXAMPLE 2.

In addition, in certain arrangements it is preferable that the inputs from mobile device 105 and those of mobile device 160 that are to be processed against one another/compared are substantially synchronized from a chronological standpoint. That is, it is preferable that each of the various inputs be associated with a particular time (and that the source of such time be a central clock, such as a server, which can synchronize the various devices, though it should be understood that in other arrangements one or more of devices 105, 160 can broadcast timing data that enables the calibration of the various devices), thereby enabling the processing of inputs from mobile device 105 with inputs from mobile device 160 that correspond to the same point in time. Doing so ensures that the various inputs being processed/compared are highly comparable, in that they reflect the operations of the various devices 105 and 160 in response to the same events (e.g, accelerating/decelerating over the course of a driver). Additional examples and illustrations of such further processing operations are provided below in EXAMPLE 3.

At step 227, processor 110 executing one or more of software modules 130, including, preferably, determination module 170, receives an input from vehicle data system 164, such as an on board diagnostic (OBD) computer or computing device (e.g., OBD-I, OBD-II, ECU, roll system, airbag system, and/or an ABS), preferably through communication interface 150. As noted above, vehicle data system 164 preferably provides data and/or information originating at the vehicle itself. For example, vehicle data system 164 can provide one or more inputs that reflect various actions or events, such as a car's acceleration and/or deceleration, steering, braking, and/or any other such car-related operations. Such inputs can provide further insight into determining the in-vehicle role of a user of mobile device 105, as will be described below.

Then, at step 228, processor 110 executing one or more of software modules 130, including, preferably, determination module 170, processes an input of mobile device 105 against an input of vehicle data system 164, in a manner similar to that described above with respect to step 226. However, here an input of mobile device 105, such as various typing tendencies (as illustrated above) is processed against an input from vehicle data system 164 that preferably pertains to an operation of a car (e.g., the car accelerating, braking, and/or swerving) and which is qualitatively different than the input of mobile device 105 because vehicle data system 164 cannot necessarily detect the various stimuli perceptible to mobile device 105, owing in part to the fact that mobile device 105 is preferably not fixed relative to the car's coordinate system. As such, the various inputs (that is, the inputs from mobile device 105 and those from vehicle data system 164) are compared and/or synchronized from a chronological standpoint, substantially in the manner described above with respect to step 226. In doing so, inputs from mobile device 105 can be processed against inputs from vehicle data system 164 (which, in turn, originate at the car itself), thereby enabling the association of various inputs from mobile device 105 with events such as the accelerating, braking, and/or swerving of the car. Thus, following the typing tendencies example provided, if certain highly erratic typing tendencies perceived at mobile device 160, occur just prior and/or closely correlate to various driving operations (reflected in the inputs from vehicle data system 164) such as accelerating, braking, and/or swerving, one or more user determination characteristics can be identified with regard to the input(s) from mobile device 105, indicating that there is a high likelihood that the in-vehicle role of the user of mobile device 105 is a driver.

At this juncture, it can be appreciated that although several sections of the forgoing disclosure have referenced the processing and/or comparison of various inputs against one another in context of inputs that are qualitatively comparable (such as at steps 224 and 226, above, referring to the comparison of typing tendencies from various sources), in other arrangements various inputs that are not necessarily qualitatively comparable (or, at least, do not appear to be qualitatively comparable). For example, in a manner similar to that described above with respect to step 223, an input of typing tendencies from one source (such as mobile device 105) can be compared with/analyzed against an input of accelerations/decelerations originating at mobile device 160. The respective inputs preferably have a timestamp to enable the chronological comparison between the inputs, as described in greater detail above with respect to step 226.

At step 230, processor 110 executing one or more of software modules 130, including, preferably, determination module 170, computes one or more determination factors, such as a probability, based on the various determination characteristics, that the in-vehicle role of the user of mobile device 105 is a driver and/or a probability that the in-vehicle role of the user of the mobile device 105 is a passenger, substantially in the manner described in detail above with regard to step 230. Then, at step 240, the processor 110 executing one or more of software modules 130, including, preferably, determination module 170, transforms an operation state of the mobile device 105 and/or outputs at least one operation state based on the at least one determination factor, and/or outputs at least one in-vehicle role of the user based on at least one determination factor, and/or outputs at least one in-vehicle location of the mobile device 105 based on at least one determination factor, and/or outputs at least one result based on the at least one determination factor, as also described in detail above.

Turning now to FIG. 2C, a flow diagram is described showing a routine 203 that illustrates a further aspect of a method for determining an in-vehicle role of a user of a mobile device 105 in accordance with at least one embodiment disclosed herein. The process begins at step 210 where an input is received from mobile device 105, and proceeds to step 220 where the first input is analyzed. At step 230, a determination factor such as a probability is computed, based on the various determination characteristics, as referenced above. Steps 210, 220, and 230 have already been described above with reference to FIG. 2A and thus will not be further elaborated upon here as their operation is substantially identical to steps 210, 220, and 230 described above.

Then, at step 250, processor 110 executing one or more of software modules 130, including, preferably, determination module 170, outputs one or more results based on the determination factor(s) computed at step 230. Such results can include, but are not limited to, one or more files, notifications, and/or communications that contain and/or reflect operations of the mobile device 105, and/or one or more operation states of the first mobile device 105, and the outputting of such results can be dependent upon a certain probability threshold, as described in detail herein. For example, in a scenario where mobile device 105 is configured to output results (such as that the in-vehicle role of a user is a driver/passenger) when the probability (that is, the reliability) of such results are greater than 75%, when mobile device 105 determines with a probability of 80% that the in-vehicle role of a user of mobile device 105 is a driver, a corresponding notification can be outputted reflecting such results. Thus, it can be appreciated that the referenced results can be output based on the calculated probability that the user of mobile device 105 is a driver or that the user of mobile device 105 is a passenger. It should be understood that the outputting referenced at this step can be employed in a number of ways depending on the particular arrangement. For example, in certain arrangements the referenced results can be transmitted to an external device or third-party, such as a law enforcement agency, insurance company, and/or other device 160 (for example, a parent receiving results from a child's device 105), via communication interface 150. It can be appreciated that, as referenced above with regard to step 240, the outputting of such results to a law enforcement agency, insurance company, and/or another device 160 can ensure that such entities are notified of the various operations and/or operation states of a particular mobile device 105, especially when it has been determined that it is highly probable that device 105 is being operated by a driver of a car. In another arrangement, such results can be outputted to mobile device 105 itself in any number of ways, such as by logging the operations and/or operation state(s) of mobile device 105 at times/intervals when it has been determined, for instance, that there is a high probability that the user of mobile device 105 is a driver. Irrespective of whether the results are output to a third-party or to the device 105 itself, it should be appreciated that the outputting of such results can provide insight regarding the operations of the mobile device 105 at a particular moment and/or interval, which can be utilized later, such as in investigating car accidents. For example, if a car accident occurs, a law-enforcement agency can review such outputted results to determine whether the driver was engaged in various distracting activities during and/or near the time of the accident (e.g., mobile device 105 was being used by driver with 93% certainty, was being used in a hand-held state with 94% certainty, and was being used for texting with 100% certainty at least 30 seconds prior to the crash). As such, it can be further appreciated in certain arrangements the various referenced results can be outputted across any and/or all degrees of probability, thereby ensuring a comprehensive log of a user results, reflecting the various operations and/or operation states throughout the course of operation of the mobile device 105.

Figure 3:
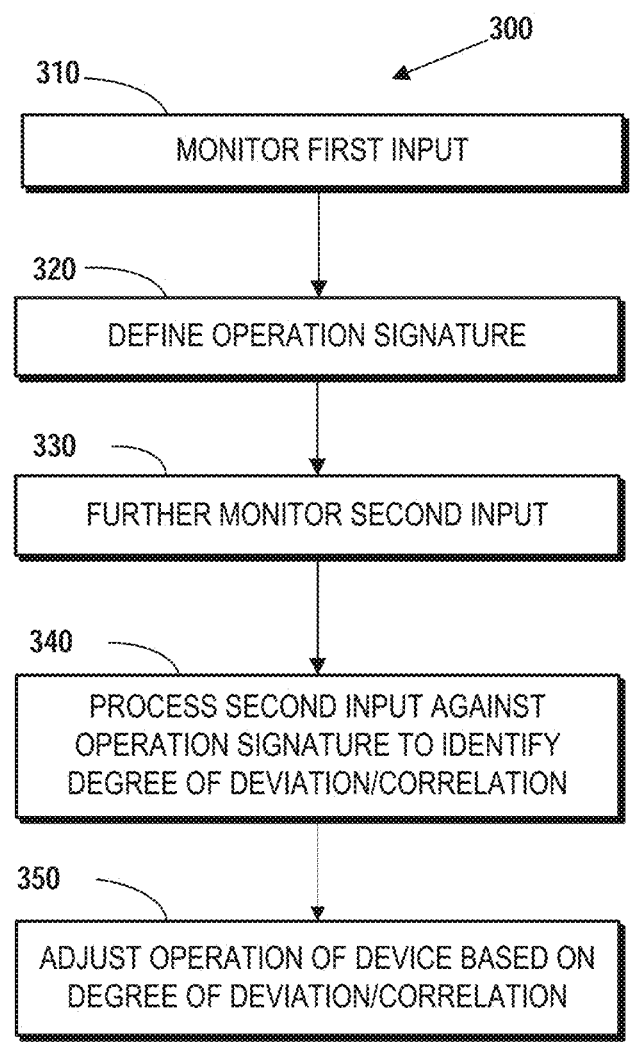
FIG. 3 is a flow diagram showing a routing that illustrates a broad aspect of a method for enabling, disabling and/or modifying at least a feature of a mobile device in accordance with at least one exemplary embodiment disclosed herein.

Turning now to FIG. 3, a flow diagram is described showing a routine 300 that illustrates an aspect of a method for enabling, disabling and/or modifying at least a feature of a mobile device 105 in accordance with at least one embodiment disclosed herein.

The process begins at step 310 where processor 110 executing one or more of software modules 130, including, preferably, determination module 170, monitors one or more inputs from one or more of sensors 145, software modules 130, user interface 172, operating system 176, and/or communication interface 150. As described in detail above with reference to step 210, examples of such inputs include, but are not limited to, an acceleration input, a geographic location input, and/or one or more instances or user interaction (e.g., typing).

Then, at step 320, processor 110 executing one or more of software modules 130, including, preferably, determination module 170 defines an operation signature based on the inputs monitored at step 310. The defined operation signature preferably reflects a normal operation state and/or a range of normal operation states of the mobile device 105. That is, based on the various inputs monitored at mobile device 105, over a defined time interval (for example, a day, a week, and/or a month) an operation signature or profile can be defined that reflects one or more values or ranges of values that have been identified as the normal or regular operation of the device 105, the normal or regular usage of the device 105 by a particular user, and/or the normal or regular usage of device 105 and/or a series or class of such devices by a particular user and/or a series or range of users. For example, after monitoring inputs from the accelerometer 145A of mobile device 105 for a period of time, a range of normal acceleration inputs of the device 105 can be determined. Similarly, upon monitoring inputs from the user interface 172 of mobile device 105, a range of normal typing tendencies (e.g., typing speeds, typing consistency, etc., as described herein) can be determined. These various inputs can be used to define an operation signature for the mobile device 105 that reflects the normal operation and/or operating range of the device 105. It should be appreciated that the referenced operation signature is not limited to a single input or type of input, but rather in certain arrangements can be made up of signatures of two or more types of inputs. For example, in one arrangement a normal operation signature can be made up of a range normal accelerometer inputs together with a range of normal typing tendencies.

At step 330, processor 110 executing one or more of software modules 130, including, preferably, determination module 170, further monitors one or more second inputs from one or more of sensors 145, software modules 130, user interface 172, operating system 176, and/or communication interface 150, substantially in the manner described above with respect to step 310.

Then, at step 340, processor 110 executing one or more of software modules 130, including, preferably, determination module 170, processes one or more of the second input(s) (monitored at step 330) against one or more of the operation signature(s) (defined at step 320). In doing so, processor 110 executing one or more of software modules 130, including, preferably, determination module 170, can identify a degree of deviation and/or a degree of correlation between the second input(s) and the operation signature(s). By way of example, various typing patterns and/or tendencies (referenced above) of mobile device 105 can be processed against an operation signature reflecting a range of normal typing tendencies of mobile device 105, as referenced above with respect to step 320 and described in detail herein. In doing so, processor 110 can analyze and/or identify the degree to which the one or more second input(s) (monitored at step 330) deviate from the operation signature of mobile device 105 (defined at step 320). Thus, continuing with the provided example, even in a case where the monitored typing tendencies of mobile device 105 are not necessarily highly inconsistent, from an objective standpoint, upon processing such inputs against an operation signature (such as an operation signature reflecting that the typing tendencies of the user of mobile device 105 are generally highly consistent/accurate), it can be revealed that the monitored typing tendencies/inputs actually deviate substantially from the mobile device's 105 operation signature. In this example, such a deviation from the operation signature (which reflects the normal and/or expected operation of mobile device 105) can indicate that the mobile device 105 is being operated under conditions that distract the user from interacting normally with the device 105, such as during driving. Similarly, in an alternative example, in a case where the monitored typing tendencies of mobile device 105 are relatively inconsistent, from an objective standpoint, upon processing such inputs against an operation signature (such as an operation signature reflecting that the typing tendencies of the user of mobile device 105 are also generally inconsistent, such as in the case of a new user who is not adept at typing), it can be revealed that the monitored typing tendencies/inputs (which otherwise reflect significantly inconsistent typing tendencies) actually correlate substantially with the mobile device's 105 operation signature. In such an example, the correlation with the operation signature (which reflects the normal and/or expected operation of mobile device 105) can indicate that the mobile device 105 is actually being operated under relatively normal/consistent conditions, and thus should not be assumed to be operated under distracting conditions, such as driving, as may have otherwise been concluded based on the inconsistent typing tendencies alone.

At this juncture, it should be noted that steps 310 and 320 can be repeated on a periodic and/or constant basis, in order to further refine the operation signature defined at step 320. That is, it can be appreciated that in certain scenarios a user's interaction with mobile device 105 can change and/or improve over time (such as in the case of a new user whose typing skills gradually improve with repeated use of device 105), and thus the operation signature of mobile device 105 should be adjusted, modified, and/or refined accordingly. It can be appreciated that this process can be achieved in any number of ways. In one arrangement, mobile device 105 can be configured to periodically reset its operation signature (such as every month), such that only recent operations are accounted for in defining the operation signature. In other arrangements, further inputs that are monitored can be factored into and/or averaged with previously monitored inputs, thereby updating an existing operation signature. In yet other arrangements, further inputs can be factored into and/or averaged with previously monitored inputs, and the more recent inputs can be weighted to place greater emphasis upon them, thereby updating an existing operation signature while accounting for the fact that more recent inputs are of greater value in defining an accurate operation signature of a mobile device 105.

At step 350, processor 110 executing one or more of software modules 130, including, preferably, determination module 170, adjusts one or more operations of mobile device 105. Preferably, this adjustment corresponds to the degree of deviation and/or the degree of correlation between one or more monitored inputs (such as the input monitored at step 330) and one or more operation signature(s) of mobile device 105 (such as the operation signature defined at step 320). It should be understood that in certain arrangements, this adjustment is similar to the transformation of the operation state of mobile device 105 discussed in detail above with respect to step 240, and/or the outputting of one or more results discussed in detail above with respect to step 250. For example, in certain arrangements, processor 110 can coordinate the disabling of one or more features of the mobile device 105, such as the disabling of any and/or all features that enable the entry of text into mobile device 105, while in other arrangements notifications (such as warning notifications) can be provided at or transmitted to mobile device 105. Various other examples of adjustments to one or more operations of mobile device 105 are described in greater detail above with reference to steps 240 and 250.

As also described in detail above with respect to step 240, it should be noted that various of the adjustments employed at step 350 can be customized and/or configured in relation to various degrees of correlation and/or deviation identified at step 340. Thus, it can be appreciated that certain adjustments of the operation of mobile device 105 (for example, notifying law enforcement authorities) may only be appropriate when a high degree of deviation from a normal operation state (that is, from the operation signature) is identified (and, preferably, further that such a deviation is indicative of restricted or prohibited activity on the part of the user of mobile device 105). Other adjustments, such as providing a notification at mobile device 105, may be appropriate even for lower degrees of correlation/deviation, as described in detail above.

Figure 4:
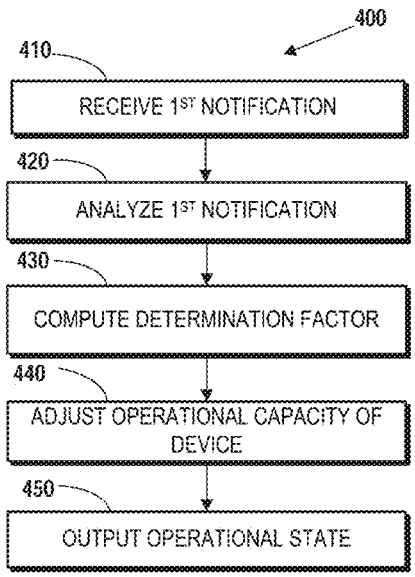
FIG. 4 is a flow diagram showing a routine that illustrates a broad aspect of a method for determining an in-vehicle role of a user of a mobile device and/or a handheld state of a mobile device and/or a vehicle class of a vehicle containing the first mobile device using a central machine in accordance with at least one exemplary embodiment disclosed herein.

Turning now to FIG. 4, a flow diagram is described showing a routine 400 that illustrates an aspect of a method of determining at least one of an in-vehicle role of a user of a first mobile device and/or a handheld state of the first mobile device and/or a vehicle class of a vehicle containing the first mobile device using a central machine in accordance with at least one embodiment disclosed herein. As will be described in greater detail below, various of the steps and operations that make up routine 400 share substantial similarities to those described above in connection with FIGS. 2A-C and 3. However, it should be understood that while FIGS. 2A-C and 3 principally concern determinations occurring at mobile device 105, routine 400 is primarily directed to determinations performed at central machine 168, as will be described in greater detail below. It should be further noted that, as described in greater detail below, while any one of the particular steps, operations, and/or functions are described throughout the present disclosure as being performed at and/or upon a particular machine or device (such as mobile device 105, mobile device 160, and/or central machine 168), such description should be understood as being exemplary and/or illustrative and not limiting. Accordingly, it can be appreciated that any and all steps, operations, and/or functions described herein with regard to a particular device and/or machine (such as central machine 168) should be similarly understood to be similarly capably of employment at another device and/or machine (such as mobile device 105), substantially in the manner described herein, without departing from the scope of the present disclosure.

The process begins at step 410 where processor 4110 of central machine 168 (depicted in FIG. 1) executing one or more of software modules 4130, including, preferably, determination module 4170, receives (preferably through communication interface 4150) a first notification from mobile device 105, the first notification preferably corresponding to an input originating from one or more of sensors 145, software modules 130, user interface 172, operating system 176, and/or communication interface 150 of mobile device 105. As described in detail above with respect to step 210, the first input originates from one or more identifying events that are perceptible to at least one of sensors 145, user interface 172, operating system 176, and/or communication interface 150 of mobile device 105, such as an acceleration input perceived by accelerometer 145A, a change in geographic location input perceived by GPS receiver 145C, and/or one or more instances or user interaction (e.g., typing) detected by user interface 172. A notification, such as a computer readable file containing information that reflects the input itself as well as information that is pertinent to the input (such as the time, date, and a unique identifier such as a MAC address of mobile device 105) is preferably generated by mobile device 105 based on the input, and is transmitted by communication interface 150 of mobile device 105 to central machine 168, preferably via communications network 166. As noted above, it should be recognized that while FIG. 1 depicts central machine 168 communicating with mobile device 105 via network/Internet 166, it should be understood that in other arrangements central machine 168 communicates with mobile device 105 directly, such as through a direct Bluetooth pairing and/or through an ah-hoc wireless network.

Then, at step 420, processor 4110 of central machine 168 executing one or more of software modules 4130, including, preferably, determination module 4170, analyzes at least the first notification to identify one or more determination characteristics, such as one or more of user determination characteristics and/or one or more handheld state characteristics and/or one or more vehicle determination characteristics within the notification. As described in detail above with respect to step 220, user determination characteristics are one or more aspects originating at and/or derived from one or more input(s) and/or notification(s) that provide insight regarding the in-vehicle role, and/or identity of the user that is exerting control over and/or otherwise associated with a mobile device, such as mobile device 105. Similarly, handheld state characteristics are one or more aspects originating at and/or derived from one or more input(s) and/or notification(s) that provide insight regarding the handheld state of a mobile device, such as mobile device 105, such as whether mobile device 105 is being operated by a user in a handheld or non-handheld state (for example, various angles and/or sudden changes perceived by gyroscope 145B can indicate that mobile device 105 is being operated in a handheld state by a user). It can thus be appreciated that while the underlying analysis performed at the present step 420 and at step 220, as described above, are substantially similar, here the analysis is performed by central machine 168 based on notifications received from mobile device 105, while at step 220 the analysis is preferably performed by mobile device 105 itself. Having this analysis performed at central machine 168 (as opposed to at mobile device 105, from which the notification analyzed at this step originates) provides several advantages in certain scenarios over having the analysis performed at mobile device 105, as described at step 220. For example, the analysis performed at the present step can be quite resource intensive, and shifting this analysis to central machine 168 ensures that the system resources of mobile device 105 remain relatively free. Additionally, in certain arrangements central machine 168 can be operated by a law enforcement agency, and, as such, a centralized approach, such as the one described with respect to FIG. 4, can provide such an agency with the ability to monitor and/or adjust the operational capacity of mobile device 105 as necessary, as will be described in greater detail below.

Moreover, in certain scenarios this centralized approach can be easier to implement with respect to regulatory compliance and preventing tampering. It is expected that both regulatory authorities who are interested in implementing a solution such as that described with reference to FIG. 4 are more likely to succeed in obtaining compliance from mobile device manufacturers and/or mobile communications providers when requiring a solution that primarily only requires, from the standpoint of the mobile device 105, periodic notification transmissions from mobile device 105 to central machine 168. In addition, such a solution can be more difficult for users to manipulate, modify, and/or 'hack,' given that the primary analysis is performed by central machine 168, as opposed to mobile device 105.

At step 430, processor 4110 of central machine 168 executing one or more of software modules 4130, including, preferably, determination module 4170, computes one or more determination factor(s), such as probabilities, based on the determination characteristics identified at step 420. It should be understood that, for instance, based on the particular inputs upon which a notification (which is analyzed at step 420) is based, various user determination characteristics and/or handheld state characteristics are generated. For example, as referenced above, in certain arrangements user determination characteristics are identified (such as typing tendencies, as referenced above), while in other arrangements handheld state characteristics (such as one or more angles detected by mobile device 105, as referenced above) can be identified, while in yet other arrangements both user determination characteristics and handheld state characteristics can be identified. In any event, at step 430, one or more probabilities are computed by central machine 168, reflecting a probability that the in-vehicle role of the user of mobile device 105 is a driver, a probability that the in-vehicle role of the user of the mobile device 105 is a passenger, a probability that the handheld state of the mobile device 105 is handheld, and/or a probability that the handheld state of the mobile device 105 is non-handheld, all in a manner substantially similar to that described in detail above with respect to step 230. It should be understood that, as described in detail above, in certain arrangements the user determination characteristics and/or handheld state characteristics identified at step 420 can provide varying degrees of certitude as to the identity/role of a user and/or the handheld state of mobile device 105. Accordingly, it should be appreciated that because ranges exist across the spectrum of a particular user determination and/or handheld state characteristic (such as typing consistency and/or device angle), a probability that an in-vehicle role of the user of mobile device 105 is a driver/passenger and/or a probability that a handheld state of mobile device 105 is handheld/non-handheld preferably reflects a degree of certainty across such a probability spectrum, as described in detail above.

Then, at step 440, processor 4110 of central machine 168 executing one or more of software modules 4130, including, preferably, determination module 4170, adjusts an operational capacity of mobile device 105 based on the one or more determination factor(s), such as at least one of the probabilities computed at step 430, substantially in the manner described in detail above with respect to step 240. However, it should again be understood that while the description pertaining to step 240 above relates to adjustments and transformations initiated by mobile device 105 upon itself, here the adjustments to the operation of mobile device 105 are initiated by central machine 168. For example, in certain arrangements central machine 168 can transmit an operation command, such as a command in the form of one or more notifications, messages, and/or instructions that reflect various adjustments that are to be made to the operational capacity of mobile device 105, and such adjustments can then be applied to mobile device 105 upon its receipt of the transmitted operation command(s), and/or their application/execution, effecting similar and/or identical results as those described in detail above with respect to step 240 (e.g., providing notifications at mobile device 105, restricting operation of mobile device 105, and/or transmitting notifications from mobile device 105 to third parties). In other arrangements, central machine 168 can adjust the operational capacity of mobile device 105 based primarily and/or exclusively on adjustments made at and/or by central machine 168 which, in turn, preferably effect or otherwise adjust the operational capacity of mobile device 105. For instance, in an arrangement where central machine 168 is controlled by a mobile communications provider such as a cellular communications provider, an adjustment can be implemented at central machine 168 whereby one or more of the services provided by mobile communications provider to mobile device 105 (such as phone, SMS, and/or data services) can be interrupted and/or otherwise adjusted or modified, thereby effecting the operation of mobile device 105 through an adjustment occurring at central machine 168 based on the probability computed at step 430. It should be noted that in other arrangements, substantially similar adjustments can be implemented upon and/or through one or more service providers that provide one or more services, whether directly or indirectly, to mobile device 105. By way of illustration, various voice over IP (VoIP) providers, such as Skype, enable users to achieve voice communications (akin to telephone calls) over data connections (such as an internet connection). By way of further illustrations, the 'Viber' app enables similar SMS capabilities over an internet connection. In any event, it should be understood that the methods and systems disclosed herein can be configured such that any necessary adjustment can be implemented upon and/or through the requisite service provider (for example, by limiting the calling capabilities of Skype and/or the SMS capabilities of Viber) substantially in the manner described in detail above.

At step 450, processor 4110 of central machine 168 executing one or more of software modules 4130, including, preferably, determination module 4170, outputs one or more results and/or operation states of mobile device 105 based on the one or more determination factor(s), such as the probability or probabilities computed at step 430, substantially in the same manner as described in detail above with respect to step 250. But again, as noted above, it should be understood that while the description provided above with respect to step 250 pertains to one or more operations performed at mobile device 105, step 450 primarily pertains to operations initiated and/or performed by central machine 168. Accordingly, it can be appreciated that the one or more operation state(s) outputted by central machine 168 reflect the operation state(s) of mobile device 105 (for example, that the device is being used in a handheld state and/or that the device is being used by a driver). As noted in detail above with respect to step 250, the outputting of the operation state(s) can be further based upon one or more determination factor(s), such as one or more probabilities computed at step 430, which reflects the likelihood or degree of certainty that a user of mobile device 105 is a driver/passenger and/or that mobile device 105 is being used in a handheld/non-handheld state. As also noted in detail above, in certain arrangements the operation state of mobile device 105 can be outputted by central machine 168 to an external device or third-party, such as a law enforcement agency, insurance company, and/or other device 160, via communication interface 4150. Such functionality can be advantageous in jurisdictions where administrative regulations recommend and/or require that entities such as mobile communications providers provide information to law enforcement agencies that reflects the unauthorized usage of mobile devices such as mobile device 105 while the user of the device is driving. Similarly, such functionality can be advantageous to insurance companies when processing an insurance claim. Even in situations where the user of a mobile device, such as mobile device 105, is uncooperative in providing information to the insurance company, and/or in situations where the mobile device associated with an involved party is no longer available or has been destroyed, central machine 168 (which receives and retains the various pertinent notifications/inputs provided by the various devices such as mobile device 105) can output the necessary data, such as the operation state of mobile device 105, thereby assisting the insurance company to make necessary decisions regarding the validity of a particular insurance claim.

Figure 5:
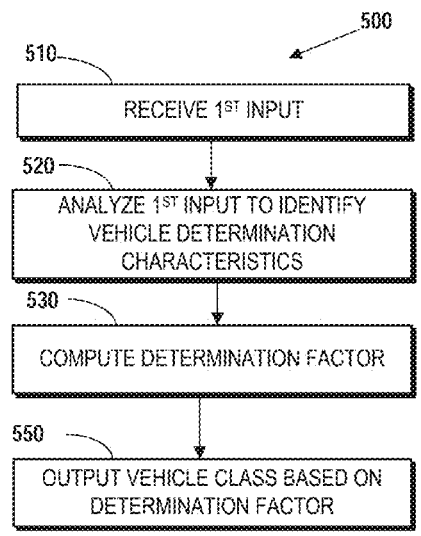
FIG. 5 is a flow diagram showing a routine that illustrates a broad aspect of a method for determining a vehicle class of a vehicle using a mobile device in accordance with at least one exemplary embodiment disclosed herein.

Turning now to FIG. 5, a flow diagram is described showing a routine 500 that illustrates an aspect of a method of determining a vehicle class of a vehicle using a first mobile device in accordance with at least one embodiment disclosed herein. As will be described in greater detail below, determining the vehicle class of a particular vehicle can provide further insight and accuracy in the determination of an in-vehicle role of a user of a mobile device. In addition, it should be understood that the various steps and/or operations that make up routine 500 share substantial similarities to those described above in connection with FIGS. 2A-C and 3-4.

The process begins at step 510 where processor 110 executing one or more of software modules 130, including, preferably, determination module 170, receives a first input from one or more of sensors 145, software modules 130, user interface 172, operating system 176, and/or communication interface 150. Preferably, the first input originates from one or more identifying events that are perceptible to at least one of sensors 145, user interface 172, operating system 176, and/or communication interface 150. Examples of such an input include, but are not limited to, an acceleration input that originates from an acceleration event (e.g., the speeding up or slowing down of a car, train, or airplane, in the X and/or Y and/or Z axis) that is perceived by accelerometer 145A, a change in geographic location input that originates from a location changing event (e.g., the movement from one place to another) that is perceived by GPS receiver 145C.

Then, at step 520, processor 110 executing one or more of software modules 130, including, preferably, determination module 170, analyzes at least the first input to identify one or more vehicle determination characteristics within the first input. As will be described in greater detail below, vehicle determination characteristics are one or more aspects originating at and/or derived from an input that provide insight regarding the vehicle class within or upon which and/or in relation to mobile device 105 is traveling. For example, in many cases the accelerometer signature (that is, the pattern reflected in the inputs provided by one or more accelerometer(s) 145A) differs among vehicle classes. Thus, for example, a train generally accelerates and decelerates in the path of its movement (that is, the Y-axis) far less frequently than other vehicles such as cars. Additionally, the acceleration and deceleration of a train is generally much more smooth and gradual than that exhibited by most cars. Accordingly, determination module 170 can analyze the received input(s) in order to identify one or more vehicle determination characteristics (such as the referenced accelerometer signature) within the first input. Additional examples and illustrations of vehicle determination characteristics are provided below in EXAMPLE 5.

At this juncture it should be noted that although the example provided above pertains to an accelerometer signature, various signatures (such as accelerometer signatures based on inputs originating at accelerometer 145A and GPS signatures based on inputs originating at GPS 145C) based on the various sensors 145 can be similarly determined, substantially in the manner described above. In addition, it should be noted that various composite signatures, which correlate inputs originating at two (or more) of the various sensors 145 (e.g., accelerometer 145A and gyroscope 145B, and/or GPS 145C and microphone 145D) can be similarly determined, substantially in the manner described above. Moreover, in certain arrangements the various baseline values corresponding to the vehicle determination characteristics referenced herein (such as values for vehicle determination characteristics that correspond to boats, values for vehicle determination characteristics that correspond to airplanes, etc.) can be stored and/or provided at databases 174 and/or 162, thereby enabling the computation of a probability (based on the vehicle determination characteristics perceived/determined by mobile device 105) that the vehicle within which mobile device 105 is traveling corresponds to a particular vehicle class, as will be described in greater detail below.

Upon identifying one or more vehicle determination characteristics based on the analysis of an input, at step 530 processor 110 executing one or more of software modules 130, including, preferably, determination module 170, computes at least one determination factor based on the vehicle determination characteristic(s), such as a probability that the vehicle corresponds to a particular vehicle class. That is, in certain arrangements the vehicle determination characteristics identified at step 520 can provide varying degrees of certitude as to the particular class of vehicle that mobile device 105 is traveling within. As noted above and described in greater detail herein, given varying administrative regulations regarding the use of various mobile devices when traveling on various classes of vehicles (whether such regulations apply only to a driver of the vehicle, such as in the case of a car, or whether such regulations apply to all passengers in the vehicle as well, such as in the case of an airplane), identifying (within a certain degree of certainty) that a mobile device 105 is traveling within a particular class of vehicle can be significant in further determining whether a particular type of usage (if not any usage) of the mobile device 105 is unauthorized or otherwise inadvisable. Accordingly, continuing the example provided with regard to step 520, in a case where accelerometer 145A of mobile device 105 provides one or more inputs that are identified as a vehicle determination characteristic such as an accelerometer signature (that is, preferably a pattern of inputs from accelerometer 145A), the accelerometer signature can be compared with one or more baseline values stored at database(s) 174, 162 that reflect known and/or computed vehicle determination characteristics of various vehicles (e.g., boats, cars, etc.). Thus, by comparing one or more presently identified vehicle determination characteristic(s) with baseline values stored at database(s) 174, 162, processor 110 executing one or more of software modules 130, including, preferably, determination module 170, can identify which of the various baseline values (corresponding to various vehicles) the presently identified vehicle determination characteristic(s) most closely corresponds to, as well as the degree to which it corresponds. Based on this correspondence, a probability (preferably reflecting the degree of the correspondence between the presently identified vehicle determination characteristic(s) and the baseline values) can be computed, reflecting a degree of certainty that mobile device 105 is traveling in a particular class of vehicle.

Then, at step 550, processor 110 executing one or more of software modules 130, including, preferably, determination module 170, outputs a vehicle class based on the one or more determination factor(s), such as the probability or probabilities computed at step 530. For example, if, at step 530, it is computed that it is 90% likely that mobile device 105 is traveling in an airplane, at step 550 a notification can be provided at mobile device 105 indicating that it has been determined that the device is present in an airplane. In certain arrangements such a notification can further include a suggestion/instruction that the user of the device 105 refrain from further use of the device, in deference to regulatory guidelines. In other arrangements, the vehicle class of the device within which mobile device 105 is traveling can be output to a third-party, such as a law enforcement agency, under appropriate circumstances. Additionally, as noted in detail above with respect to step 250, such outputting can, in certain arrangements, be contingent upon a certain minimum probability being computed (e.g., a 75% or greater probability that a mobile device 105 is traveling within an airplane), while in other arrangements the vehicle class can be outputted across any and/or all degrees of probability.

It should also be noted that, in certain arrangements, the processor 110 executing one or more of software modules 130, including, preferably, determination module 170, can transform an operation state of mobile device 105 based in whole or in part on the determination factor(s), such as the probability computed at step 530. This operation can be further appreciated when employed in conjunction with a determination of an in-vehicle role of a user of mobile device 105, such as that depicted in FIGS. 2A-C and described in detail above. For example, in certain arrangements, upon determining (preferably to a certain minimum probability) that a mobile device 105 is traveling within a certain class of vehicle, there can be little need to further determine the in-vehicle role of the user of the device 105 (e.g., if the vehicle is an airplane, all device usage can be prohibited, irrespective of a particular user's in-vehicle role). By way of further example, in other arrangements, a transformation (substantially similar to that described in detail above with respect to step 240) can be employed based upon both the computed probability that mobile device 105 is traveling in a car, together with the computed probability (such as that described in detail above with respect to step 230) that the in-vehicle role of a user of mobile device 105 is a driver. In such a scenario, processor 110 can coordinate various transformations and/or adjustments to the operation(s) of mobile device 105, as described in detail above with respect to step 240. As also noted above, in certain arrangements various of the referenced transformations can be employed only when either one or both of the probabilities pertaining to the vehicle class within which mobile device 105 is traveling and/or the in-vehicle role of the user of mobile device 105 is a driver meet and/or exceed a certain minimum threshold.

Figure 6:
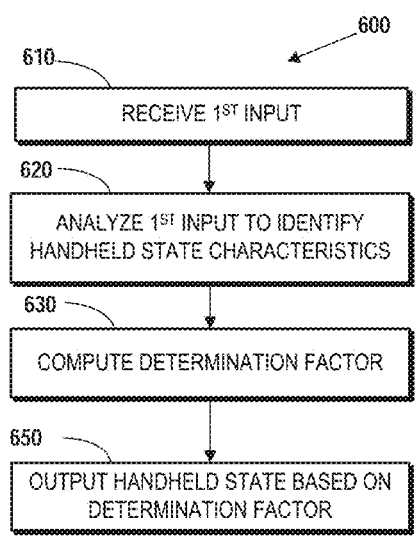
FIG. 6 is a flow diagram showing a routine that illustrates a broad aspect of a method of determining a handheld state a mobile device in accordance with at least one embodiment disclosed herein.

Turning now to FIG. 6, a flow diagram is described showing a routine 600 that illustrates an aspect of a method of determining a handheld state a mobile device in accordance with at least one embodiment disclosed herein. As will be described in greater detail below, various of the steps and operations that make up routine 600 share substantial similarities to those described above in connection with FIGS. 2A-C, 3, 4, and 5. However, it should be understood that while at least FIG. 4 principally concerns determinations occurring at central machine 168, routine 600 is primarily directed to determinations performed at mobile device 105, as will be described in greater detail below.

The process begins at step 610 where processor 110 executing one or more of software modules 130, including, preferably, determination module 170, receives a first input from one or more of sensors 145, software modules 130, user interface 172, operating system 176, and/or communication interface 150. Preferably, the first input originates from one or more identifying events that are perceptible to at least one of sensors 145, user interface 172, operating system 176, and/or communication interface 150. As described in detail above with respect to step 210, the first input originates from one or more identifying events that are perceptible to at least one of sensors 145, user interface 172, operating system 176, and/or communication interface 150 of mobile device 105, such as an acceleration input perceived by accelerometer 145A and/or a change in orientation input perceived by gyroscope 145B. It should be noted that in certain arrangements a series of inputs (such as a number of acceleration inputs over a certain period of time) and/or a combination of inputs (such as a number of acceleration inputs and orientation inputs over a period of time) are received, such as one or more inputs that reflect the incidence of shaking or vibration at mobile device 105.

Then, at step 620, processor 110 executing one or more of software modules 130, including, preferably, determination module 170, analyzes at least the first input to identify one or more handheld state characteristics within the notification. As described in detail above with respect to step 420, handheld state characteristics are one or more aspects originating at and/or derived from one or more input(s) that provide insight regarding the handheld state of a mobile device, such as mobile device 105, such as whether mobile device 105 is being operated by a user in a handheld or non-handheld state. For example, various orientations and/or sudden changes perceived by gyroscope 145B (preferably, in certain scenarios, in combination with one or more inputs from various other sensors 145 such as accelerometer 145A, GPS 145C, and/or magnetometer 145E) can indicate that mobile device 105 is being operated in a handheld state by a user. By way of further example, a relatively constant pattern of inputs from accelerometer 145A and/or gyroscope 145B can indicate that mobile device 105 is positioned in a relatively stable manner, thus indicating that it is being operated in a non-handheld state.

At step 630, processor 110 executing one or more of software modules 130, including, preferably, determination module 170, computes one or more determination factor(s), based on the handheld state determination characteristic(s), such as a probability that that the handheld state of mobile device 105 is handheld, or that the handheld state of mobile device 105 is non-handheld. By way of example, based on a series of accelerometer 145A and gyroscope 145B inputs, the pattern of which indicates ongoing vibration and/or movement, it can be computed that there is a high probability (e.g., greater than 90%) that mobile device 105 is being operated in a handheld state. This is because a user of handheld mobile device 105—and particularly a driver who is further distracted by his/her driving responsibilities—is liable to produce far more vibration/shaking that is perceptible by mobile device 105, especially as compared to a non-handheld device that is stationed in a dock, for instance. In any event, at step 630, such probabilities are computed, reflecting a probability that the handheld state of the mobile device 105 is handheld, and/or a probability that the handheld state of the mobile device 105 is non-handheld, in a manner substantially similar to that described in detail above with respect to steps 230 and 430. It should be understood that, as described in detail above, in certain arrangements the handheld state characteristics identified at step 620 can provide varying degrees of certitude as to the handheld state of mobile device 105. Accordingly, it should be appreciated that because ranges exist of a particular handheld state characteristic (such as device shake patterns), a probability that a handheld state of mobile device 105 is handheld/non-handheld preferably reflects a degree of certainty across such a probability spectrum, as described in detail above.

At step 650, processor 110 executing one or more of software modules 130, including, preferably, determination module 170, outputs one or more handheld states of mobile device 105 based on the one or more determination factor(s), such as the probability or probabilities computed at step 630, substantially in the same manner as described in detail above with respect to steps 250, 450, and 550. For example, if, at step 630, it is computed that it is 90% likely that mobile device 105 is being operated in a handheld state, at step 650 a notification can be provided at mobile device 105 indicating that it has been determined that the device is being so operated. In certain arrangements such a notification can further include a suggestion/instruction that the user of the device 105 refrain from further use of the device, in deference to regulatory guidelines. In other arrangements, the handheld state of mobile device 105 can be output to a third-party, such as a law enforcement agency, under appropriate circumstances. Additionally, as noted in detail above with respect to step 250, such outputting can, in certain arrangements, be contingent upon a certain minimum probability being computed (e.g., a 90% or greater probability that a mobile device 105 is operating in a handheld state), while in other arrangements the handheld state can be outputted across any and/or all degrees of probability.

It should also be noted that, as noted above in detail with respect to FIG. 5, in certain arrangements, the processor 110 executing one or more of software modules 130, including, preferably, determination module 170, can transform an operation state of mobile device 105 based in whole or in part on the one or more determination factor(s), such as the probability computed at step 630. This operation can be further appreciated when employed in conjunction with a determination of an in-vehicle role of a user of mobile device 105, such as that depicted in FIGS. 2A-C and described in detail above. For example, in certain arrangements, upon determining (preferably to a certain minimum probability) that a mobile device 105 is under the control of a driver of a vehicle (such as by processing the inputs from accelerometer 145A and gyroscope 145B of mobile device 105 against those of other mobile devices 160 within the same vehicle, thereby identifying the driver of the vehicle, as described in detail herein), it can then be further determined whether mobile device 105, which has been determined to be under the control of a driver, is being operated in a handheld state (generally prohibited in most places) or in a non-handheld state (generally permitted). Accordingly, in such an arrangement (where mobile device 105 has been determined to be under the control of a driver and is being used in a handheld state), a transformation (substantially similar to that described in detail above with respect to step 240) can be employed In such a scenario, processor 110 can coordinate various transformations and/or adjustments to the operation(s) of mobile device 105, as described in detail above with respect to step 240. As also noted above, in certain arrangements various of the referenced transformations can be employed only when either one or both of the probabilities pertaining to the user role of the user of mobile device 105 is a driver and/or the handheld state of mobile device 105 is handheld meet and/or exceed a certain minimum threshold.

Figure 7:
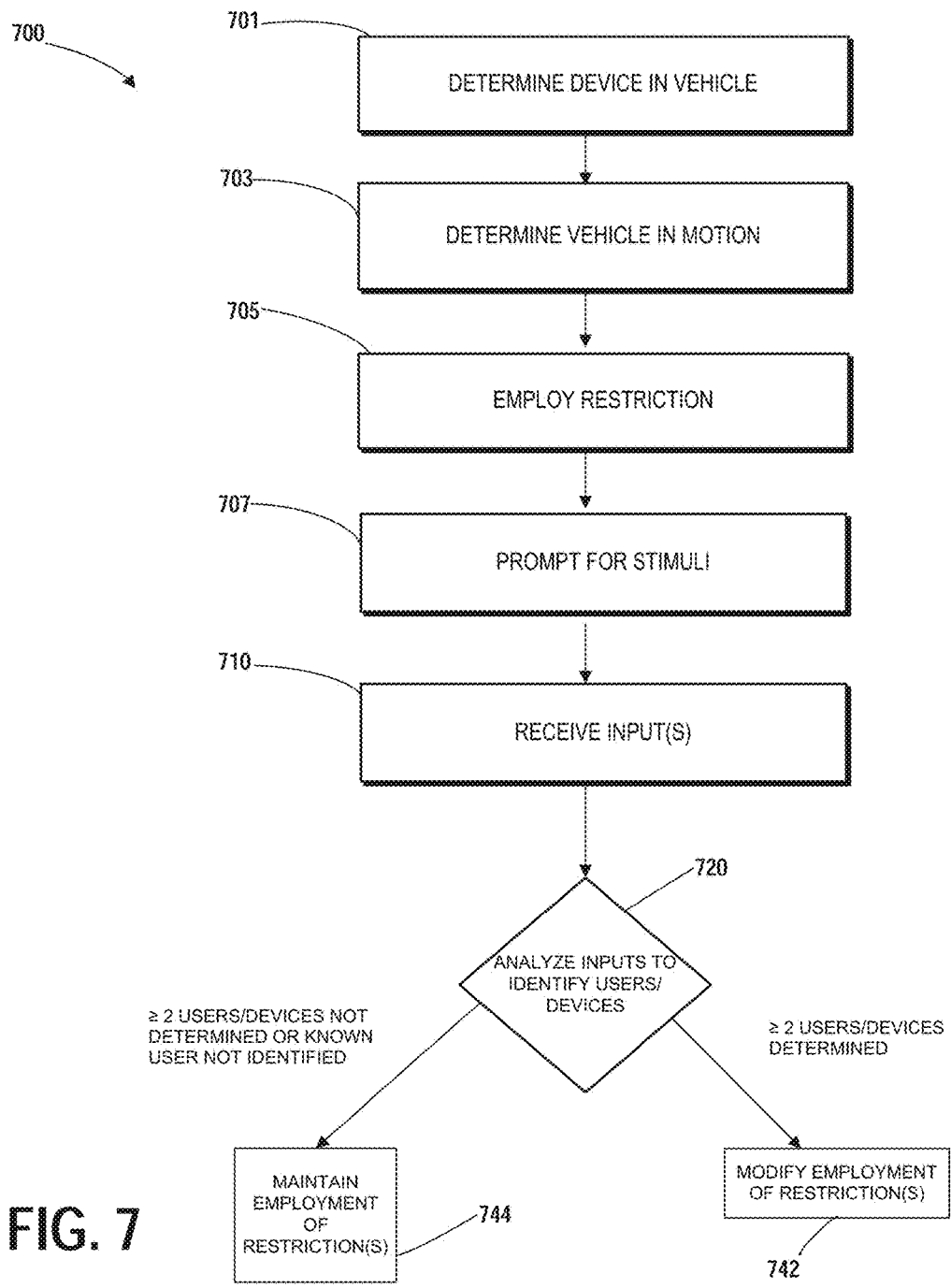
FIG. 7 is a flow diagram showing a routine that illustrates a broad aspect of a method of restricting operation of a mobile device in accordance with at least one embodiment disclosed herein.

Turning now to FIG. 7, a flow diagram is described showing a routine 700 that illustrates a broad aspect of a method restricting operation of a mobile device 105 in accordance with at least one embodiment disclosed herein. As will be described in greater detail below, various of the steps and operations that make up routine 700 share substantial similarities to those described above in connection with FIGS. 2A-C, 3, 4, 5, and 6. It should be noted at the outset that while the following description of routing 700 will be directed primarily to operations occurring at mobile device 105, such description is exemplary and intended for the sake of clarity and consistency. However, it should be understood that any and/or all of the steps in routine 700 can be similarly employed at another device/machine, such as at central machine 168, such as in the manner described in detail above with respect to FIG. 4. Furthermore, the same principle should be understood and appreciated with respect to any and all of the various steps, operations, and/or functions described throughout the present disclosure. That is, while any one of the particular steps, operations, and/or functions are described herein as being performed at and/or upon a particular machine or device (such as mobile device 105, mobile device 160, and/or central machine 168), such description should be understood as being exemplary and/or illustrative and not limiting. Accordingly, it can be appreciated that any and all steps, operations, and/or functions described herein with regard to a particular device and/or machine (such as mobile device 105) should be similarly understood to be similarly capably of employment at another device and/or machine (such as central machine 168), substantially in the manner described herein, without departing from the scope of the present disclosure.

At step 701, processor 110 executing one or more of software modules 130, including, preferably, restriction module 171 determines whether mobile device 105 is present with a vehicle, such as through one or more of the various determination methods described in detail herein.

Upon determining the mobile device 105 is within a vehicle (such as a car, a truck, a van, a motorcycle and a jeep.), at step 703, processor 110 executing one or more of software modules 130, including, preferably, restriction module 171 determines whether the vehicle is in motion, such as through one or more of the various determination methods described in detail herein.

At step 705 where processor 110 executing one or more of software modules 130, including, preferably, restriction module 171, employs a first restriction at mobile device 105 and/or in relation to mobile device 105. As will be described in greater detail herein, the first restriction is preferably one or more instructions that dictate at least one operation state of the mobile device. Examples of such restrictions include but are not limited to: instructions that disable a particular feature or functionality of a mobile device 105 (such as the ability to type text), instructions that disable multiple features or functionalities of a mobile device 105 (such as the ability to launch certain applications and the ability to receive text messages), and instructions that functionally "lock" mobile device 105 by effectively disabling many or all of the functionalities of the device. It should be understood that in many arrangements, the referenced first restriction is preferably a default restriction. That is, in such arrangements the first restriction is employed by default, such as upon powering on and/or activating mobile device 105. It should be appreciated that in certain arrangements such restriction can be employed in relation to mobile device 105, such as by a central machine 168, such as in the manner disclosed in detail herein, for example with respect to FIG. 4. By way of illustration, the referenced restriction can be imposed by a communications provided (which preferably operates central machine 168) to prevent transmission of one or more communications (e.g., SMS messages) to a mobile device 105, until an identification/determination is made, such as identifying that two or more users are in a vehicle, such as in the manner disclosed in detail herein.

It should be understood that in various arrangements, including many of those described herein, the various restrictions employed at mobile device 105 are directed towards configuring mobile device 105 in such a manner that operation of and/or interaction with the device is difficult, inconvenient, and/or impossible (that is, it can be said that operation of mobile device 105 is impeded) for a user who is also simultaneously operating a vehicle. At the same time, such restrictions are also preferably configured to create minimal, if any, difficulty and/or inconvenience when operated by and/or interacted with by a user who is not simultaneously operating a vehicle. In other words, it can be said that such restrictions preferably impede operation of the mobile device by a user who is a driver moreso than they impede operation of the mobile device by a user who is a passenger. As such, it should be further understood that in certain arrangements it can be preferably for mobile device 105 to initially determine that the device is present within a vehicle (such as through one or more of the various determination methods described in detail herein) prior to employing such a first restriction. Accordingly, it can be further appreciated that the various steps and operations described herein with reference to FIGS. 7-8 can be further implemented, in certain arrangements, in conjunction with one or more of the various other methods and systems described in detail herein, such as those described with reference to FIGS. 2A-6. Furthermore, it should be recognized that any one or more of the various steps, operations, routines, functions, and/or figures disclosed herein can preferably employed in conjunction within any one or more of the various steps, operations, routines, functions, and/or figures disclosed herein. Thus, for example, the various restrictions described in conjunction with FIG. 7 can be employed in conjunction with the various determination operations described above. By way of example, one or more of the referenced restrictions can be employed before the occurrence of and/or in response to one or more of the determinations described in detail herein.

It should be understood that in various arrangements, at least one of the one or more restrictions that dictate the at least one operating state of mobile device 105 are determined based on inputs originating at at least one of the various sensors 145, etc., as described in greater detail herein.

At step 707, mobile device 105 preferably prompts one or more users to initiate and/or provide one or more stimuli that can be received as inputs at mobile device 105. By way of example, mobile device 105 can prompt each of the one or more users in a vehicle to repeat a particular word or series of words projected by mobile device 105. It should be understood that in certain arrangements such a prompt can request for the words to be repeated sequentially while in other arrangements such a prompt can request for the words to be repeated simultaneously, while in yet other arrangements the timing of the repetition is of no consequence. It should be appreciated that such prompting can request practically any stimulus that can be received and/or analyzed as an input in the manner described herein.

At step 710, processor 110 executing one or more of software modules 130, including, preferably, restriction module 171 receives at least a first input and a second input (e.g., the referenced stimuli), in the manner disclosed in detail herein. As has already been described in detail herein, each of the first input and the second input preferably originate at one or more of sensors 145, software modules 130, user interface 172, operating system 176, and/or communication interface 150, though it should be understood that the first input and the second input need not originate from the same source.

It should be understood that, as referred to herein, such inputs are referred to as originating at one or more of sensors 145, software modules 130, user interface 172, operating system 176, and/or communication interface 150 in the sense that such inputs are initially perceived—from the perspective of mobile device 105—at such components. However, it should be recognized, as will be appreciated in connection with the following examples, that in many arrangements and scenarios such inputs (and/or the stimuli and/or phenomena that trigger them) can ultimately originate at sources other than at various components of mobile device 105. Accordingly, it should be appreciated that within the context of the discussion of the subject matter encompassed by FIG. 7, various inputs are referred to as originating at a particular component in the sense that they originate from such a component with respect to mobile device 105. However, it is acknowledge that such inputs can, in turn, have ultimate origins beyond mobile device 105 itself, such as from the voice of a particular user and/or from an external system or device, as illustrated below.

For example, a first input corresponding to the audio tones of the voice of a first user can be received at microphone 145D, and a second input corresponding to the audio tones of the voice of a second user can also be received at microphone 145D. It should also be understood that in certain arrangements, one or more of the various inputs can be received at and/or originate from a source external to mobile device 105, such as vehicle data system 164 and or another mobile device 160. By way of example, vehicle data system 164 can provide an input to mobile device 105 (preferably received via communication interface 150) indicating the weight measured on one or more seats of a vehicle, and/or the usage of seat belts at one or more seats of a vehicle, etc—which can in turn, indicate that more than one user is within a vehicle. By way of further example, a detection of mobile device 160 within a vehicle (using one or more of the methods described herein) can also indicate that more than one user is within a vehicle.

At this juncture, it should be noted that while the first input and the second input have been described herein as being discrete inputs, such description is merely exemplary and for the sake of clarity and illustration. Accordingly, while in certain arrangements the first input and the second input are separate inputs in the conventional sense—that is, inputs that originate at two independent sources, in other arrangements the first input and the second input are actually aspects found within a single input. For example, a single audio input (such as an audio recording) that contains two distinct voices (such as the voices of a first user and a second user) can be processed (in the manner described herein) to identify such distinct voices within the single audio input, which are understood to be a first input and a second input within the context of the present disclosure.

Then, at step 720, processor 110 executing one or more of software modules 130, including, preferably, restriction module 171, analyzes the first input and the second input. In doing so, the presence of at least one of two or more users and/or two or more mobile devices can be determined, such as a determination of the presence of a first user and the presence of a second user, such as in the manner described in detail herein. By way of illustration, continuing with the example referenced above at step 710, the first and second inputs (that is, the audio tones of the voices of the first user and the second user) can be analyzed to identify an audio signature for each of the respective inputs, in a manner known to those of ordinary skill in the art, and such audio signatures can then be compared to determine if they are substantially similar and/or identical (indicating that both inputs likely originate from the same source, i.e., the same user) or substantially dissimilar (indicating that each of the inputs likely originate from different users). Thus, upon identifying that first input (here, the voice of the first user) is substantially distinct from the second input (here, the voice of the second user), it can be concluded at minimum that the device 105 is in the presence of (if not in close proximity to) a first user and a second user. Additional illustrations of such inputs to determine the presence of at least one of two or more users and/or two or more mobile devices are presented below at EXAMPLE 4.

Upon determining that mobile device 105 is in the presence of at least one of (a) two or more users and/or (b) two or more mobile devices, such as by determining the presence of at least a first user and a second user, at step 742 processor 110 executing one or more of software modules 130, including, preferably, restriction module 171 modifies an employment of at least one restriction such as the first restriction. That is, being that a determination (at step 720) that the device is in the presence of at least two users necessarily indicates that at least one of such users is not a driver of a vehicle, this conclusion can preferably trigger and/or initiate the modification of the first restriction. In certain arrangements, such modification can include the employment of a second restriction, strengthening of the first restriction, and/or the easing of the first restriction. In one arrangement, such a second restriction can include one or more instructions that dictate one or more operational states of the mobile device 105 with respect to one or more of the various sensors 145 of the device. That is, as noted above, such a restriction can configure mobile device 105 to operate in a manner that is relatively difficult/inconvenient for a driver while being relatively unobtrusive for a passenger. Put differently, it can be said that such restrictions impeded operation of mobile device 105 by a user who is a driver moreso than the same restrictions impede operation of a mobile device 105 by a user who is a passenger. Examples of such restrictions include but are not limited to: requiring that the device only operate in 'landscape' mode (which generally requires two hands for efficient interaction/navigation—a demand that is relatively simple for a passenger to comply with but relatively difficult for a driver, who needs at least one hand to steer the vehicle, to comply with), requiring that the device operate only at certain orientations (as detected by one or more of sensors 145, such as gyroscope 145B, accelerometer 145A, GPS 145C, and magnetometer 145E) such as a completely upright orientation which is relatively simple for a passenger to comply with but which is inconvenient for a driver who will not find such an orientation as comfortable while driving and who will generally wish to hold the device at alternate orientations in order to obscure the device from the view of law enforcement officials), and that the device not operate in a manner/pattern that is consistent with that of a driver (such as the various in-vehicle role determinations described in detail herein). It should be noted that although such restrictions are generally effective, on average, in impeding operation of a device by a driver moreso than a passenger, it is recognized that certain individual drivers may not find such restrictions particularly inconvenient, while other passengers may find them highly inconvenient. Nevertheless, on average, such restrictions impede the operation of mobile device 105 by drivers moreso that they impede such operation of mobile device by passengers.

In the event that the presence of at least one of (a) two or more users and/or (b) two or more mobile devices, such as the presence of a first user and a second user, are not determined and/or one or more users not in the set of users known to be users of the mobile device, is not determined (at step 720), at step 744 processor 110 executing one or more of software modules 130, including, preferably, restriction module 171 maintains the employment of the first restriction.

Figure 8:
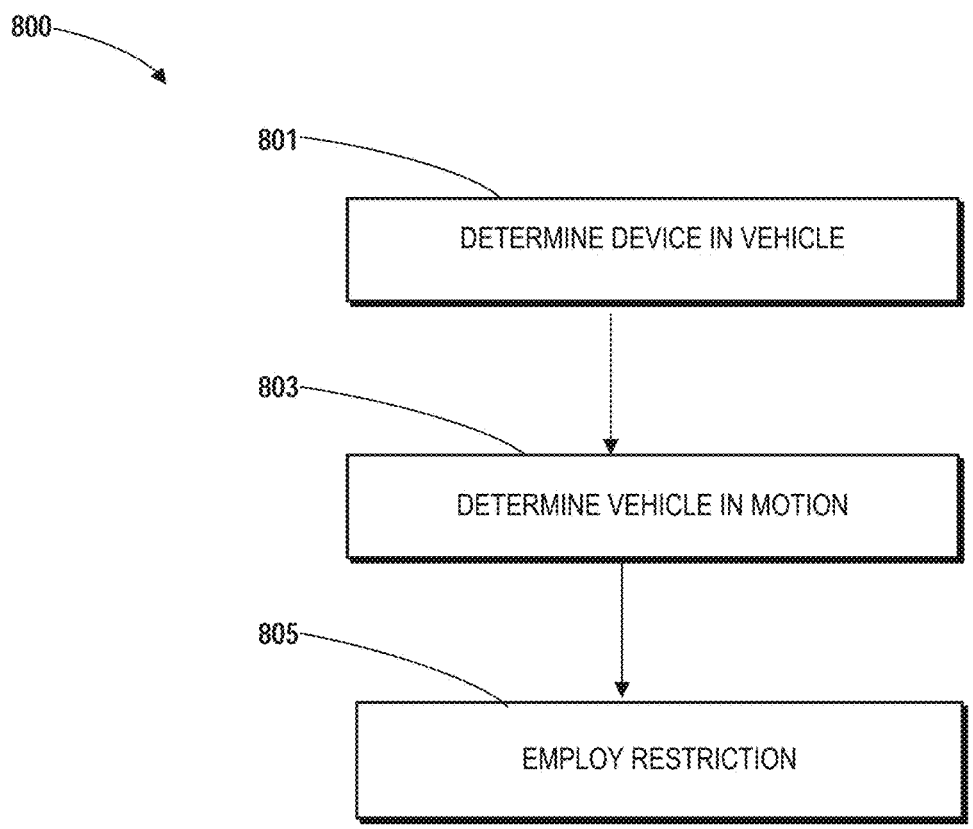
FIG. 8 is a flow diagram showing a routine that illustrates a broad aspect of another method of restricting operation of a mobile device in accordance with at least one embodiment disclosed herein.

Turning now to FIG. 8, a flow diagram is described showing a routine 800 that illustrates a broad aspect of a method restricting operation of a mobile device 105 in accordance with at least one embodiment disclosed herein. As will be described in greater detail below, various of the steps and operations that make up routine 800 share substantial similarities to those described in detail herein.

At step 801, processor 110 executing one or more of software modules 130, including, preferably, restriction module 171 determines whether mobile device 105 is present with a vehicle, such as through one or more of the various determination methods described in detail herein.

Upon determining that mobile device 105 is within a vehicle (such as a car, a truck, a van, a motorcycle and a jeep.), at step 803, processor 110 executing one or more of software modules 130, including, preferably, restriction module 171 determines whether the vehicle is in motion, such as through one or more of the various determination methods described in detail herein.

At step 805, processor 110 executing one or more of software modules 130, including, preferably, restriction module 171, employs one or more restrictions at mobile device 105 and/or in relation to mobile device 105, substantially in the manner described above with respect to step 705. It should be understood that such restriction(s) are preferably configured to impede operation of mobile device 105 by a user that is a driver moreso than the restriction(s) impede operation of mobile device 105 by a user that is a passenger, as described in detail herein. Examples of scenarios where the operations of routine 800 can be implemented include teenage drivers (wherein a parent/guardian wishes to employ such restrictions, which make it difficult to operate a mobile device 105 while driver, at all times) and/or phones that are fixed in vehicles, such as car phones (wherein it is always desirable to implement such restrictions). It should be appreciated that in certain arrangements such restriction can be employed in relation to mobile device 105, such as by a central machine 168, such as in the manner disclosed in detail herein, for example with respect to FIG. 4. By way of illustration, the referenced restriction can be imposed by a communications provided (which preferably operates central machine 168) to prevent transmission of one or more communications (e.g., SMS messages) to a mobile device 105, until an identification/determination is made, such as identifying that two or more users are in a vehicle, such as in the manner disclosed in detail herein.

It should be further understood that in certain arrangements, such restriction can be further configured to impede operation of the mobile device, and/or be more likely to be applied to a mobile device used by a driver than to a mobile device used by a passenger. By way of example, consider a scenario where a particular restriction is employed such that if the 'shake' perceived at mobile device 105 exceeds a certain threshold level, SMS messages cannot be sent from the device. It can be appreciated that employment of such a restriction does not impede drivers more than passengers (being that, once employed, it will impede a driver and a passenger equally), however such a restriction is more likely, on average, to be employed for drivers than for passengers (being that drivers, on average, shake their devices more than passengers). Further such examples are provided at EXAMPLE 4.

Figure 12:
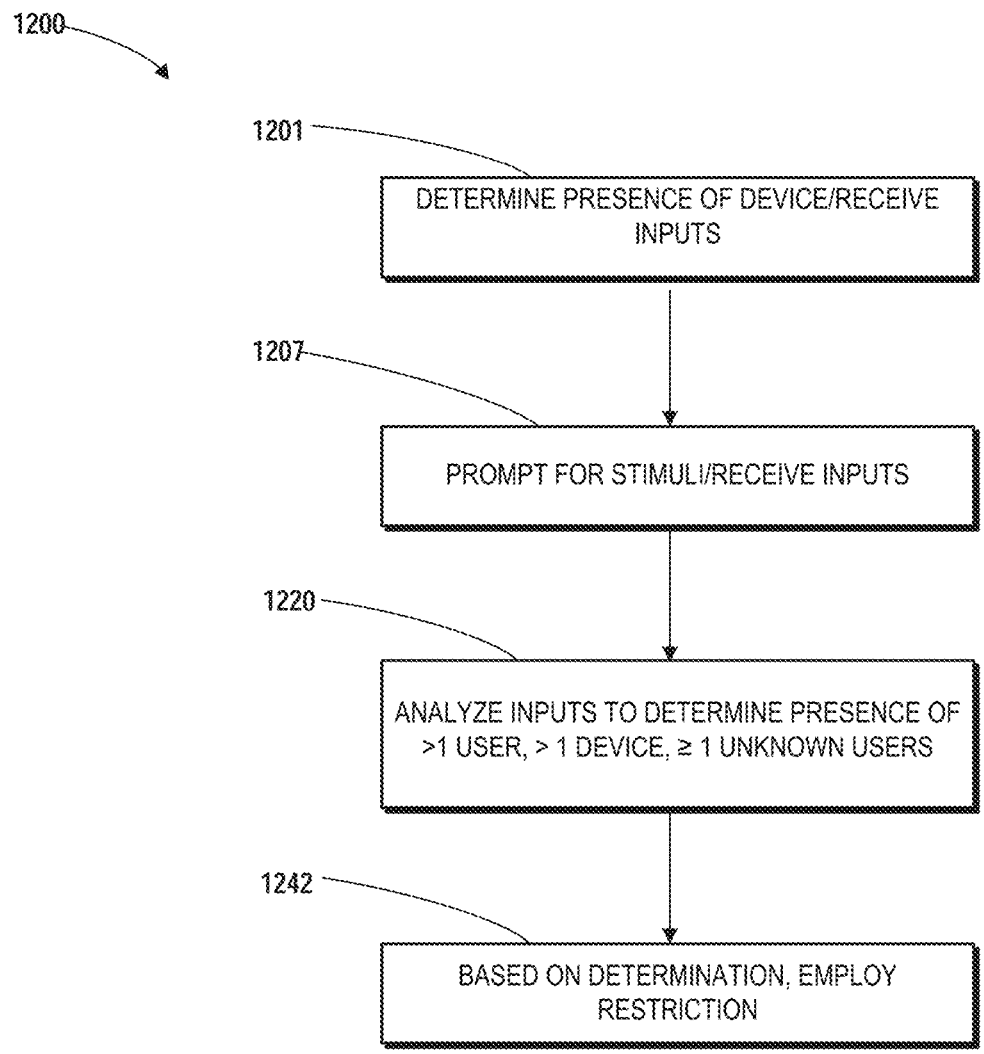
FIG. 12 is a flow diagram showing a routine that illustrates a broad aspect of another method of restricting operation of a mobile device in accordance with at least one embodiment disclosed herein.

Turning now to FIG. 12, a flow diagram is described showing a routine 1200 that illustrates a broad aspect of a method for restricting operation of a mobile device 105 in accordance with at least one embodiment disclosed herein. As will be described in greater detail below, various of the steps and operations that make up routine 1200 share substantial similarities to those described in detail herein.

At step 1201, processor 110 executing one or more of software modules 130, including, preferably, restriction module 171 determines whether a first mobile device 105 is present within a vehicle, and/or receives one or more first inputs from at least one of a vehicle data system 164 and/or at least one of a second mobile device 160, the one or more first inputs pertaining to a presence of the first mobile device 105 within a vehicle, such as through one or more of the various determination methods described in detail herein.

Then, at step 1207, mobile device 105 preferably prompts one or more users to initiate and/or provide one or more stimuli that can be received as inputs at mobile device 105 and/or receives one or more second inputs in response to the prompting, and/or receives one or more third inputs from vehicle data system 164, and/or receives one or more fourth inputs from at least one of the second mobile device 160, all in the manner described in detail herein.

At step 1220, processor 110 executing one or more of software modules 130, including, preferably, restriction module 171, analyzes at least one of the first inputs, the second inputs, the third inputs, and the fourth inputs to determine a presence of at least one of more than one user, more than one mobile device 105, 160, and/or one or more users not in the set of users known to be users of the first mobile device, substantially in the manner described in detail herein.

At step 1242, processor 110 executing one or more of software modules 130, including, preferably, restriction module 171 employs one or more restrictions at a mobile device 105, substantially in the manner described in detail herein.

Figure 13:
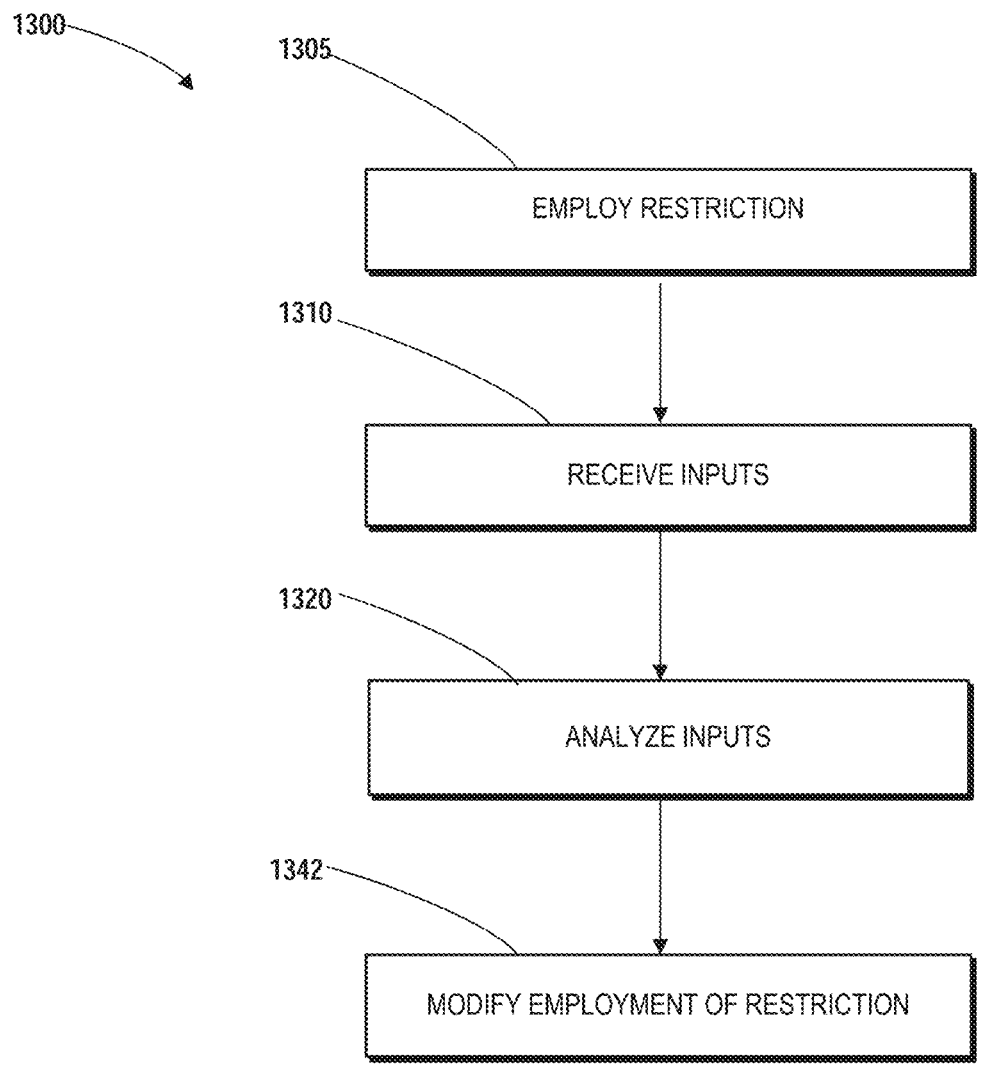
FIG. 13 is a flow diagram showing a routine that illustrates a broad aspect of another method of restricting operation of a mobile device in accordance with at least one embodiment disclosed herein.

Turning now to FIG. 13, a flow diagram is described showing a routine 1300 that illustrates a broad aspect of a method for restricting operation of a mobile device 105 in accordance with at least one embodiment disclosed herein. As will be described in greater detail below, various of the steps and operations that make up routine 1300 share substantial similarities to those described in detail herein.

At step 1305, processor 110 executing one or more of software modules 130, including, preferably, restriction module 171, employs one or more restrictions at mobile device 105, substantially in the manner described above with respect to step 705.

At step 1310, processor 110 executing one or more of software modules 130, including, preferably, restriction module 171 receives one or more inputs, preferably from at least one of the mobile device 105, a vehicle data system 164, and/or one or more other mobile devices 160, substantially in the manner described above with respect to step 710.

At step 1320, processor 110 executing one or more of software modules 130, including, preferably, restriction module 171, analyzes at least one of the inputs, to determine a presence of one or more users that are not known users of the first mobile device 105, substantially in the manner described in detail herein.

At step 1342, processor 110 executing one or more of software modules 130, including, preferably, restriction module 171, modified an employment of one or more restrictions at a mobile device 105, substantially in the manner described in detail herein.

Figure 14:
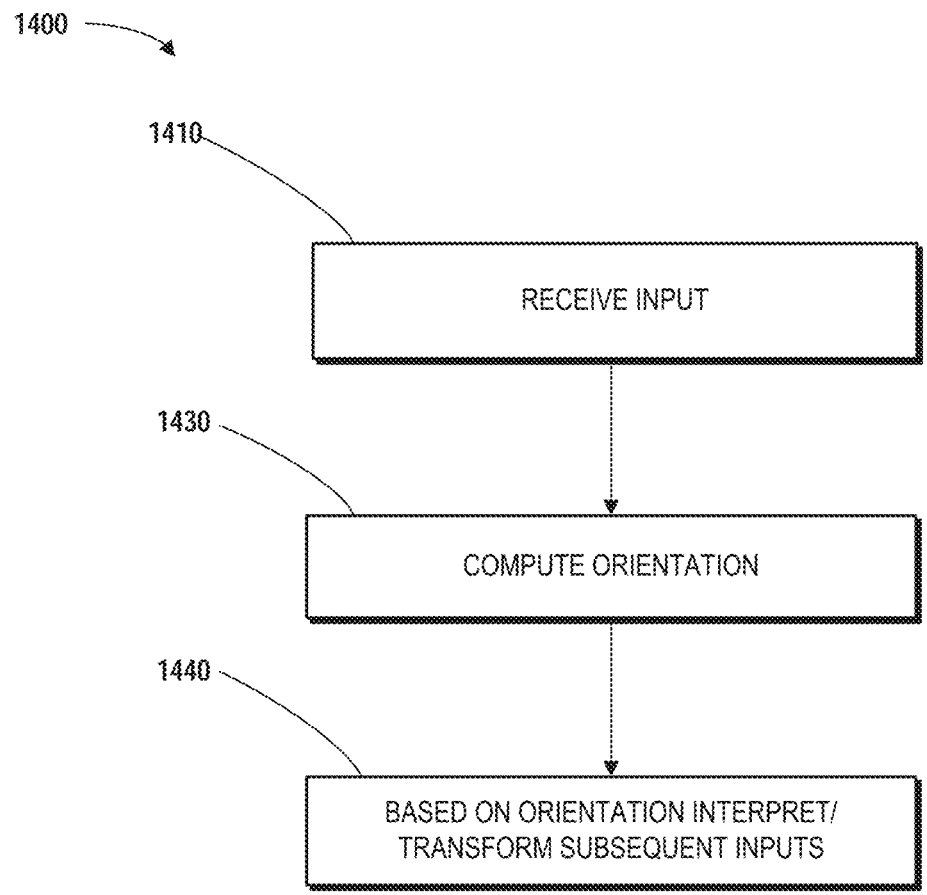
FIG. 14 is a flow diagram showing a routine that illustrates a broad aspect of a method for orienting a coordinate system of a mobile device in accordance with at least one embodiment disclosed herein.

Turning now to FIG. 14, a flow diagram is described showing a routine 1400 that illustrates a broad aspect of a method for orienting a coordinate system of a mobile device 105 in accordance with at least one embodiment disclosed herein. As will be described in greater detail below, various of the steps and operations that make up routine 1400 can share substantial similarities to those described in detail herein. It should be understood that the various steps of routine 1400 will be appreciated with reference to EXAMPLE 3 below and FIGS. 9-11B, and their accompanying descriptions.

At step 1410, processor 110 executing one or more of software modules 130, including, preferably, determination module 170 receives one or more inputs, preferably from at least one of (i) at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the mobile device 105 and (ii) a vehicle data system 164, substantially in the manner described in detail herein.

At step 1430, processor 110 executing one or more of software modules 130, including, preferably, determination module 170 computes, based on the one or more inputs, an orientation of the mobile device 105 relative to a coordinate system of a vehicle, such as a vehicle within which mobile device 105 is traveling.

At step 1440 based on the orientation, processor 110 executing one or more of software modules 130, including, preferably, determination module 170 interprets one or more subsequent inputs of the mobile device 105 in relation to the coordinate system of the vehicle and/or transforms the one or more subsequent inputs originating at the first device into values that are comparable with the coordinate system of the vehicle. See, for example, FIGS. 11A-B and EXAMPLE 3, below.

It should be understood that mobile device 105 is preferably communicatively coordinated with the vehicle data system, that vehicle data system is preferably configured (e.g., installed) with the vehicle (e.g., within the vehicle such as a car) and/or that mobile device is positioned within the vehicle, as described in detail herein.

By way of illustration, consider that based on the x, y and z accelerometers, the exact orientation of the device 105 can be determined relative to the ground (e.g, based on the gravitational force shown on the three accelerometers 145A, as is known to those of skill in the art based on such disciplines as trigonometry). When the device is within a moving car with additional forces, the inputs can be averaged over time and/or inputs from the gyroscope 145B can further assist this computation.

The orientation of the mobile device 105 can be detected relative to the car, for example, by using the angle between the device's magnetic north (e.g, from the 3-axis compass sensor) and the vehicle's GPS heading (as can be shown on the mobile device).

Accordingly, it can be appreciated that in the case of a moving car there are also additional forces (other than gravity). These forces can be accounted for, for example, through averaging over time and/or by using the mobile device's gyroscope 145B, as described herein and using methods known to those of ordinary skill in the art.

In the case that there are movements at the mobile device 105 that are unrelated to the car (say the user moved the device), these can be accounted for through time averaging and/or using the gyroscope 145B and or filtering out these higher frequency events, as described herein and using methods known to those of ordinary skill in the art.

By way of further illustration, consider that in a mobile device on a flat table, the Z-accelerometer shows gravity and the X-accelerometer and Y-accelerometer show 0.

If the mobile device is rolled or pitched (so that one side or one corner of the device remains in contact with the table), the value read by the z-accelerometer goes down (some of the gravity that it felt in stage one is handed over to the other accelerometers) and the X-accelerometer (for roll) and Y-accelerometer (for pitch) go up. The total sum of squares of the 3-accelerometers is always gravity. So we know the exact orientation of the device with regard to the ground.

To orient/align the device 105 with the coordinates of a car, the device's 105 north (detected, e.g., via its compass sensor) can be compared with the vehicle's GPS (such as from vehicle data system 164) heading (as read on the device). For example, (if the device screen is facing up, i.e., the device is not upside down) and its compass sensor shows that magnetic north is due north and the GPS heading sensor shows the vehicle is travelling due west, then the device is rotated 90 degrees to the right with regard to the car. Accordingly, the exact orientation of the device with respect to the coordinates of the car, as disclosed herein and described in greater detail at EXAMPLE 3 and with regard to FIGS. 9-11B.

By way of further illustration, in the case of a 2.5 g lateral acceleration detected at the mobile device 105, that could be because the mobile device 105 was in a very tight turn (right or left) or because there was very strong forward acceleration or deceleration—or some combination thereof. We cannot know what the car did (if anything) to cause this 2.5 g acceleration until we understand the orientation of the device 105 within the car and can transform the 2.5 g lateral acceleration felt on the phone into the acceleration in the vehicle's coordinate system, which is achieved through implementation of routine 1400.

Figure 11B:
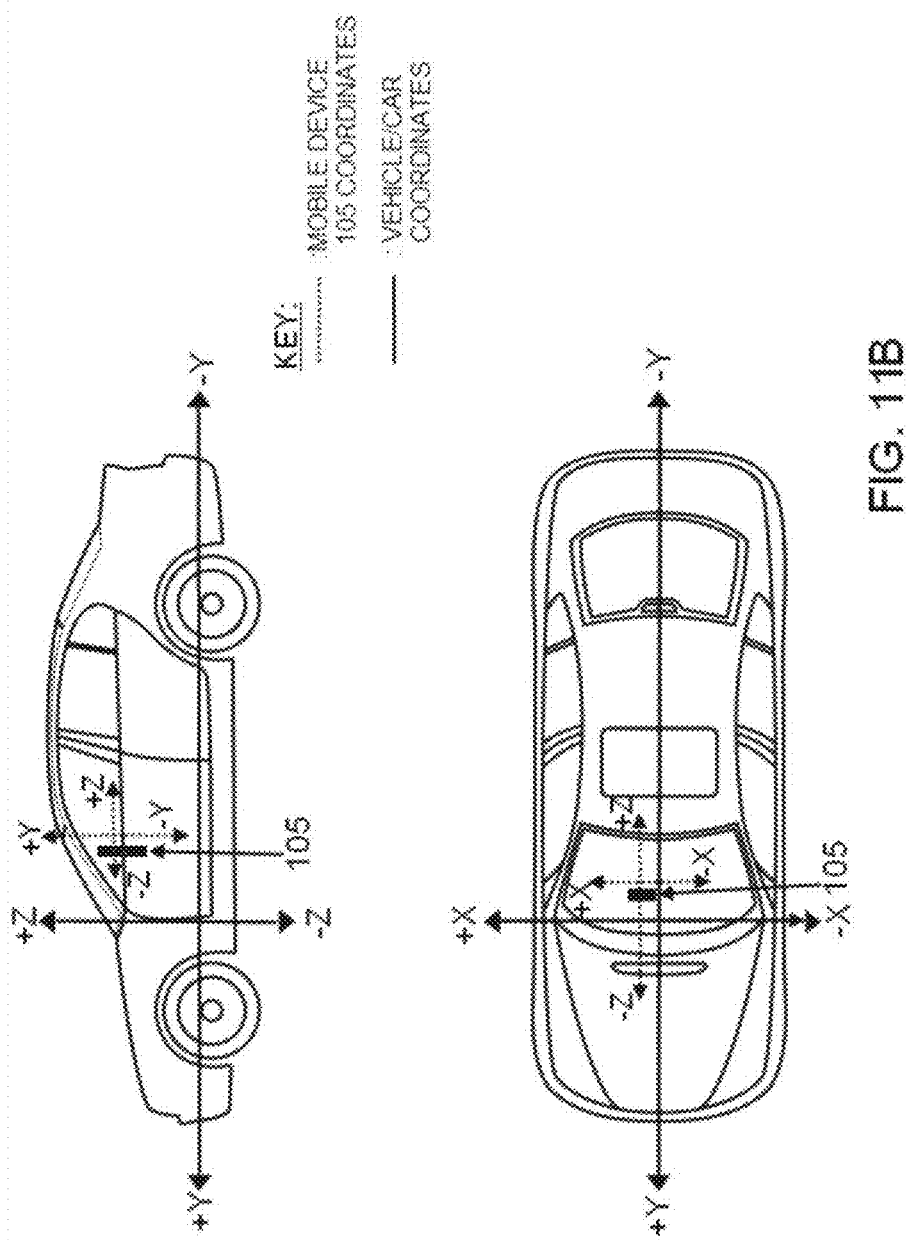

It should be noted that, for the purpose of the simplicity of the description and without any loss of generality, in one or more of the examples below, it will be assumed that the various mobile device(s) 105, 160 is (are) aligned with the vehicle within which they are traveling, such as as shown in FIG. 11A. That is, the coordinate system of a particular mobile device 105, 160 should be understood to be coincident with the vehicle's coordinate system, as depicted in FIG. 11A and described in greater detail in EXAMPLE 3. It should be further recognized that in practice, such as in various arrangements, such as that shown in FIG. 11B, mobile device 105, 160 is rotated with respect to the coordinate system of the vehicle in up to three dimensions. In order to correctly analyze the various inputs originating at sensors 145 of mobile device 145 within the context of the coordinate system of the vehicle, the rotation of the particular mobile device 105, 160 relative to the vehicle is preferably computed and the inputs originating at sensors 145 of the particular mobile device 105, 160 are preferably transformed into values for the coordinate system of the vehicle. This may be achieved in various ways, examples of which are provided below.

It should also be noted the several of the examples provided herein are presented from an event-centric perspective for the purpose of clarity. That is, various of the inputs originating at sensors 145 of mobile device 105, 160 have been described as corresponding to various real-world events such as turns, bumps, and/or stops. Accordingly, it should be appreciated that such event-centric descriptions are provided herein for the purposes of illustration and clarity, and are not intended in any way to be understood as limiting the scope of the present disclosure. Additionally, is should be appreciated that the various determinations described herein can also be performed from a sensor-centric perspective, wherein the various inputs originating at sensors 145 are considered, irrespective of a particular real-world event to which they correspond. It should be understood that the various approaches described herein can be employed in both even-centric and sensor-centric perspectives.

It should be understood that the following examples encompass further arrangements and embodiments of the systems and methods disclosed herein.

EXAMPLE 1

There are a number of inputs that can be utilized in various arrangements in order to identify one or more user determination characteristics, such as the location of a mobile device 105 and/or if a mobile device 105 is being operated by the driver or by the passenger of a car/truck/bus, such as:

Text Writing—As already noted herein, the text writing patterns of a driver who is multi-tasking between typing (or otherwise keystroking) and driving are different than those of a passenger who can fully focus on their typing (or otherwise keystroking) and remain relatively undistracted. The average time between keystrokes is generally greater for a driver than for a passenger. Also, the variability of time between keystrokes is generally greater for a driver than for a passenger. The frequency at which typing errors occur and/or are corrected and/or the frequency at which suspected errors are made relative to the quantity of text being typed is generally higher for a driver relative to a passenger. Additionally, correlations exist between pauses in texting and driving events that can be detected and/or perceived by sensors 145 of mobile device 105, as noted in detail above, that are generally more pronounced for the driver than for the passenger. Moreover, the precision with which the user types various keys (particularly in the case of a touchscreen/softphone keyboard) can be useful in determining whether the in-vehicle role of a user of mobile device 105 is a driver or a passenger. In addition, the pressure (and variability thereof) that the user applies to the various keys can be useful in making such a determination. By way of illustration, as noted above, a driver is likely to make relatively fewer mistakes and appears to type faster and more accurately when his/her car is stopped at a traffic light. Alternatively, as also noted above, there is likely to be a pause in texting that corresponds to a sudden stop or swerve, indicative of the driver having to quickly respond to an emergency action (e.g., suddenly having to brake to avoid hitting stopped traffic, or a driver having to swerve back into their lane). Additionally, patterns can be detected that reveal delays and/or pauses during the typing of single words, in contrast to "thought-delays" (wherein the user contemplates his/her next composition) that are more likely to occur after the completion of a word, phrase or sentence. In addition, a driver is likely press the keys relatively less accurately than a passenger. A combination of one or more of the signatures of the keystroke "cadence," frequency of typing errors, correlation of the keystroke cadence to vehicle movement patterns, intra-word typing pauses, keystroke precision and pressure applied can be used to cumulatively identify one or more user determination characteristics and thus ultimately determine whether the user of mobile device 105 is a driver or passenger.

As also noted above, various arrangements preferably incorporate identification of one or more of the user determination characteristics referenced above and herein. In certain arrangements, each user determination characteristic (e.g. error proportion, correlation of typing speed to acceleration etc.) can be considered as a point in a K-dimensional space. Classification algorithms based on supervised learning, as are well known to those of ordinary skill in the art, can then be applied to the resulting K-dimensional signature(s) to determine the probability that the in-vehicle role of the user of mobile device 105 is a driver or a passenger.

Text Reading/Screen Viewing—User determination characteristic(s) can be identified based on patterns in the reading of text messages (or any other such text item such as an email or webpage, or any other such viewing of items on a display screen, such as during the playing of a video game) on a mobile device 105, thereby serving to distinguish between a driver and a passenger. For example, drivers tend to change the orientation of and/or move (e.g. rotate in his/her palm) mobile device 105 more frequently when attempting to read a message of a given length (in order to periodically glance back at the road), whereas a passenger will read such a message in a comparatively more constant state. This is especially true during road maneuvers that require more driver concentration, such as turns and accelerations. This phenomenon can be observed as a high degree of correlation between vehicle accelerations and/or gyroscopic rotations as detected by accelerometer 145A and gyroscope 145B, respectively, of mobile device 105 and the changes in orientation of the mobile device 160 (unrelated to movements in the vehicle) as measured by one or more of accelerometer 145A, gyroscope 145B, GPS 145C and magnetometer 145E and, in particular, the presence or absence of a (non-vehicle related) mobile device movements just prior to vehicle movements. Preferably, once this correlation reaches or exceeds a certain threshold, the in-vehicle role of the user of mobile device 105 can be determined to be a driver and/or once this correlation reaches or exceeds another certain threshold, the in-vehicle role of the user of mobile device 105 can be determined to be a passenger.

Driver-Specific Movements—Various movements and/or forces can be detected by one or more of sensors 145 of mobile device 105 that can be determined to be unique to a driver. In the alternative, a lack of perception of such unique forces, such as "signature" forces at a mobile device 105 can indicate that the user of such a device is not a driver and is thus a passenger. When in contact with a device 105 (such as when holding it), a driver influences the movement of a mobile device 105 through driver-related actions that include pressing and releasing the gas/brake/clutch pedals and by moving his/her foot from one pedal to another over the course of driving. For example, prior to a period of strong and prolonged acceleration perceived by accelerometer 145A of mobile device 105 (which is typically due to acceleration, braking, and/or wheel rotation), there is a smaller, different acceleration and/or angular movement perceived slightly (in the 100's of milliseconds) in advance, such as at one or more of sensors 145, that originates at the driver's body maneuver (such as the pressing of a gas pedal) that initiates the acceleration of the vehicle. A driver also causes a mobile device 105 to move by rotating the steering wheel. Thus, in a case where a mobile device 105 is in contact with a driver turning a steering wheel, various of sensors 145, such as accelerometers 145A and/or gyroscope 145B of mobile device 105 can detect certain accelerations and rotations. Based on a retrospective analysis of such inputs—for instance, analyzing inputs corresponding to acceleration of a car with inputs perceived immediately prior—it can be determined whether the user operating such a mobile device 105 is a driver or a passenger. If such unique/signature forces are perceived in close proximity (generally, immediately before) acceleration, etc., it can be determined that the user is a driver. Conversely, if such inputs are not detected immediately prior to acceleration, it can be determined that the user is a passenger (provided that the user is in physical contact or communication with mobile device 105).

By way of further illustration, prior to a period of strong and prolonged lateral acceleration and/or gyroscopic yaw perceived by accelerometer 145A and gyroscope 145B of mobile device 105 due to turning, there is a smaller, different acceleration and/or angular movement perceived slightly (in the 100's of milliseconds) in advance that originates at the driver's body maneuver that initiates the turning of the steering wheel and that is unlikely to be that of a passenger.

This approach can be also applied to other driver movements (e.g., looking in the mirrors, turning on the directional signal), wherein the driver's movements will be detected on mobile device 105 that is in contact with the driver slightly before another signal is detected (e.g., accelerometer 145A or gyroscope 145B for looking in mirrors, microphone 145D for turning on directional), on mobile device 105, whereas these serial relationships will not be present if mobile device 105 is being operated by a passenger.

In another approach, the mobile device of a driver will, on average, display larger movements than that of a passenger measurable by sensors 145 of mobile device 105 due to the fact that the driver is likely to be holding the mobile device 105 in only one hand, whereas a passenger is more likely to be using both hands to hold a mobile device 105, or is capable of increased focus even when using only one hand to operate mobile device 105. This can preferably be done by taking the Fourier transform of a 3D acceleration function and integrating it (squared, i.e. L2-norms) over N disjoint frequency intervals, as is well known to those of ordinary skill in the art. The resulting 3N numbers are preferably a "signature". The signature corresponding to a driver can be distinguished from that of a passenger using a classification algorithm, such as SVM, which has preferably been trained on sufficiently large pre-classified signature bank, as is also known to those of ordinary skill in the art.

GPS—GPS 145C of mobile device 105 can be used, preferably, in certain arrangements, in conjunction with other sensors, to identify the in-vehicle position of mobile device 105. In certain arrangements this is achieved in part based on knowledge of the lane boundaries of the road on which the vehicle is driving (based on map data or computation/observation), together with a determination of mobile device's 105 location, using GPS 145C, to be on the right or left side of such lane. If mobile device 105 is in the left part of its current lane, then it can be determined to be on the left side of the vehicle within which it is traveling, while if it is in the right part of its current lane, then it is on the right side of the vehicle. Such in-lane location calculations can further be averaged over time to increase the accuracy of the location of the mobile device 105 within its then current lane and, as a result, the accuracy of the determination of the location of mobile device 105 inside the vehicle.

Turns—It is well known that when a moving vehicle turns, it experiences various physical forces that are different at different points of the vehicle and which can be continuously measured at every such point on the vehicle during such turn. Among these are: (a) The timing and magnitude of the lateral acceleration (from the turn's centripetal force) and/or changes thereto that occur to a mobile device 105 as the vehicle in which it is located travels in a turn and that are measured by accelerometer 145A on mobile device 105, and can be compared to (b) the (contemporaneous, led and/or lagged) timing and magnitude of the forward accelerations measured by the accelerometer 145A of such mobile device 105 and/or any changes thereto and/or to (c) the timing and magnitude of the upward accelerations (z-axis) as measured by accelerometer 145A of such mobile device 105 and/or changes thereto. These various detections can preferably be computed together to determine if mobile device 105 is on right side or left side of the vehicle. For example, during a right hand turn, a mobile device 105 on the left side of a vehicle experiences an instantaneous increase in its forward acceleration and a decrease in its upward acceleration (as detected by accelerometer 145A), whereas a mobile device 105 on the right side of the vehicle experiences an instantaneous decrease in its forward acceleration and an increase in its upward acceleration. During a left hand turn, a mobile device 105 on the left side of a vehicle experiences an instantaneous decrease in its forward acceleration and an increase in its upward acceleration, whereas a mobile device 105 on the right side of a vehicle experiences an instantaneous increase in its forward acceleration and a decrease in its upward acceleration.

It is noted that the example above and below are among the numerous examples in which it is assumed, for the simplicity of explanation and without loss of generality, that the mobile device is perfectly aligned with the vehicle.

In certain arrangements, the lateral (right/left) location of mobile device 105 within a vehicle can be determined by using a formula such as:

$$P = \frac{\text{Cov}(A_{For}, \omega^t)}{\text{Var}(\omega^r)}$$

where P is the lateral position of mobile device 105 in the vehicle, $A_{For}$ is the forward acceleration of mobile device 105 and $\omega$ is the angular velocity around the z-axis (yaw) of mobile device 105 (which is generally equal to the car's angular velocity around the z-axis (yaw), if mobile device 105 is still, relative to the vehicle). In various arrangements, $\omega$ can be measured using GPS 145C, accelerometer 145A, gyroscope 145B of mobile device 105, and/or an inbuilt vehicle wheel rotation sensor of vehicle data system 164 (as can be transmitted via an OBD-like protocol). In certain arrangements, transformations can be applied to certain data items prior to applying them to a formula such as the one provided above, as described in greater detail below.

In other arrangements, a similar measure can be used for upward acceleration (as opposed to and/or in addition to forward acceleration) to measure the second effect.

In other arrangements, a similar measure can be used to compare the gyroscopic roll and/or changes thereto with the upward acceleration and/to changes thereto. It is also noted that this can also occur for reasons that are unrelated to turns and such instances may be useful for the purposes described herein as well.

Once the lateral in-car location of mobile device 105 is determined, if the location is sufficiently to the right of the middle (e.g., P is greater than some suitably chosen positive threshold), it can be fairly assumed that mobile device 105 cannot be in the possession of the driver and thus the in-vehicle role of the user of mobile device 105 can be determined to be a passenger.

It should be understood that the term "turn" as used herein can refer to a turn or any angle and/or curvature and/or any change in lateral acceleration and/or gyroscopic yaw, no matter how large or small and the comparisons described above can be applied discretely or continuously. It should also be appreciated that such inputs can be perceived at practically any time and/or interval, even those that do not necessarily correspond to "turns" as conventionally understood, and such inputs should be understood to be within the meaning of the term "turns" as used herein.

Bumps—The lack of smoothness in the road upon which a vehicle travels can also be used to determine if mobile device 105 is in the front or rear of the vehicle. The timing and magnitude/degree of upward acceleration (z-acceleration) detected by accelerometer 145A of mobile device 105 and/or any changes thereto can be compared (preferably in an automated fashion), over time, with leads and/or lags of the device itself, based, among other things, upon the speed at which the vehicle is travelling (as determined, for example, from the GPS 145C and/or vehicle data system 164), to determine if mobile device 105 is in the front or rear of the vehicle. In most cases changes in upward acceleration will be sensed twice by accelerometer 145A of mobile device 105—once when the front wheels impart such force to mobile device 105 (e.g., a bump, or a pot-hole) and then again when the rear wheels impart such force to the mobile device 105. The expected time difference between the two such instances can be measured based on the vehicle's speed which is known via the GPS 145C of mobile device 105 and the vehicle's wheel base, which itself can be calculated with high accuracy over numerous bumps (e.g., if a vehicle is travelling at 30 m/sec and the bumps are detected 0.1 seconds apart, it can be concluded that the wheel base is 3 meters). Accordingly, if the first instance of upward acceleration sensed by accelerometer 145A is larger than the second instance of upward acceleration sensed, and the time in-between the two accelerations is consistent with the time it takes the vehicle to travel a distance equal to its wheelbase (at its current speed), then mobile device 105 can be determined to be in the front of the vehicle. If the first instance of upward acceleration sensed is smaller than the value of the second instance of upward acceleration then mobile device 105 can be determined to be in the rear of the vehicle. These comparisons can be accumulated over several occurrences to further improve accuracy and the results can be passed though a low-pass filter (e.g., a Kalman filter, as are well known to those of ordinary skill in the art) to provide a continuously updated result. It should be understood that the referenced approach can be further expanded to determine if mobile device 105 is on the right side or the left side of a vehicle, such as by analyzing information pertaining to passing over lane-separating bumps twice during a lane change.

It should be understood that the term "bump" as used herein can refer to a change of any size in the upward acceleration, irrespective of positive or negative change and irrespective of how large or small and the comparisons and filtering described above can be applied discretely or continuously at regular or irregular sampling rates.

Forward vs. Upward Acceleration/Deceleration—It is well known that when a moving vehicle accelerates/decelerates, it experiences various physical forces that are different at different points of the vehicle and which can be continuously measured at every such point on the vehicle during such acceleration or deceleration. Among these items are: (a) The timing and magnitude of the forward acceleration and/or changes thereto that are perceived by accelerometer 145A and/or the gyroscopic pitch (rotation around the x-axis) and/or changes thereto that are perceived by the gyroscope 145B of mobile device 105 as the vehicle in which mobile device 105 is located travels and that are measured by mobile device 105, which can, in turn, be compared to (b) the (contemporaneous, led and/or lagged) timing and magnitude of the upward accelerations (z-accelerations) of mobile device 105 and/or any change thereto to determine if mobile device 105 is in the front or rear of the vehicle (during positive forward acceleration (e.g. stepping on the gas), mobile device 105 in the front of the vehicle experiences an increase in its upward acceleration and positive pitch, whereas a mobile device 105 in the rear of the vehicle experiences a decrease in its upward acceleration and positive pitch, while during negative forward acceleration (e.g., braking), mobile device 105 in the front of the vehicle experiences a decrease in its upward acceleration and negative pitch, whereas mobile device 105 in the rear of the vehicle experiences an increase in its upward acceleration and negative pitch).

In one arrangement, this correlation can be continuously measured over a constant time window with a formula such as:

$$\text{corr}(A_{For}, A_{up}) = \frac{\text{cov}(A_{For}, A_{up})}{\sqrt{\text{var}(A_{For}) \cdot \text{var}(A_{up})}}$$

where $A_{For}$ is the forward acceleration and $A_{up}$ is the upward acceleration.

In other arrangements, a similar measure can be used to compare the upward acceleration and/or changes thereto with the gyroscopic pitch and/or changes thereto (as opposed to and/or in addition to forward acceleration) to measure this effect.

Entry & In-Vehicle Movements—The signature of a user entering a vehicle, as perceived by one or more of sensors 145 of the user's mobile device 105, is also identifiable. The signatures for entering a vehicle on the right side are different than those for entering on the left side (mobile device 105 experiences lateral acceleration to the left in the former case and to the right in the latter case—which can be determine using an integration of the axis-aligned acceleration figures at the relevant timespan before the car began to move). Similarly, the signatures of a user entering a rear seat differ from those of a user entering a front seat. For the United States and most other countries, a user that enters in the left-front of a vehicle is the driver, and all other occupants are, by default, passengers. In arrangements where mobile device 105 is capable of communication with the vehicle's on-board computer system (e.g., vehicle data system 164), such communication allows the vehicle to transmit useful information to mobile device 105 (which can preferably be received via communication interface 150), such as which vehicle door was opened and closed thereafter. This allows mobile device 105 to identify its user as a driver. In addition, the in-vehicle location of mobile device 105 can be continuously tracked after its entry into a vehicle using one or more of sensors 145 (as such, the location of mobile device 105 can be tracked even if one of the occupants passes mobile device 105 to another occupant). Such tracking is preferably achieved by double integrating the acceleration figures and gyroscope values as is done in inertial navigation systems and known to those skilled in the art.

Magnetic Field—A vehicle's metallic and electrical parts influence the magnetic field in the vicinity of and inside such vehicle. A 3-axis magnetometer 145E of mobile device 105 can be used to detect these influences by measuring such magnetic field(s) at various times before and during a vehicle's operation (e.g., a car that has not yet been started will have a different magnetic signature than one in which the electric systems are operating) and by comparing them with known magnetic signatures of different in-vehicle locations in order to determine the in-vehicle location of mobile device 105. Such signatures can be universal and/or can depend on additional parameters such as vehicle model, vehicle location, etc.

For example, the major metallic component in most vehicles is the motor and in most vehicles (e.g., cars, buses), and it is normally situated in the front part of the vehicle, near the center. The magnetic field sensed by magnetometer 145E of mobile device 105 can be compared with the magnetic field that is otherwise present absent the magnetic disturbances—thereby indicating the direction of the motor. The lateral component of that direction is preferably the opposite of the left-right in-car location of mobile device 105.

User Baseline vs. Population Baseline—As described in detail above, such as with respect to step 224, in the identification of many of the user determination characteristics described above, the values and signatures measured on and/or computed with and/or in relation to mobile device 105 are compared to baseline values (which are preferably stored in one or more databases 174, 162) in order to determine if mobile device 105 is that of a driver or a passenger. In certain arrangements, such baseline values can be independent of the user (e.g., the standard deviation of the time between keystrokes for all people in the country using a particular model phone), while in other arrangements such values can be user dependent (e.g., this mobile device 105 (or this user of this mobile device 105, if such is available) usually texts at 100 characters per minute, currently he is texting at the rate of 10 characters per minute—thus the person holding it is likely driving).

EXAMPLE 2

As noted above, such as at steps 222 and 223, considering multiple inputs can increase the accuracy of one or more of the determinations described herein, such as the determination of an in-vehicle role of a user of a mobile device 105, 160. This advantage is further illustrated above at steps 225 and 226, wherein inputs from multiple devices are considered in order to compute such determinations. Further illustrations of such inputs/determinations include, but are not limited to:

In-Vehicle Location—In the United States and in most other countries in the world, drivers are the left-front most occupant in a vehicle, relative to the front end of the vehicle. By identifying whether a particular mobile device 105, 160 is or is not the left-front most device within a vehicle, a determination can be made that such device 105, 160 is or is not being operated by the driver.

It should be understood that the referenced in-vehicle identification/determination is preferably achieved in conjunction with communication between mobile device 105 and one or more of mobile devices 160, whether through direct communication or through network 166. It should also be appreciated that in certain arrangements such identification(s)/determination(s) can be performed in a server-side configuration, while in other arrangements such identification(s)/determination(s) can be performed in a client-side configuration. In one such server-side configuration, one or more software modules 130 are preferably executing at the various mobile devices 105, 160. One or more of the modules configure the each of the respective devices 105, 160 to transmit its absolute location coordinates (such as those provided by GPS 145C and/or an inertial navigation system (INS) and/or its relative location (e.g., 3 meters from WiFi device #1234) to central machine 168. Central machine 168 can then process the various locations coordinates and/or relative locations received from the various devices 105, 160 in order to determine which of the various devices 105, 160 are sufficiently close to one another, over a period of time (e.g., 1 minute, 1 hour, etc.), based on which it can be determined that such devices 105, 160 are present within the same vehicle. In a client-side configuration, the mobile devices 105, 160 communicate between one another (such as through communication interface 150), exchanging absolute location and/or relative location and determining which other devices 105, 160 are in within the same vehicle, substantially in the manner described above with regard to the server-side configuration. By way of further example, in certain arrangements one of devices 105, 160 can emit a tone and/or signal (such as an audio tone), and only those devices 105, 160 that perceive the emitted tone are determined to be within close proximity of the device that emitted the tone.

In both server-side and client-side configurations, upon determining which mobile devices 105, 160 are within a particular vehicle, sensor data (that is, data originating at one or more of sensors 145, such as location coordinates from GPS 145C, or lateral accelerations during a turn) from the various devices 105, 160 can be compared with one another to determine a relative in-vehicle location of one or more of the devices 105, 160. Such relative location can be subsequently filtered to generate a real-time driver-passenger determination, providing increasing accuracy in driver/passenger identification.

Turns—(a) The timing and magnitude of the lateral acceleration (from the turn's centripetal force) and/or changes thereto detected by one or more sensors 145 (e.g., accelerometer 145A and/or gyroscope 145B) of mobile devices 105, 160 located in the same vehicle as such vehicle travels through a turn can be compared; to (b) the (contemporaneous, led and/or lagged) timing and magnitude of forward accelerations of one another and/or change thereto; and to (d) the (contemporaneous, led and/or lagged) timing and magnitude of upward accelerations (z-axis) of one another and/or changes thereto, to generate a more accurate determination of the relative location of one or more of the devices 105, 160 within the vehicle, in a manner substantially similar to that described above in EXAMPLE 1.

By way of illustration, during the execution of a right-hand turn, the forces experienced by a mobile device 105, 160 located on the right-side of the car are lower in magnitude than those experienced at a mobile device 105, 160 located on the left-side. This comparison can be further recorded and averaged over a certain time interval to improve the accuracy of the determination. Additionally, the accelerations experienced during such a turn will be detected by one or more of the sensors 145 (e.g., accelerometer 145A) of a mobile device 105, 160 located in the front of a vehicle before they are detected by those of a mobile device 105, 160 located in the rear of such vehicle. This variation can be measured and compared between such mobile devices 105, 160 to further determine the relative in-vehicle location of one or more of the devices 105, 160.

In addition, the timing and/or magnitude of the forward acceleration and/or changes thereto that are perceived by various devices 105, 160 located in the same vehicle as such vehicle travels and that are detected by such devices (or their respective sensors 145) can be compared to the (contemporaneous, led and/or lagged) timing and magnitude of the upward accelerations (z-axis) of one another and/or change thereto to generate a more accurate determination of the front/rear location of one or more of the devices 105, 160 within the vehicle by using substantially the same techniques described in EXAMPLE 1 above with regard to "Forward vs. Upward Acceleration/Deceleration."

By way of illustration, a correlation of the difference between forward accelerations of two devices can be computed based on the average of their respective lateral accelerations. In a manner similar to that described in EXAMPLE 1 with regard to "turns," such a correlation reflects the relative lateral positions of the devices in a highly accurate fashion.

In other arrangements, when (a) the devices' lateral accelerations and/or changes thereto are compared with their gyroscopic yaws and/or changes thereto; and/or (b) the devices' upward acceleration and/or changes thereto are compared with their gyroscopic rolls and/or changes thereto, the benefit of having readings from two or more devices can be derived by averaging results across devices and/or comparing results between devices in a manner substantially similar to those described in detail above.

Bumps—The timing and magnitude of upward acceleration (z-axis) and/or changes thereto as detected by one or more sensors 145 of a particular mobile device 105, 160 in a vehicle can be compared to those detected at one or more other mobile devices 105, 160 within the same vehicle, over time, with leads and/or lags, based, among other things, upon the speed at which the vehicle is travelling (as can be determined, for instance, based on inputs from GPS 145C, and/or vehicle data system 164) to generate a more accurate determination as to whether a particular mobile device 105, 160 is in the front or rear of the vehicle. This is achieved in part by using techniques substantially similar to those described in EXAMPLE 1 above with regard to "Bumps." It should also be noted that such techniques can also be expanded to determine if a particular mobile device 105, 160 is on the right side or the left side of said vehicle (e.g., passing over lane-separating bumps twice during a lane change).

Driver-Anticipatory Movements—The driver of a vehicle is generally better able to anticipate the movements of the vehicle he/she is driving as compared to the passengers because the driver is the initiator of many of the movements that the vehicle undergoes, and can thus anticipate the forces that are created as a result of the vehicle's movement. Such predictive actions can be detected by one or more of sensors 145 of mobile devices 105, 160 (e.g., accelerometer 145A and/or gyroscope 145B), and can be further processed to identify whether a particular mobile device 105, 160 is being used by a driver or a passenger. A driver instinctively tenses and/or flexes certain of his/her muscles to adjust for the vehicle movements that are about to occur on average, more adroitly (less sudden with less corrective body movement) and more quickly than a passenger does. By way of illustration, a driver anticipates and compensates for the forces experienced during a turn quicker and more accurately than a passenger in the vehicle does. Similarly, a driver anticipates and compensates for the forces experienced during sharp deceleration (braking) more quickly and more accurately than a passenger. A driver also anticipates and compensates for the forces of a lane change more quickly and more accurately than a passenger. By way of further illustration, the driver can be thought of as a dampening system which performs better than a corresponding "passenger" system, due to the driver's higher degree of consciousness, awareness, and/or anticipation. In one arrangement, one or more of the listed effects/phenomena can be detected/identified by processing one or more inputs from one or more sensors 145, such as by measuring the change in acceleration (i.e. the L2 norm of the derivative of the acceleration) over the relevant time window. In this case the acceleration is preferably further band-pass filtered to focus only on frequencies relevant to this determination, and to further exclude other driver-acceleration effects (e.g., hand-shaking, etc.) as discussed herein.

Sounds/Signals—The in-vehicle location of a mobile device 105, 160 can also be determined based on the sounds, signals, and/or transmissions perceived by one or more sensors 145 of a mobile device 105, 160 (e.g., microphone 145D) in comparison (or, alternatively, not in comparison) to the sounds perceived at other mobile devices 105, 160 within the same vehicle. For example, tones (whether audible or inaudible) perceived at two devices within the same train can be processed in order to determine which of the devices is located more towards the front of the train based on one or more sounds perceived whenever another train passes the subject train in the opposite direction. The sound of passing train is first perceived at the device located more towards the front of the train, and is only later perceived by the device located farther back within the train. In an alternative arrangement, a similar approach can be employed at a single device 105, 160, i.e., without comparing the sounds perceived at one device 105, 160 to those heard on another within the same vehicle. Multiple microphones incorporated within and/or configured with a single device 105, 160 and/or multiple additional devices 105, 160 within the same vehicle can be used to determine the location of one or more of such devices 105, 160 within the vehicle by measuring the timing and signature of the sounds perceived at each microphone and processing them against/comparing them to one another. Accordingly, it can be appreciated that in certain arrangements, a substantially identical process can be employed at each of the respective devices substantially in parallel (such as the measuring of a sound timing and signature at a respective device's microphone), and the results of such parallel processes at the respective can then be compared (such as at one or both of the devices) in order to determine the position of the devices relative to one another, in the manner described above.

By way of illustration, in a scenario where two mobile devices 105, 160 are present within a vehicle and each device has two microphones 145D, each sound that is made using each of the speakers of the respective devices can be perceived at each of the four microphones (it should be understood that the methods and systems disclosed herein further enable the generating and/or projection of such sounds). The time lags between the sound streams can be processed to determine eight speaker-microphone distances (each one reflecting the distance between a particular speaker and a particular microphone). Such distances, along with known orientations of the devices 105, 160 (based on inputs received from one or more of the sensors 145, e.g., gyroscope 145B) can be processed within one or more geometric equations which, once solved directly, identify a relative position of a given device. Thus, by way of illustration, if a first device 105, 160 is determined to be one meter to the front-left of a second device 105, 160, it can be determined that the first device belongs to be the driver, while the second device belongs to the passenger.

Magnetic Field: A vehicle's metallic and electrical parts influence the magnetic field in the vicinity of and inside such vehicle. Inputs originating at a 3-axis magnetometer 145E of a mobile device 105, 160 can be used to detect and determine these influences by processing such inputs to determine a magnetic field at various times before and during such vehicle's operation (e.g., a car that has not yet been started will have a different magnetic signature than one in which the electric systems are operating) and by comparing them with known magnetic signatures of different in-vehicle locations in order to determine the in-vehicle location of such device 105, 160. The presence of two or more devices within a single vehicle can influence each other's magnetic readings in a way that can be determined based on their comparison. It should be understood that in certain arrangements, such signatures are universal while in other arrangements they depend on additional parameters such as vehicle model, vehicle location, etc. In addition, comparing the magnetometer 145E inputs from more than one mobile device 105, 160 located within the same vehicle can enable a more accurate determination of the in-vehicle location of one or more of such devices.

EXAMPLE 3

As noted above, the processing of the various inputs discussed herein is preferably enhanced by incorporating various additional processing operations which serve to further enhance the accuracy of the determinations that are made. Examples of such further processing operations include, but are not limited to:

Clock synchronization—As noted above, in arrangements where inputs originating from multiple devices 105, 160 are processed together (such as several of those referenced above in EXAMPLE 2), it is preferable that simultaneous timing measurements originating at the respective devices 105, 160 are compared as well. In one arrangement, this can be effectively achieved by synchronizing the internal clocks of the respective devices 105, 160. By way of illustration, a relative displacement can be estimated, and this estimate can be used to process all relevant inputs such that they are synchronized to the same clock.

Examples of such synchronization methods include: (A) processing time inputs from GPS 145C to compute a mean time displacement between GPS clock and each the clock of each device 105, 160. The difference between those displacements can be determined to be the displacement between the devices. (B) Configuring one of the devices 105, 160 to emit a sound and receiving the sound at a second device (such as at microphone 145D), and further noting the time the respective events occurred at each device (that is, the time of the emitting of the sound and the time of the receipt of the sound) and then repeating same process in reverse. The noted times can then be subtracted from one another, reflecting the time that it takes to the sound to travel, and such values will cancel themselves out, leaving twice the relevant time displacement remaining.

Orientation Detection—In discussing the processing of various inputs, such as those of accelerometer 145A and other sensors 145, it is preferably that various inputs be identified and/or separated into elements such as "forward acceleration", "lateral acceleration" and such. These terms are relative to the car's coordinate system (e.g. "forward" is the direction of car's movement) while the raw inputs from the various sensors 145 are relative to the coordinate system of a mobile device 105, 160 (it should be understood that while the present example is described with respect to a car, substantially similar approaches can be applied to other vehicles as well). In order to transition (rotate) such inputs, the relative orientation of the mobile device 105, 160 within the coordinate system of the car is preferably established. The following figures depict the various relative coordinates of mobile device 105, 160, of a car, and of a mobile device 105, 160 within a car:

FIG. 9A depicts the relative coordinate system of mobile device 105, as is known to those of ordinary skill in the art and referenced herein.

Figure 9B:
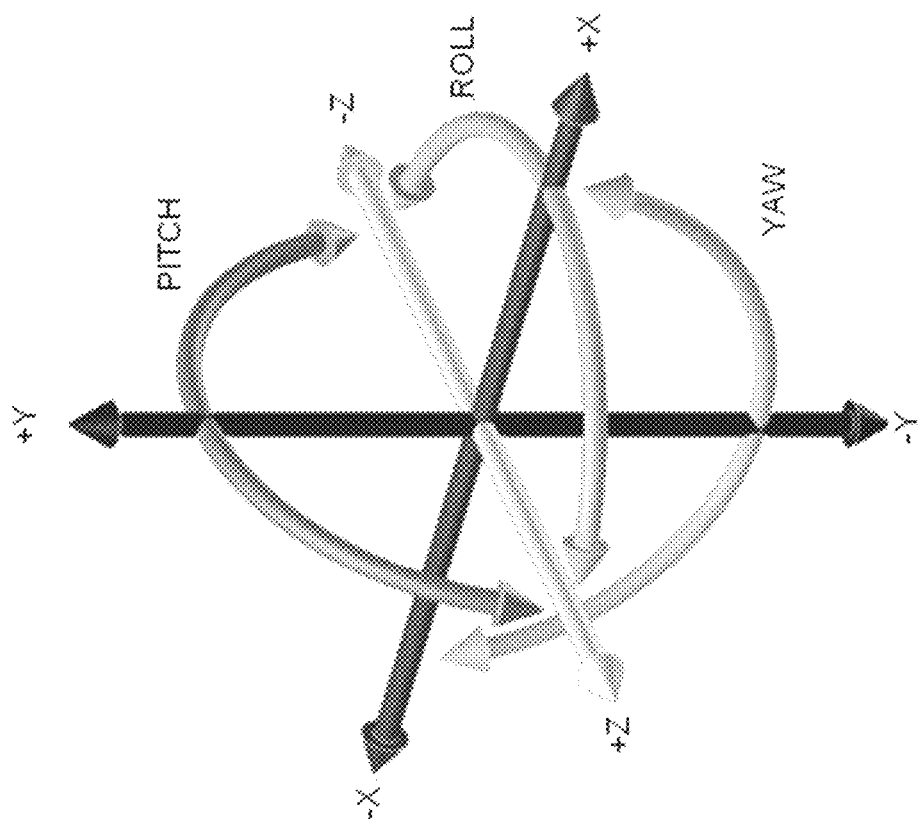
FIG. 9B is a diagram depicting exemplary relative accelerations and gyroscopic rotations of a mobile device.

FIG. 9B depicts the relative accelerations and gyroscopic rotations of a mobile device, as is known to those of ordinary skill in the art and referenced herein. It should be understood that although mobile device 105 is not shown in FIG. 9B for the sake of clarity, the various relative acceleration and rotations shown in this figure are relative to a mobile device in the same position as that shown in FIG. 9A.

Figure 9C:
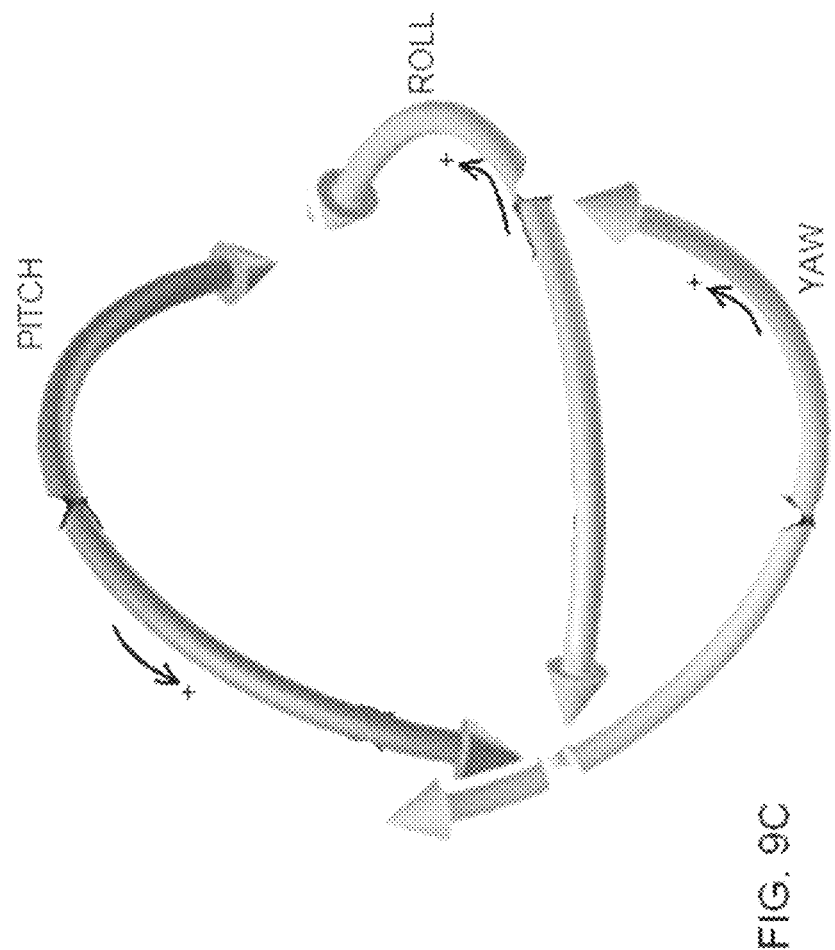
FIG. 9C is a diagram depicting an exemplary gyroscopic sign convention, as used herein.

FIG. 9C depicts the gyroscopic sign convention used herein, as is known to those of ordinary skill in the art and reference herein.

FIG. 10 depicts the coordinate system used in relation to a vehicle (such as at vehicle data system 164) as is known to those of ordinary skill in the art and reference herein.

FIGS. 11A-B depict mobile device 105 and its respective coordinate system in relation to a car and its respective coordinate system. For example, as will be described in greater detail below, in certain arrangements the respective coordinate systems can be transitioned, such that it is recognized, for example, that the +Z coordinate of the car corresponds to the +Y coordinate of the mobile device 105, and the +Y coordinate of the can corresponds to the -Z coordinate of the mobile device 105, as can be appreciated with reference to FIG. 11B.

Establishing the orientation of a mobile device 105, 160 within the coordinate system of a car can be accomplished in a number of ways. By way of illustration, in a 'static' approach, wherein it is assumed that the relative orientation of device 105, 160 is constant (e.g., if the device is attached to a cradle or is in the pocket of unmoving passenger), the mean acceleration vector can be determined and be identified as the "down" axis. The "forward" axis can be determined by comparing/processing inputs from GPS 145C that correspond to direction angles with inputs from magnetometer 145E that reflect 'north.' The third axis can be computed based on the first two determined axes using vector multiplication as is known to those of ordinary skill in the art. By way of further example, inputs from the accelerometer 145A, the magnetometer 145E and the GPS 145C (e.g., heading data) can be averaged, substantially in the manner described above.

In a dynamic arrangement, inputs originating at accelerometer 145A, gyroscope 145B and/or other sensors 145 can be processed to identify real-time changes in the orientation of a device 105, 160. In addition, acceleration/magnetic/GPS figures can be generated, preferably using "sensor fusion" algorithms, as is known to those of ordinary skill in the art. In doing so, the above-referenced "static" approach can be utilized to dynamically determine the relative orientation of the device 105, 160.

It should be noted that the gyroscopic sign convention adopted herein is preferably such that if an observer positioned on the positive part of the axis of rotation sees the rotation as counterclockwise, it is deemed to be positive.

Low-Pass filtering—The values derived and/or computed from the various inputs originating at the various sensors 145 of mobile device 105, 160 can be frequently compromised by the vibration(s) present in car's environment (originating at the car's engine, road bumps, imperfect wheels, wind blowing through the windows, or even car audio sounds). Such vibrations can inject "noise" into the inputs originating at the various sensors 145, and can adversely affect the precision of the processing of the various algorithms disclosed here, both in terms of efficiency and final accuracy.

There are various ways that this problem can be addressed. In one arrangement, one or more of devices 105, 160 within the vehicle are attached to a dampening device. In certain arrangements such a dampening device can include one or more weight(s) that can be attached to the mobile device 105, 160 to effectively increase its mass and thus make it more vibration resistant. Additionally, dampening materials (e.g. sorbothane pads) can be attached to a device 105, 160 to prevent high frequency vibrations from passing to the mobile device 105, 160. In any event, the inputs can be preferably processed with a bounded pass filter. On such example is an FIR with 128 taps with Hamming windows.

Sensor Fusion—As has already been noted and illustrated above, various determinations can be made by processing inputs from several sensors 145 together (e.g. forward velocity inputs originating at both the accelerometer 145A and GPS 145C).

EXAMPLE 4

The following scenarios illustrate additional examples of the analyzing of a first and second input and identifying the presence of a first user and a second user (such as at step 720, above):

Using one or more biometric authentication methods (as are known to those of ordinary skill in the art) to identify the presence of a first user and a second user. Such biometric authentication methods include, but are not limited to, voice recognition, fingerprint recognition, face recognition, DNA identification, and retina identification.

The following are further examples of restrictions that can be employed at a mobile device 105, such as in the manner described in detail above with reference to FIG. 7. Various of these examples impede operation of mobile device 105 by a driver moreso than they impede operation of the device by a passenger:

(a) If talking, the device is restricted to being held on the left side (right side for U.K.) of the head/face of the user and with an upright orientation, so that driver usage cannot be hidden from external observers.

(b) If texting, mailing, browsing etc., mobile device 105 is restricted to operating when having straight orientation (no yaw) (adjustment can be necessary, in certain arrangements, for a vertical/horizontal keyboard) and at least close to upright orientation (cannot be on knee or low down so that driver cannot "hide" the device use from external observers).

(c) The device interface will only function horizontally (more difficult for driver to use).

(d) The device 105 is restricted to operating in one or more ways only when camera 145F perceives a frequently moving background (e.g., be held high, not hidden low in the driver's lap or blocked by the steering wheel).

(e) The device 105 is restricted to operating in one or more ways that can be determined to correspond to operation by a passenger (and/or correspond to operation by a passenger of a particular device), such as the various determinations described in detail herein. By way of example, if no correlation (or, alternatively, no negative correlation) is identified between various typing tendencies and the speed, acceleration, and/or maneuvering of a traveling vehicle, and/or a certain typing accuracy threshold it met and/or maintained over a period of time, it can be concluded that the user is likely a passenger.

(f) The device 105 is restricted to operating only when it can be determined based on one or more inputs that the device is under the control of a passenger and/or under the control of a passenger using this particular device, such as the various determinations described in detail herein. By way of example, if relatively little "shake" is perceived at mobile device 105 over a period of time, it can be determined that the device is under the control of a passenger, as a passenger has the ability to control "shake" by using both hands to steady the device—an option not always available to drivers who generally need their second hand to steer the vehicle.

It should also be understood that the various restrictions referenced herein can also be dependent upon the presence and/or absence of certain of the determinations disclosed herein. Thus, for example, various restrictions can be employed only when a device cannot be definitively determined to be in the rear or on the right side of a vehicle (thus suggesting that a driver can potentially be operating the device).

EXAMPLE 5

In determining vehicle class or type, in certain arrangements a determination is made as to whether one or more mobile devices 105, 160 is/are present and/or in use in a vehicle. If such a determination is affirmatively made, a further determination can then be made regarding the general type or class of the vehicle (e.g., motorcycle, car, bus, train, boat, plane, etc.). This determination can then be used to further determine if there are restrictions on the mobile device usage on the part of a driver or the passenger in the vehicle. For example, if it is determined through a signature analysis (that is, an analysis of various patterns in various inputs) of an accelerometer 145A and/or gyroscope 145B and/or GPS 145C of mobile devices 105 and/or 160 that there is a high-likelihood that a particular mobile device 105, 160 is located on a train, then that the mobile device 105, 160 can remain fully operational without any operation state restrictions (assuming that no restrictions apply to anyone on the train including the conductor). If however, it is determined that a mobile device 105, 160 is being used within a car, restrictions can be applied (e.g., no phone use at all or just no texting), particularly if it is determined that the user of the mobile device 105, 160 is the driver of the car, and not a passenger.

As described in detail above, the type or class of vehicle in which a mobile device 105, 160 is located can preferably be identified and/or determined by using one or more of sensors 145 of mobile device 105. In certain arrangements, this identification/determination can be improved by using the onboard sensors of other mobile devices 160 and/or the onboard sensors (e.g., vehicle data system 164) of the vehicle in which mobile device 105 is traveling. As noted above, being that different vehicles operate in perceptibly different ways (which, in turn, reflect different patterns that are perceptible to one or more of sensors 145), the signature of one or more of sensors 145 of mobile device 105 (and/or other mobile devices 160) present and/or used in relation to each of the following vehicles is identifiable within a certain degree of accuracy:

Train—The accelerometer signature of a mobile device 105 travelling in a train is distinct in that trains generally accelerate and decelerate in the path of their movement (along the Y-axis) relatively infrequently (being that trains are generally in motion and maintain relatively constant speeds throughout their route) and generally accelerate/decelerate at relatively consistent rates. In addition, a train generally exhibits far less acceleration along its X-axis (that is, perpendicular to its line of motion) than other vehicles like cars and buses. Trains' gyroscopic pitch and roll as perceived on gyroscope 145B are close to zero (relative to cars and buses), while their gyroscopic yaw is smaller than those of other vehicles like cars and buses. Moreover, because a train travels on railroad tracks, its GPS location and movement can be tracked and compared with known railroad tracks. In addition, it can generally be expected that a train will have multiple mobile device 160 in use on it. Finally, the sounds heard on microphone 145D, are different for a train (other trains, train track noise, little other traffic) than for other vehicles.

Airplane—The accelerometer signature of a mobile device 105 in an airplane is distinct in that the speed at which an airplane travels (as can be determined in different ways, such as using inputs from GPS 145C) is far higher than the speed at which most other vehicles travel. Also, the height at which a commercial airplane travels is far higher than the height at which other vehicles travel, which can be sensed by the altitude sensor 145I and/or the pressure sensor 145J and/or GPS sensor 145C. Additionally, while other vehicles such as cars and/or trains travel along paths (such as roads or railroad tracks) that can be tracked/confirmed by overlaying GPS data with road/railroad map data, airplanes travel along air-corridors that generally do not align with any road for any appreciable distance. Also, changes in speed (as can be measured by the Y-axis accelerometer 145A) experienced in an airplane are generally much less frequent and more gradual than the change of speed in other vehicles. The movement signature of an airplane can be as characterized, for example, by its X-acceleration (as perceived by accelerometer 145A) and changes in pitch and roll (as perceived by gyroscope 145B), are very different than those of other vehicles (airplanes have larger values of pitch from takeoffs and larger rolls in turns than other vehicles). In addition, airplanes generally take off and land at an airport, which can be identified using mobile device 105 based on the travel path detected by GPS 145C and the information from other sensors 145 of mobile device 105, and/or from those of other mobile devices 160 in the airplane. Finally, commercial airplanes generally have multiple cell phones onboard and engine sounds that are different than those of other vehicles.

It should be noted that while in other vehicles only the driver is discouraged/prohibited from operating a mobile device while driving, current airline protocol prohibits the use of all mobile devices 105, 160 at certain times, such as while the airplane is in motion. As such, the methods and systems disclosed herein can effectively enforce the appropriate regulatory protocols and/or guidelines and restrict and/or block one or more operations of mobile devices 105, 160 of all users on an airplane.

Bus—The accelerometer signature of a mobile device 105 traveling on a bus is similar to that of a car, but substantially different from that of other vehicles. Like a car, a bus can change speeds (perceived by changes in the Y-axis accelerometer 145A) relatively frequently. However, unlike in a car, in many situations and scenarios relatively many mobile devices 105, 160 can be present within a bus. Additionally, owing to the relatively large size of a bus (as compared to a car), the acceleration, deceleration and lane changes (perceived by X-axis accelerometer 145A) of a larger bus can be relatively more smooth and gradual that other vehicles such as a car. The gyroscopic pitch, as perceived by gyroscope 145B, is generally less than for a bus than for a car. The signature of the bumps experienced in a bus (as perceived by accelerometer 145A and gyroscope 145B) is different than those in a car because the wheelbase of a bus is generally much larger than the wheelbase of a car (for example, the time between a bus' front wheels hitting a speed bump and its rear wheels hitting the same speed bump is longer than the same for a car travelling over the same speed bump at the same speed). Furthermore, intra-city buses generally stop with relatively high frequency, and this pattern can be easily detected by the onboard cell phone sensors. The sounds perceived by microphone 145D of a mobile device located in bus (e.g., engine sounds) are different than those of other vehicles. The height of a mobile device in a bus (which can be sensed by the altitude sensor 145I and/or the pressure sensor 145J and/or GPS sensor 145C), is generally greater than the altitude of a mobile device in a car.

Truck—The accelerometer and gyroscope signatures of a mobile device 105 traveling in a truck is substantially similar to that of a bus. However, it is expected that there will be relatively fewer mobile devices 105, 160 in a truck and a truck will generally stop less frequently than a bus. The sounds perceived by microphone 145D of a mobile device located in a truck (e.g., engine sounds) are different than those of a bus. Finally trucks will generally have more wheel axles than buses (because they generally carry greater weight) and, as such, the bump signature (as discussed in the Bus section above) for trucks will be different than that of buses.

Car—The accelerometer signature of a mobile device 105 traveling in a car is similar to that of a bus, except that the acceleration and deceleration movements detected by accelerometer 145A, as well as lateral movements detected by gyroscope 145B (such as lane-changes) are expected to be relatively quicker and more abrupt, being that cars are generally lighter and more "nimble" as compared to a bus. The gyroscopic pitch, as perceived by gyroscope 145B, is generally greater for a car than for a bus. The signature of the bumps experienced in a car (as perceived by accelerometer 145A and gyroscope 145B) is different than those in a bus because the wheelbase of a car is generally much shorter than the wheelbase of a bus (for example, the time between a car's front wheels hitting a speed bump and its rear wheels hitting the same speed bump is shorter than the same for a bus travelling over the same speed bump at the same speed)

Motorcycle—The accelerometer signature of a mobile device 105 traveling on a motorcycle is distinct in that the Y-acceleration perceived by accelerometer 145A tends to be higher than on cars, given the greater acceleration capabilities of most motorcycles. In addition, motorcycles generally produce constant small, jerky lateral movements (X-accelerations perceived by accelerometer 145A) and gyroscopic rolls (as perceived by gyroscope 145B) because motorcycles require constant micro and macro steering adjustments or corrections to remain upright. The signature of the bumps experienced in a motorcycle (as perceived by accelerometer 145A and gyroscope 145B) is different than those in a car because the wheelbase of a motorcycle is generally much shorter than the wheelbase of a car (for example, the time between a motorcycle's front wheels hitting a speed bump and its rear wheels hitting the same speed bump is shorter than the same for a car travelling over the same speed bump at the same speed). A truck will generally stop less frequently than a bus. The sounds perceived by microphone 145D of a mobile device located on a motorcycle (e.g., engine sounds) are different than those of a car, in part because the mobile device is not enclosed in a vehicle. It can be expected that there will be relatively few mobile devices 105, 160 on a motorcycle, in addition to the fact that the common use of full-faced helmets by motorcycle riders, and the accompanying wind noise, decrease the likelihood of the use of mobile devices 105, 160 by riders on a motorcycle. It should also be noted that various communication systems are available for motorcycle riders that integrate earpieces and microphones into protective helmets.

Bicycle—The accelerometer signature of a mobile device 105 traveling on a bicycle is similar to a motorcycle, except that its overall acceleration(s) and speed are much lower. Also, the act of pedaling a bicycle generates a unique accelerometer and gyroscopic signature including a regular lateral frequency as the weight of the rider involuntarily shifts side to side as the user rotates the crank to propel the bike. The sounds perceived by microphone 145D of a mobile device located on a bicycle (e.g., no engine sounds) are different than those of a car, in part because the mobile device is not enclosed in a vehicle.

Boat—On a boat, the GPS 145C of mobile device 105 can indicate that the boat is at constant altitude (zero altitude if the boat is on an ocean) and located over water. The accelerometer, gyroscopic and/or GPS signature of a mobile device 105 on a boat is also distinct in that a boat generally remains at sea level (or lake level), and rarely are altitude changes perceived, beyond small waves. Additionally, when the boat is stopped (anchored) at sea (as can be identified, for example, by location data from GPS 145C), its accelerometer(s) 145A can still show non-zero reading (accounting for waves, etc.) whereas the same is generally untrue for other vehicles. The "bump signature" of boats (as caused by waves) is very different than that of other vehicles, in part, because boats do not have wheels.

In addition, and as partially described above, the vehicle class within which a mobile device 105 is traveling can be discovered by one or more sound signatures picked up through mobile devices 105, 160 (such as through microphone 145D) in such vehicle. Different vehicles classes can be discerned through an analysis of the sounds (e.g., engines, echoes, keystrokes) received by mobile device(s) 105, 160 inside a vehicle (e.g., airplane jet engine noise, car engine noise) and/or by the "white" or background noise perceived by mobile devices 105, 160 within the vehicle. For example, the white noise perceived in a bus with many passengers is substantially different than white noise perceived in a car with few people in it. The following Table 1 provides a synopsis of much of the above referenced vehicle determination characteristics in relation to several of sensors 145:

TABLE 1

| Vehicle | Accelerometer (along X, Y, and Z-axes) | Gyroscope (around X, Y and Z axes) | GPS | Number of In-Vehicle Mobile Devices Likely | Engine Sounds & Environment Sounds (White Noise) |
|---|---|---|---|---|---|
| Train | X: Minimal changes<br>Y: Smooth changes in acceleration<br>Z: Minimal changes | Pitch: Very limited<br>Roll: Very limited<br>Yaw: Less than other vehicles. | Known/identifiable path | Many | Environment sounds (movement of tracks, in-train passenger noises) are perceptible. |
| Airplane | X: Turns have acceleration together with gyroscopic roll.<br>Y: High speed. Minimal acceleration.<br>Z: more pronounced than in terraneous vehicles | Pitch: Limited<br>Roll: Constant falling and correcting<br>Especially pronounced in turns<br>Yaw: generally much slower than in terraneous vehicles | High speed<br>High altitude<br>High acceleration takeoff and landing events in known locations | Many/None | Engine sounds detectable. In-plane passenger noises detectable. |
| Bus | X: less than cars.<br>Y: More pronounced changes than car due to stops | Pitch: less than car | Altitude of occupants in most buses generally higher than in cars. Buses are longer than cars (bumps felt differently) | Many | Engine sound detectable, sound of doors opening detectable. White noise detectable and differentiable. |
| Truck | Similar to bus, but Truck will also show different accelerometer signature on braking than bus and generally make fewer stops. | Pitch: less than car | Unknown<br>Altitude of occupants in most trucks generally higher than in cars. Trucks are longer than cars (bumps felt differently) | Few | Engine sound detectable. White noise similar to car. |
| Car | X: Quick and relatively jerky. | | | Few | |
| Motorcycle | X: Constantly falling and correcting.<br>Y: Similar to car, but with larger acceleration and deceleration<br>Z: Constantly falling and correcting. | Pitch: Limited<br>Roll: Constant falling and correcting | | 1-2 | Sound of engine detectable and noise of road detectable (no enclosure). Speeds and accelerations much higher than bicycle. |
| Bicycle | X: Constantly falling and correcting.<br>Y: Similar to car, but with smaller acceleration and deceleration<br>Z: Constantly falling and correcting. | Pitch: Limited<br>Roll: Constant falling and correcting | | 1-2 | No engine noise and noise of environment detectable. Speeds and accelerations much lower than motorcycle. |
| Boat | Z: Minimal, different bumps signatures. | Pitch: Constant falling and correcting - though general smaller than roll<br>Roll: Constant falling and correcting | Over water<br>Zero altitude or lake altitude unless moving on a river. | Many | Noise of water and sound echoes from water detectable |

It should be understood that Table 1 can be expanded to include other vehicles such as ferries, forklifts, hovercrafts, Segways, skateboards, rollerblades, etc.

It should be further understood that while much of the above disclosure has referenced the identification of a driver/passenger within a car, such disclosures can generally be similarly applied to practically any setting and/or scenario involving practically any vehicle, such as those referenced in Table 1.

At this juncture, it should be noted that although much of the foregoing description has been directed to systems and methods for determining user roles and/or devices usages within the context of vehicular travel, the systems and methods disclosed herein can be similarly deployed and/or implemented in scenarios, situations, and settings far beyond the referenced scenarios. It can be readily appreciated that the user-role determination system 100 can be effectively employed in practically any scenario where the determination and/or identification of a user or usage of a mobile device is of value, such as in the context of exercising or game playing. It should be further understood that any such implementation and/or deployment is within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described below. It should be appreciated that according to at least one embodiment, one or more computer programs or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for deploying one or more dynamic experiences within a restaurant. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method comprising:
   receiving one or more inputs;
   processing, by a processing device, the one or more inputs to determine a quantity of occupants within a vehicle;
   identifying a time interval during which it is determined that a user of a device present within the vehicle is likely to be a driver of the vehicle; and
   based on a determination that the quantity of occupants within the vehicle is not greater than one, transforming a first operation state of the device during the identified time interval.

2. The method of claim 1, further comprising:
   based on a determination that the quantity of occupants within the vehicle is greater than one, transforming a second operation state of the device present within the vehicle.

3. The method of claim 1, wherein at least one of the one or more inputs originates from a vehicle data system.

4. The method of claim 1, wherein at least one of the one or more inputs indicates a weight measured at one or more seats of the vehicle.

5. The method of claim 1, wherein at least one of the one or more inputs indicates a seat belt usage of one or more seats of the vehicle.

6. The method of claim 1, wherein at least one of the one or more inputs comprises an audio input.

7. The method of claim 6, wherein processing the one or more inputs comprises processing the audio input to determine a quantity of distinct voices present within the audio input.

8. The method of claim 1, wherein processing the one or more inputs comprises processing the one or more inputs to determine a quantity of devices within the vehicle.

9. The method of claim 1, wherein transforming a first operation state of a device present within the vehicle comprises outputting a result in relation to the device.

10. The method of claim 9, wherein the result comprises a determination that the device is being operated by a driver of the vehicle.

11. The method of claim 10, wherein outputting the result comprises outputting the result to an insurance company.

12. The method of claim 1, wherein transforming a first operation state of the device comprises transforming the first operation state of the device based on a determination that a user of the device is likely to be a driver of the vehicle.

13. A system comprising:
a memory; and
a processing device, operatively coupled to the memory, to:
receive one or more inputs;
process the one or more inputs to determine a quantity of occupants within a vehicle; and
based on a determination that the quantity of occupants within the vehicle is not greater than one, employ, in relation to a device present within the vehicle, a restriction that impedes user operation of the device while the device is oriented outside of a defined orientation and does not impede user operation of the device while the device is oriented within the defined orientation.

14. The system of claim 13, wherein the processing device is further to:
modify, based on a determination that the quantity of occupants within the vehicle is greater than one, the restriction in relation to the device present within the vehicle.

15. A non-transitory computer readable medium having instructions stored thereon that, when executed by a processing device, cause the processing device to:
employ, in relation to a device present within the vehicle, a first restriction that impedes user operation of the device while the device is oriented outside of a defined orientation and does not impede user operation of the device while the device is oriented within the defined orientation;
receive one or more inputs;
process the one or more inputs to determine a quantity of occupants within the vehicle; and
based on a determination that the quantity of occupants within the vehicle is greater than one, modify the first restriction.

16. The non-transitory computer readable medium of claim 15, wherein to modify the first restriction, the processing device is to remove the first restriction.

17. The non-transitory computer readable medium of claim 15, wherein to modify the first restriction, the processing device is to substitute a second restriction for the first restriction.

* * * * *